(12) United States Patent
Zhang

(10) Patent No.: US 11,963,191 B2
(45) Date of Patent: Apr. 16, 2024

(54) METHOD AND DEVICE IN NODES USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 88 days.

(21) Appl. No.: 17/544,945

(22) Filed: Dec. 8, 2021

(65) Prior Publication Data

US 2022/0183045 A1   Jun. 9, 2022

(30) Foreign Application Priority Data

Dec. 8, 2020   (CN) .......................... 202011422888.X
Dec. 11, 2020   (CN) .......................... 202011436485.0
Dec. 15, 2020   (CN) .......................... 202011481237.8

(51) Int. Cl.
*H04W 72/23*   (2023.01)
*H04L 1/1812*   (2023.01)
*H04L 5/00*   (2006.01)
*H04W 72/02*   (2009.01)
*H04W 72/0446*   (2023.01)
*H04W 72/1273*   (2023.01)

(52) U.S. Cl.
CPC .......... *H04W 72/23* (2023.01); *H04L 1/1812* (2013.01); *H04L 5/0053* (2013.01); *H04W 72/02* (2013.01); *H04W 72/0446* (2013.01); *H04W 72/1273* (2013.01)

(58) Field of Classification Search
CPC . H04W 72/23; H04W 72/02; H04W 72/0446; H04W 72/1273; H04L 1/1812; H04L 5/0053; H04L 1/1854; H04L 1/1861; H04L 1/1896; H04L 5/0055; H04L 5/0098
See application file for complete search history.

(56) References Cited

U.S. PATENT DOCUMENTS

2016/0212734 A1* 7/2016 He .............................. H04L 5/14
2021/0329682 A1* 10/2021 Takeda .............. H04W 72/0446

* cited by examiner

*Primary Examiner* — Charles C Jiang
*Assistant Examiner* — Debebe A Asefa

(57) ABSTRACT

The present disclosure provides a method and a device in nodes used for wireless communication. A first receiver, receiving a first DCI group, which comprises at least one piece of DCI; a first transmitter, transmitting a first signal, which carries a first HARQ-ACK bit sequence; herein, for any DCI in the first DCI group, a first field comprised is used to indicate an accumulated number of cell(s) scheduled by first-type DCI in a first resource pool as of a current reference cell and a current time interval; the current reference cell is a cell having a default cell index of cell(s) scheduled by the DCI in the first DCI group, time-domain resources occupied by the DCI in the first DCI group belong to the current time interval, and at least one piece of DCI in the first DCI group schedules more than one cell.

14 Claims, 8 Drawing Sheets

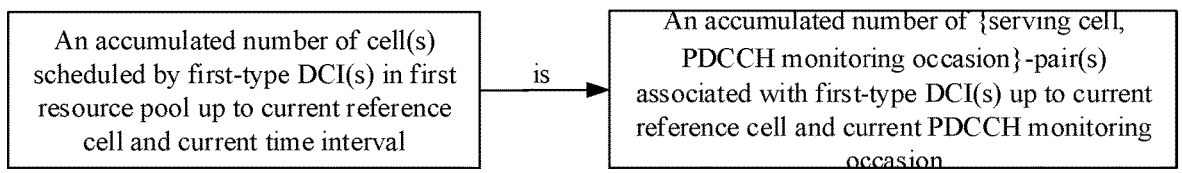
FIG. 6
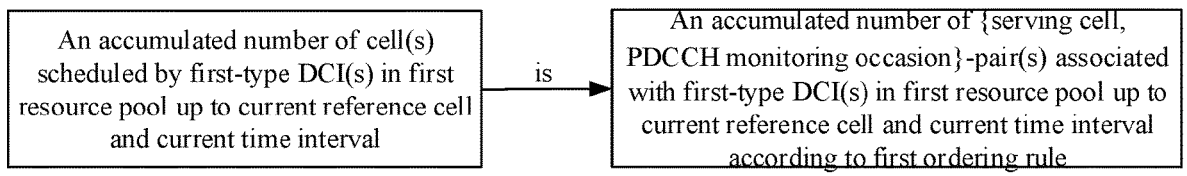
FIG. 7
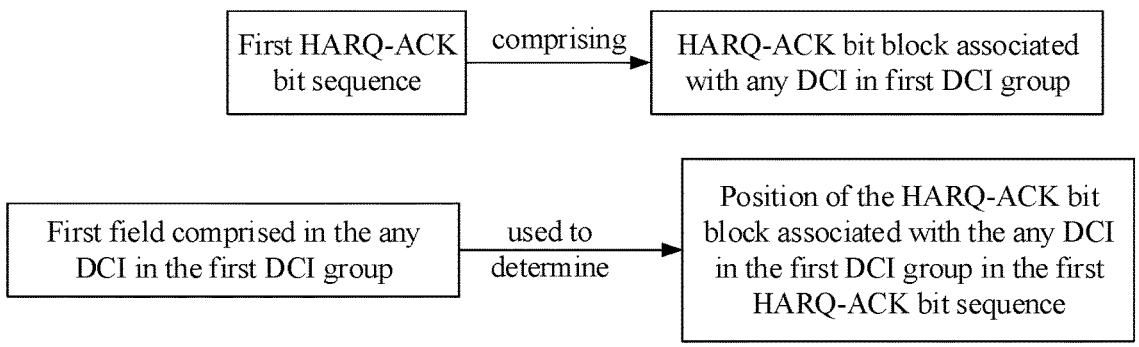
FIG. 8
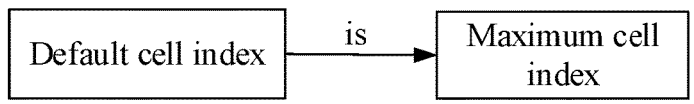
FIG. 9
| DCI in first DCI group | Value of first field | Cell(s) being scheduled | Time interval to which time-domain resources occupied by DCI belong |
|---|---|---|---|
| DCI#0 | 1 | Cell #2 | Time interval #0 |
| DCI#1 | 3 | Cell #0, Cell #1 | Time interval #1 |
| DCI#2 | 4 | Cell #2 | Time interval #1 |
FIG. 10

| DCI in first DCI group | Value of first field | Cell(s) being scheduled | Time interval to which time-domain resources occupied by DCI belong |
|---|---|---|---|
| DCI#0 | 1 | Cell #2 | Time interval #0 |
| DCI#1 | 2 | Cell #0, Cell #1 | Time interval #1 |
| DCI#2 | 4 | Cell #2 | Time interval #1 |

FIG. 11

| DCI in first DCI group | Value of first field | Cell(s) being scheduled | Time interval to which time-domain resources occupied by DCI belong |
|---|---|---|---|
| DCI#0 | 2 | Cell #1, Cell #2 | Time interval #0 |
| DCI#1 | 3 | Cell #0 | Time interval #1 |
| DCI#2 | 4 | Cell #3 | Time interval #1 |
| DCI#3 | 6 or 2(6 mod 4) | Cell #1, Cell #2 | Time interval #2 |

FIG. 12

| DCI in first DCI group | Value of first field | Cell(s) being scheduled | Time interval to which time-domain resources occupied by DCI belong |
|---|---|---|---|
| DCI#0 | 2 | Cell #0, Cell #2 | Time interval #0 |
| DCI#1 | 4 | Cell #1, Cell #3 | Time interval #1 |

FIG. 13

| DCI in first DCI group | Value of first field | Cell(s) being scheduled | Time interval to which time-domain resources occupied by DCI belong |
|---|---|---|---|
| DCI#0 | 1 | Cell #1 | Time interval #0 |
| DCI#1 | 3 | Cell #0, Cell #2 | Time interval #0 |
| DCI#2 | 4 | Cell #1 | Time interval #1 |

FIG. 14

| DCI in first DCI group | Value of first field | Cell(s) being scheduled | Start time for PDSCH reception in Cell #1 being indicated |
|---|---|---|---|
| DCI#0 | 1 | Cell #1 | Start time #0 |
| DCI#1 | 3 | Cell #0, Cell #1 | Start time #1 |
FIG. 15
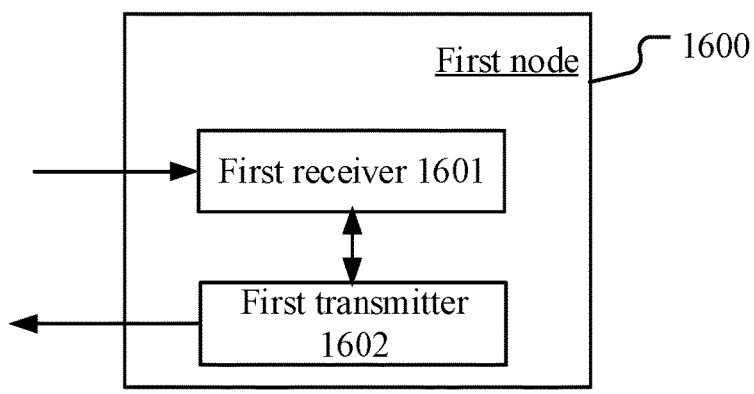
FIG. 16
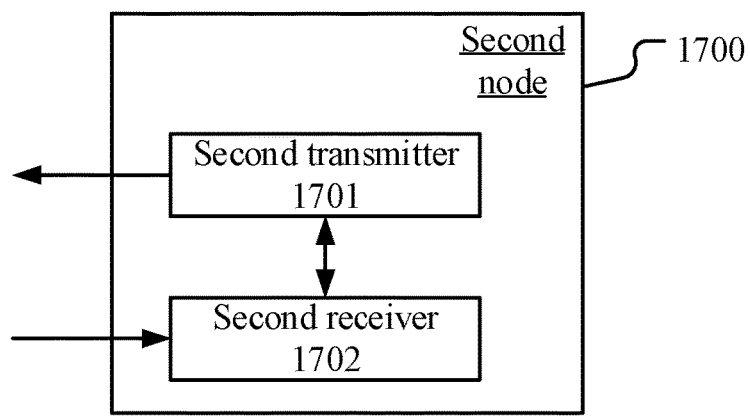
FIG. 17
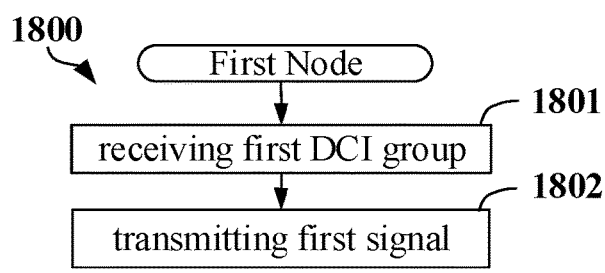
FIG. 18

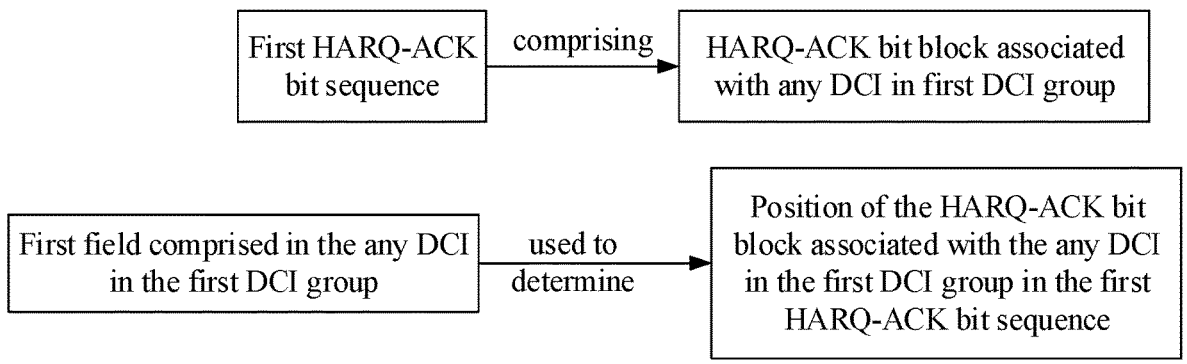

FIG. 22

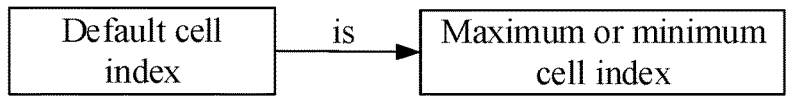

FIG. 23

| DCI in first DCI group | Value of first field | Cell(s) being scheduled | Time interval to which time-domain resources occupied by DCI belong |
|---|---|---|---|
| DCI#0 | 1 | Cell #1 | Time interval #0 |
| DCI#1 | 3 | Cell #0, Cell #2 | Time interval #1 |
| DCI#2 | 2 | Cell #1 | Time interval #1 |

FIG. 24

| DCI in first DCI group | Value of first field | Cell(s) being scheduled | Time interval to which time-domain resources occupied by DCI belong |
|---|---|---|---|
| DCI#0 | 2 | Cell #1, Cell #2 | Time interval #0 |
| DCI#1 | 1 | Cell #0, Cell #3 | Time interval #0 |

FIG. 25

| DCI in first DCI group | Value of first field | Cell(s) being scheduled | Start time of a PDSCH reception in Cell #1/an earliest PDSCH reception being indicated |
|---|---|---|---|
| DCI#0 | 1 | Cell #1 | Start time #0 |
| DCI#1 | 2 | Cell #0, Cell #1 | Start time #1 |
FIG. 26
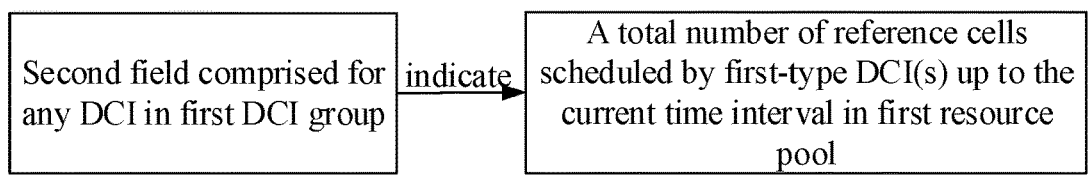
FIG. 27
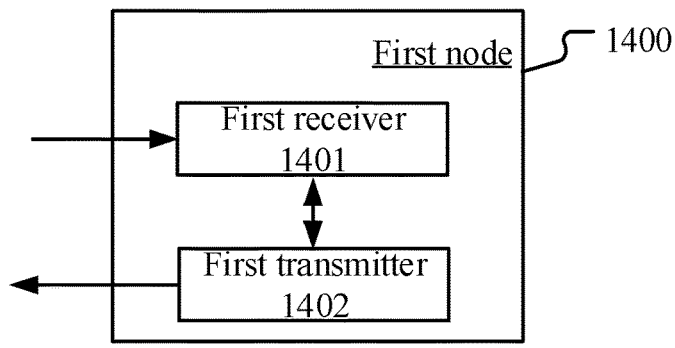
FIG. 28
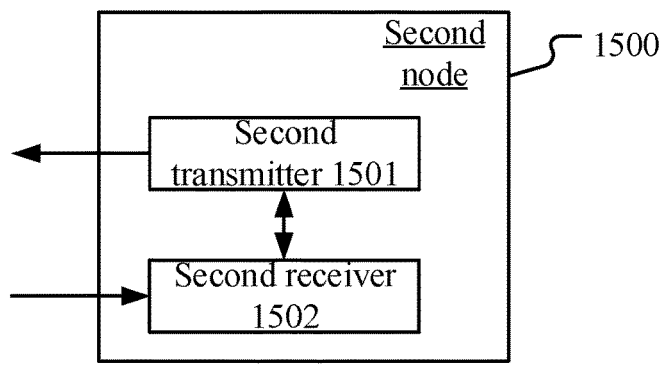
FIG. 29

METHOD AND DEVICE IN NODES USED FOR WIRELESS COMMUNICATION

CROSS REFERENCE TO RELATED APPLICATIONS

This application claims the priority benefit of Chinese Patent Application No. 202011422888.X, filed on Dec. 8, 2021, and the priority benefit of Chinese Patent Application No. 202011436485.0, filed on Dec. 11, 2020, and the priority benefit of Chinese Patent Application No. 202011481237.8, filed on Dec. 15, 2020, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

In a 5G NR system, with a view of supporting Enhance Mobile Broadband (eMBB), Ultra Reliable and Low Latency Communication (URLLC) and other services with higher communication demands, a larger-than-ever amount of Downlink Control Information (DCI) signaling is required to be transmitted to accomplish the scheduling of a transport channel, for instance, a Physical Downlink Shared CHannel (PDSCH), or a Physical Uplink Shared CHannel (PUSCH); which is likely to bring about potential reduction of system efficiency.

The 3GPP RAN Plenary approved a decision on studying the project of Dynamic Spectrum Sharing (DSS) in NR Release 17. Herein, it is a major tendency of DSS research to use a DCI for scheduling multiple PDSCHs on a plurality of cells.

SUMMARY

Since the introduction of a functionality of using a DCI to schedule multiple PDSCHs on multiple cells, how to adjust a Downlink Assignment Index (DAI), especially a counter DAI, in a reasonable way when working in a mode of Type-2 Hybrid Automatic Repeat reQuest ACKnowledgement (HARQ-ACK) Codebook has become an urgent issue to be addressed.

To address the above problem, the present disclosure provides a solution. It should be noted that though the present disclosure only took the DSS scenario for example in the statement above, it is also applicable to other transmission scenarios like multi-TRP transmission, Internet of Things (IoT), Multicast and Broadcast Services (MBS), Vehicle-to-Everything (V2X), and non-terrestrial networks (NTN), where similar technical effects can be achieved. Additionally, the adoption of a unified solution for various scenarios, including but not limited to DSS, multi-TRP transmission, IoT, MBS, V2X or NTN, contributes to the reduction of hardcore complexity and costs, or an enhancement in performance. It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first DCI group, the first DCI group comprising at least one DCI; and
  transmitting a first signal, the first signal carrying a first HARQ-ACK bit sequence;
  herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one embodiment, a problem to be solved in the present disclosure includes: how to interpret a counter DAI field in the DCI after introducing the functionality of using a DCI to schedule multiple PDSCHs on multiple cells.

In one embodiment, characteristics of the above method include: for any DCI in the first DCI group (particularly when a number of cells scheduled by the DCI in the first DCI group is greater than 1), a cell which is indexed by a default cell index among the cells scheduled by the any DCI in the first DCI group is taken as a reference cell for interpreting an indication of a first field in the DCI in the first DCI group.

In one embodiment, an advantage of the above method lies in the avoidance of inconsistent understandings of the indication of the first field by both sides of communications.

In one embodiment, an advantage of the above method lies in supporting a Type-2 HARQ-ACK codebook after introducing the functionality of a DCI for scheduling multiple cells.

In one embodiment, an advantage of the above method lies in that it is only necessary to make a small adjustment to the existing protocols after introducing the functionality of a DCI for scheduling multiple cells, hence better compatibility.

In one embodiment, an advantage of the above method lies in reducing the impact of a missed detection of DCI.

In one embodiment, an advantage of the above method lies in increasing the flexibility of scheduling.

In one embodiment, an advantage of the above method lies in reducing scheduling overhead or feedback overhead.

In one embodiment, an advantage of the above method lies in the avoidance of bit overhead of an extra counter DAI field in DCI.

According to one aspect of the present disclosure, the above method is characterized in that, the accumulative number of the cell(s) scheduled by the first-type DCI(s) in the first resource pool up to the current reference cell and the current time interval is: an accumulative number of {serving cell, PDCCH monitoring occasion}-pair(s) associated with first-type DCI(s) up to a current reference cell and a current PDCCH monitoring occasion.

According to one aspect of the present disclosure, the above method is characterized in that, the accumulative number of the cell(s) scheduled by the first-type DCI(s) in the first resource pool up to the current reference cell and the current time interval is: an accumulative number of {serving cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

According to one aspect of the present disclosure, the above method is characterized in comprising:

receiving on a first channel;

herein, a DCI in the first DCI group comprises configuration information for the first channel.

According to one aspect of the present disclosure, the above method is characterized in comprising:

receiving on a second channel and a third channel;

herein, a DCI in the first DCI group comprises configuration information for the second channel and the third channel.

In one embodiment, characteristics of the above method include: a DCI in the first DCI group schedules two PDSCHs on two cells.

According to one aspect of the present disclosure, the above method is characterized in that, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group.

According to one aspect of the present disclosure, the above method is characterized in that, the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

The present disclosure provides a method in a second node for wireless communications, comprising:

transmitting a first DCI group, the first DCI group comprising at least one DCI; and receiving a first signal, the first signal carrying a first HARQ-ACK bit sequence;

herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

According to one aspect of the present disclosure, the above method is characterized in that, the accumulative number of the cell(s) scheduled by the first-type DCI(s) in the first resource pool up to the current reference cell and the current time interval is: an accumulative number of {serving cell, PDCCH monitoring occasion}-pair(s) associated with first-type DCI(s) up to a current reference cell and a current PDCCH monitoring occasion.

According to one aspect of the present disclosure, the above method is characterized in that, the accumulative number of the cell(s) scheduled by the first-type DCI(s) in the first resource pool up to the current reference cell and the current time interval is: an accumulative number of {serving cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

According to one aspect of the present disclosure, the above method is characterized in comprising:

transmitting on a first channel;

herein, a DCI in the first DCI group comprises configuration information for the first channel.

According to one aspect of the present disclosure, the above method is characterized in comprising:

transmitting on a second channel and a third channel;

herein, a DCI in the first DCI group comprises configuration information for the second channel and the third channel.

According to one aspect of the present disclosure, the above method is characterized in that, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group.

According to one aspect of the present disclosure, the above method is characterized in that, the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

The present disclosure provides a first node for wireless communications, comprising:

a first receiver, which receives a first DCI group, the first DCI group comprising at least one DCI; and a first transmitter, which transmits a first signal, the first signal carrying a first HARQ-ACK bit sequence;

herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

The present disclosure provides a second node for wireless communications, comprising:
a second transmitter, which transmits a first DCI group, the first DCI group comprising at least one DCI; and
a second receiver, which receives a first signal, the first signal carrying a first HARQ-ACK bit sequence;
herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one embodiment, the method in the present disclosure has the following advantages:
enhancing the interpretation of the (counter) DAI field;
avoiding inconsistency of understandings of the indication of the (counter) DAI field by both ends of communications;
avoiding bit overhead of an extra counter DAI field in DCI since the introduction of the functionality in which a DCI schedules multiple cells;
supporting a DCI for scheduling different numbers of cells (one or more than one);
supporting a Type-2 HARQ-ACK codebook, which produces less feedback overhead, after the introduction of the functionality of scheduling multiple cells with one DCI;
being easily compatible;
reducing the impact of missed DCI detection;
increasing the flexibility of scheduling;
reducing the scheduling overhead.

The present disclosure provides a method in a first node for wireless communications, comprising:
receiving a first DCI group, the first DCI group comprising at least one DCI; and
transmitting a first signal, the first signal carrying a first HARQ-ACK bit sequence;
herein, for any DCI in the first DCI group, a first field comprised is used to indicate an accumulative number of reference cell-(s) scheduled by first-type DCI(s) in a first resource pool up to a current reference cell and a current time interval, any of the first-type DCI(s) being used to indicate a PDSCH reception or an SPS PDSCH release; a reference cell scheduled by a first-type DCI(s) is a cell having a default cell index among cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

In one embodiment, a problem to be solved in the present disclosure includes: how to interpret a counter DAI field in the DCI after introducing the functionality of using a DCI to schedule multiple PDSCHs on multiple cells.

In one embodiment, characteristics of the above method include: for any DCI in the first DCI group (particularly when a number of cells scheduled by the DCI in the first DCI group is greater than 1), a cell which is indexed by a default cell index among the cells scheduled by the any DCI in the first DCI group is taken as a reference cell for interpreting an indication of a first field in the DCI in the first DCI group.

In one embodiment, an advantage of the above method lies in the avoidance of inconsistent understandings of the indication of the first field by both sides of communications.

In one embodiment, an advantage of the above method lies in supporting a Type-2 HARQ-ACK codebook after introducing the functionality of a DCI for scheduling multiple cells.

In one embodiment, an advantage of the above method lies in that it is only necessary to make a small adjustment to the framework of existing version of protocols (Release 16 of 3GPP TS38.213) after introducing the functionality of using a DCI for scheduling multiple cells, hence better compatibility.

In one embodiment, an advantage of the above method lies in reducing the impact of a missed detection of DCI.

In one embodiment, an advantage of the above method lies in reducing scheduling overhead or feedback overhead.

In one embodiment, an advantage of the above method lies in that the performance of DAI in overcoming missed detections of DCI won't be impaired by the introduction of the functionality of using a DCI for scheduling multiple cells.

In one embodiment, an advantage of the above method lies in the avoidance of bit overhead of an extra counter DAI field in DCI.

According to one aspect of the present disclosure, the above method is characterized in that,
the accumulative number of the reference cell(s) scheduled by the first-type DCI(s) in the first resource pool up to the current reference cell and the current time interval is: an accumulative number of {reference cell, PDCCH monitoring occasion}-pair(s) being associated with first-type DCI(s) up to the current reference cell and a current PDCCH monitoring occasion.

According to one aspect of the present disclosure, the above method is characterized in that,
the accumulative number of the reference cell(s) scheduled by the first-type DCI(s) in the first resource pool up to the current reference cell and the current time interval is: an accumulative number of {reference cell, time interval}-pair(s) being associated with first-type DCI(s) up to the current reference cell and the current time interval according to a first ordering rule; the first ordering rule is a rule of ordering based on at least cell indexes of reference cells and time interval indexes.

According to one aspect of the present disclosure, the above method is characterized in comprising:
receiving on a first channel;
herein, a DCI in the first DCI group comprises configuration information for the first channel.

According to one aspect of the present disclosure, the above method is characterized in comprising:
receiving on a second channel and a third channel;
herein, a DCI in the first DCI group comprises configuration information for the second channel and the third channel.

In one embodiment, characteristics of the above method include: a DCI in the first DCI group schedules two PDSCHs on two cells.

According to one aspect of the present disclosure, the above method is characterized in that,
the first HARQ-ACK bit sequence comprises a HARQ-ACK bit block associated with any DCI in the first DCI group; and a position of the HARQ-ACK bit block associated with the any DCI in the first DCI group in the first HARQ-ACK bit sequence is determined based on the first field comprised in the any DCI in the first DCI group.

According to one aspect of the present disclosure, the above method is characterized in that, the first DCI group comprises 2 DCIs, and each of the 2 DCIs schedules more than one cell; for one of the 2 DCIs, a current reference cell is a cell having a maximum cell index among cells scheduled by the said DCI of the 2 DCIs; for the other of the 2 DCIs, a current reference cell is a cell having a minimum cell index among cells scheduled by the said other DCI of the 2 DCIs.

In one embodiment, an advantage of the above method lies in increasing the flexibility of scheduling of the system.

In one embodiment, an advantage of the above method lies in providing a favorable condition for a UE in which multiple PDSCH receptions exist to support the functionality of one DCI scheduling multiple cells in each {serving cell, PDCCH monitoring occasion}-pair.

The present disclosure provides a method in a second node for wireless communications, comprising:

transmitting a first DCI group, the first DCI group comprising at least one DCI; and receiving a first signal, the first signal carrying a first HARQ-ACK bit sequence;

herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index among cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

According to one aspect of the present disclosure, the above method is characterized in that, the accumulative number of the reference cell(s) scheduled by the first-type DCI(s) in the first resource pool up to the current reference cell and the current time interval is: an accumulative number of {reference cell, PDCCH monitoring occasion}-pair(s) being associated with first-type DCI(s) up to the current reference cell and a current PDCCH monitoring occasion.

According to one aspect of the present disclosure, the above method is characterized in that, the accumulative number of the reference cell(s) scheduled by the first-type DCI(s) in the first resource pool up to the current reference cell and the current time interval is: an accumulative number of {reference cell, time interval}-pair(s) being associated with first-type DCI(s) up to the current reference cell and the current time interval according to a first ordering rule; the first ordering rule is a rule of ordering based on at least cell indexes of reference cells and time interval indexes.

According to one aspect of the present disclosure, the above method is characterized in comprising:

transmitting on a first channel;

herein, a DCI in the first DCI group comprises configuration information for the first channel.

According to one aspect of the present disclosure, the above method is characterized in comprising:

transmitting on a second channel and a third channel;

herein, a DCI in the first DCI group comprises configuration information for the second channel and the third channel.

According to one aspect of the present disclosure, the above method is characterized in that, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group.

According to one aspect of the present disclosure, the above method is characterized in that, the first DCI group comprises 2 DCIs, and each of the 2 DCIs schedules more than one cell; for one of the 2 DCIs, a current reference cell is a cell having a maximum cell index of cells scheduled by the said DCI of the 2 DCIs; for the other of the 2 DCIs, a current reference cell is a cell having a minimum cell index of cells scheduled by the said other DCI of the 2 DCIs.

The present disclosure provides a first node for wireless communications, comprising:

a first receiver, receiving a first DCI group, the first DCI group comprising at least one DCI; and a first transmitter, transmitting a first signal, the first signal carrying a first HARQ-ACK bit sequence;

herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index of cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

The present disclosure provides a second node for wireless communications, comprising:

a second transmitter, transmitting a first DCI group, the first DCI group comprising at least one DCI; and a second receiver, receiving a first signal, the first signal carrying a first HARQ-ACK bit sequence;

herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index of cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

In one embodiment, the method in the present disclosure has the following advantages:

enhancing the interpretation of the (counter) DAI field;
avoiding inconsistency of understandings of the indication of the (counter) DAI field by both ends of communications;
not reducing the performance of DAI in overcoming missed DCI detection with the introduction of the functionality of using one DCI for scheduling multiple cells;
avoiding bit overhead of an extra counter DAI field in DCI since the introduction of the functionality in which a DCI schedules multiple cells;
supporting a DCI for scheduling different numbers of cells (one or more than one);
supporting a Type-2 HARQ-ACK codebook, which produces less feedback overhead, after the introduction of the functionality of scheduling multiple cells with one DCI;
being easily compatible;
increasing the flexibility of scheduling;
reducing the scheduling overhead.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of an accumulative number of cell(s) scheduled by first-type DCI(s) in a first resource pool up to a current reference cell and a current time interval according to one embodiment of the present disclosure.

FIG. 7 illustrates a schematic diagram of an accumulative number of cell(s) scheduled by first-type DCI(s) in a first resource pool up to a current reference cell and a current time interval according to one embodiment of the present disclosure.

FIG. 8 illustrates a schematic diagram of relations among a first HARQ-ACK bit sequence, any DCI in a first DCI group and a first field comprised in the any DCI in the first DCI group according to one embodiment of the present disclosure.

FIG. 9 illustrates a schematic diagram of a default cell index according to an embodiment of the present disclosure.

FIG. 10 illustrates a schematic diagram explaining how to indicate by a first field in DCI in a first DCI group according to an embodiment of the present disclosure.

FIG. 11 illustrates a schematic diagram explaining how to indicate by a first field in DCI in a first DCI group according to an embodiment of the present disclosure.

FIG. 12 illustrates a schematic diagram explaining how to indicate by a first field in DCI in a first DCI group according to an embodiment of the present disclosure.

FIG. 13 illustrates a schematic diagram explaining how to indicate by a first field in DCI in a first DCI group according to an embodiment of the present disclosure.

FIG. 14 illustrates a schematic diagram explaining how to indicate by a first field in DCI in a first DCI group according to an embodiment of the present disclosure.

FIG. 15 illustrates a schematic diagram explaining how to indicate by a first field in DCI in a first DCI group according to an embodiment of the present disclosure.

FIG. 16 illustrates a structure block diagram of a processing device in a first node according to one embodiment of the present disclosure.

FIG. 17 illustrates a structure block diagram a processing device in a second node according to one embodiment of the present disclosure.

FIG. 18 illustrates a flowchart of processing of a first node according to one embodiment of the present disclosure.

FIG. 22 illustrates a schematic diagram of relations among a first HARQ-ACK bit sequence, any DCI in a first DCI group and a first field comprised in the any DCI in the first DCI group according to one embodiment of the present disclosure.

FIG. 23 illustrates a schematic diagram of a default cell index according to an embodiment of the present disclosure.

FIG. 24 illustrates a schematic diagram explaining how to indicate by a first field in DCI in a first DCI group according to an embodiment of the present disclosure.

FIG. 25 illustrates a schematic diagram explaining how to indicate by a first field in DCI in a first DCI group according to an embodiment of the present disclosure.

FIG. 26 illustrates a schematic diagram explaining how to indicate by a first field in DCI in a first DCI group according to an embodiment of the present disclosure.

FIG. 27 illustrates a schematic diagram explaining a second field in any DCI in a first DCI group according to an embodiment of the present disclosure.

FIG. 28 illustrates a structure block diagram of a processing device in a first node according to one embodiment of the present disclosure.

FIG. 29 illustrates a structure block diagram a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
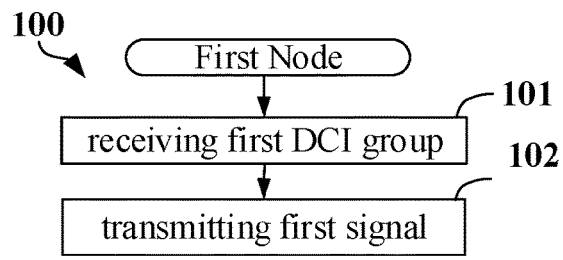
FIG. 1 illustrates a flowchart of processing of a first node according to one embodiment of the present disclosure.

Embodiment 1 illustrates a flowchart of processing of a first node, as shown in FIG. 1.

In Embodiment 1, the first node in the present disclosure receives a first DCI group in step 101; and transmits a first signal in step 102.

In Embodiment 1, the first DCI group comprises at least one DCI; and the first signal carries a first HARQ-ACK bit sequence; for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one embodiment, the first signal comprises a radio signal.

In one embodiment, the first signal comprises a radio frequency signal.

In one embodiment, the first signal comprises a baseband signal.

In one embodiment, the phrase that the first signal carries a first HARQ-ACK bit sequence means: the first signal comprises an output by all or part of bits in the first HARQ-ACK bit sequence sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the first signal is transmitted in a time-frequency resource pool.

In one embodiment, transmission of the first signal occupies at least one Resource Element (RE).

In one embodiment, a said RE occupies a multicarrier symbol in time domain, and a subcarrier in frequency domain.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the first signal is transmitted in a Physical Uplink Control CHannel (PUCCH).

In one embodiment, the first signal is transmitted in a PUSCH.

In one embodiment, a DCI in the first DCI group is DCI format 1_0, for the specific definition of the DCI format 1_0, refer to 3GPP TS38.212, Chapter 7.3.1.2.

In one embodiment, a DCI in the first DCI group is DCI format 1_1, for the specific definition of the DCI format 1_1, refer to 3GPP TS38.212, Chapter 7.3.1.2.

In one embodiment, a DCI in the first DCI group is DCI format 1_2, for the specific definition of the DCI format 1_2, refer to 3GPP TS38.212, Chapter 7.3.1.2.

In one embodiment, the DCI in the present disclosure is transmitted in a PDCCH.

In one embodiment, the DCI in the present disclosure is a DCI format.

In one embodiment, the DCI in the present disclosure is a control signaling.

In one embodiment, the DCI in the present disclosure is a L1 control signaling.

In one embodiment, the DCI in the present disclosure is a physical layer control signaling.

In one embodiment, the first DCI group comprises one DCI.

In one embodiment, the first DCI group comprises multiple DCIs.

In one embodiment, a DCI in the first DCI group is used to indicate Downlink Grant.

In one embodiment, there are at least two DCIs in the first DCI group occupying time-domain resources that respectively belong to different time intervals.

In one embodiment, there are at least two DCIs in the first DCI group occupying time-domain resources that belong to a same time interval.

In one embodiment, time-domain resources occupied by all DCIs in the first DCI group belong to a same time interval.

In one embodiment, any DCI in the first DCI group schedules at least one cell.

In one embodiment, each DCI in the first DCI group schedules a same cell.

In one embodiment, at least two DCIs in the first DCI group respectively schedule different cells.

In one embodiment, at least two DCIs in the first DCI group schedule a same cell.

In one embodiment, a DCI in the first DCI group is transmitted in a cell scheduled by the DCI in the first DCI group.

In one embodiment, a DCI in the first DCI group schedules two cells; the DCI in the first DCI group is transmitted in one of the two cells scheduled by the DCI in the first DCI group.

In one embodiment, a DCI in the first DCI group is transmitted in a cell different from any cell scheduled by the DCI in the first DCI group.

In one embodiment, the first field comprised is only for DCI associated with the first HARQ-ACK bit sequence.

In one embodiment, when the first HARQ-ACK bit sequence is comprised of one or more of HARQ-ACK bits indicating whether a PDSCH reception or an SPS PDSCH release indicated by a DCI is correctly received, where the DCI is a DCI being associated with the first HARQ-ACK bit sequence.

In one embodiment, the first field comprised is only for DCI in the first signaling group.

In one embodiment, the first field comprised is only for the PDCCH monitoring occasion being associated with the first HARQ-ACK bit sequence.

In one embodiment, the first field comprised is only for the {serving cell, PDCCH monitoring occasion}-pair being associated with the first HARQ-ACK bit sequence.

In one embodiment, the first field comprised is only for a PDSCH being associated with the first HARQ-ACK bit sequence.

In one embodiment, the accumulative number is only limited to an accumulative number determined in the first resource pool.

In one embodiment, a transmission of any DCI in the first DCI group occupies at least one RE.

In one embodiment, the first resource pool is configurable.

In one embodiment, the first resource pool is determined based on a pre-defined rule.

In one embodiment, the first resource pool is comprised of multiple REs.

In one embodiment, the first resource pool is a time-frequency resource pool.

In one embodiment, in terms of time domain, the first resource pool is comprised of a positive integer number of multicarrier symbol(s).

In one embodiment, in terms of time domain, the first resource pool is comprised of a positive integer number of time interval(s).

In one embodiment, in terms of frequency domain, the first resource pool is comprised of a positive integer number of subcarrier(s).

In one embodiment, in terms of frequency domain, the first resource pool is comprised of a positive integer number of cell(s).

In one embodiment, the first resource pool comprises resources defined from two dimensions.

In one subembodiment, the two dimensions comprise: serving cell and time interval.

In one subembodiment, the two dimensions comprise: time domain and frequency domain.

In one embodiment, on the one hand, the first resource pool comprises at least one serving cell; on the other hand, the first resource pool comprises at least one time interval.

In one embodiment, the first resource pool comprises a time interval on at least one serving cell.

In one embodiment, the first resource pool comprises a PDCCH monitoring occasion on at least one serving cell.

In one embodiment, a starting reference cell and a starting time interval for the first resource pool are configurable.

In one embodiment, the first resource pool is ended up to the current reference cell and the current time interval according to a first ordering rule.

In one embodiment, a start time of the first resource pool in time domain is no later than a start time of any DCI in the first DCI group in time domain.

In one embodiment, a limited number of {serving cell, time interval}-pair(s) can be defined in the first resource pool.

In one embodiment, at least one {serving cell, time interval}-pair can be defined in the first resource pool.

In one embodiment, the first resource pool comprises resources occupied by a limited number of {serving cell, time interval}-pair(s).

In one embodiment, the first resource pool comprises resources occupied by at least one {serving cell, time interval}-pair.

In one embodiment, a duration of the time interval does not exceed 1 slot.

In one embodiment, a duration of the time interval does not exceed 1 radio frame.

In one embodiment, a duration of the time interval does not exceed 1 sub-frame.

In one embodiment, a duration of the time interval is configurable.

In one embodiment, the time interval is a Physical Downlink Control CHannel (PDCCH) monitoring occasion.

In one embodiment, the time interval comprises at least one multicarrier symbol.

In one embodiment, durations of two different said time intervals are the same or different.

In one embodiment, the reference cell is a serving cell.

In one embodiment, a cell scheduled by a DCI is a serving cell.

In one embodiment, a first serving cell index sequence comprises indexes of all serving cells of the first node, and the indexes of the serving cells of the first node herein are arranged in an ascending order; cell indexes of all cells scheduled by any DCI in the first DCI group are the indexes of the serving cells of the first node herein, when there is more than one cell being scheduled by the said DCI in the first DCI group: positions of the cell indexes of all the cells scheduled by the said DCI in the first DCI group throughout the first serving cell index sequence are contiguous.

In one embodiment, a said index in the present disclosure is at a value of a non-negative integer.

In one embodiment, a said index in the present disclosure is at a value of a positive integer.

In one embodiment, a cell scheduled by any DCI in the first DCI group is a serving cell.

In one embodiment, cell(s) scheduled by any DCI in the first DCI group is(are): cell(s) used for transmitting PDSCH reception(s) or SPS PDSCH release(s) indicated by any said DCI in the first DCI group.

In one embodiment, cell(s) scheduled by any DCI in the first DCI group is(are): cell(s) comprising frequency-domain resources occupied by PDSCH reception(s) or SPS PDSCH release(s) indicated by any said DCI in the first DCI group.

In one embodiment, cell(s) scheduled by any DCI in the first DCI group is(are): cell(s) comprising frequency-domain resources occupied by PDSCH reception(s) indicated by any said DCI in the first DCI group or frequency-domain resources occupied by the said DCI itself in the first DCI group.

In one embodiment, cell(s) scheduled by first-type DCI(s) is(are): cell(s) comprising frequency-domain resources occupied by PDSCH reception(s) or SPS PDSCH release(s) indicated by the first-type DCI.

In one embodiment, cell(s) scheduled by first-type DCI(s) is(are): cell(s) comprising frequency-domain resources occupied by PDSCH reception(s) indicated by the first-type DCI(s) or frequency-domain resources occupied by the first-type DCI(s) itself.

In one embodiment, cell(s) scheduled by any DCI in the first DCI group is(are): cell(s) used for transmitting any said DCI in the first DCI group.

In one embodiment, cell(s) scheduled by any DCI in the first DCI group is(are): cell(s) comprising frequency-domain resources occupied by any said DCI in the first DCI group.

In one embodiment, the first HARQ-ACK bit sequence is transmitted on a physical layer channel, the first resource pool comprising a search space associated with the physical layer channel.

In one embodiment, the first HARQ-ACK bit sequence is transmitted on a physical layer channel, the first resource pool comprising a CCE associated with the physical layer channel.

In one embodiment, the first HARQ-ACK bit sequence is transmitted on a physical layer channel, the first resource pool comprising a PDCCH candidate associated with the physical layer channel.

In one embodiment, any said first-type DCI(s) indicates HARQ-ACK information transmitted in a physical layer channel.

In one embodiment, the physical layer channel is a PUCCH.

In one embodiment, the physical layer channel is a PUSCH.

In one embodiment, the first-type DCI(s) is(are) either DCI by which a maximum value of cell indexes of all cells scheduled is no greater than a cell index of the current reference cell, or DCI by which time-domain resources occupied belong to a time interval having an index smaller than that of the current time interval.

In one embodiment, for any DCI in the first DCI group, the first-type DCI(s) comprises the said DCI itself.

In one embodiment, when time-domain resources occupied by a DCI belong to the current time interval, an index of the time interval to which the time-domain resources occupied by the DCI belong is equal to an index of the current time interval.

In one embodiment, an index of the current time interval is a PDCCH monitoring occasion index.

In one embodiment, for any DCI in the first DCI group, the first-type DCI(s) comprises: either DCI by which a maximum value of cell indexes of all cells scheduled is less than a cell index of the current reference cell, or DCI by which time-domain resources occupied belong to a time interval having an index smaller than that of the current time interval, or, DCI by which a maximum value of cell indexes of all cells scheduled is equal to a cell index of the current reference cell, and by which time-domain resources occupied belong to the current time interval and which fulfills a first condition.

In one subembodiment, fulfillment of the first condition means: indicating a PDSCH reception in the current reference cell, of which a start time is earlier than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is earlier than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is no later than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is no later than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is later than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is later than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is no earlier than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is no earlier than that of a PDSCH reception in {the current reference cell, the current time interval}-pair indicated by any said DCI in the first DCI group.

In one embodiment, for any DCI in the first DCI group, the first-type DCI(s) is DCI that fulfills at least one of the following two conditions: DCI by which a maximum value of cell indexes of all cells scheduled is no greater than a cell index of the current reference cell, or DCI by which time-domain resources occupied belong to a time interval having an index smaller than that of the current time interval.

In one embodiment, for any DCI in the first DCI group, the first-type DCI(s) is DCI that fulfills at least one of the following two conditions: DCI by which a maximum value of cell indexes of all cells scheduled is smaller than a cell index of the current reference cell, or DCI by which time-domain resources occupied belong to a time interval having an index smaller than that of the current time interval.

In one embodiment, for any DCI in the first DCI group, the first-type DCI(s) other than the said any DCI in the first DCI group is DCI that fulfills at least one of the following two conditions: DCI by which a maximum value of cell indexes of all cells scheduled is smaller than a cell index of the current reference cell, or DCI by which time-domain resources occupied belong to a time interval having an index smaller than that of the current time interval.

In one embodiment, for any DCI in the first DCI group, the first-type DCI(s) is DCI that fulfills at least one of the following three conditions: DCI by which a maximum value of cell indexes of all cells scheduled is less than a cell index of the current reference cell, or DCI by which time-domain resources occupied belong to a time interval having an index smaller than that of the current time interval, or, DCI by which a maximum value of cell indexes of all cells scheduled is equal to a cell index of the current reference cell, and by which time-domain resources occupied belong to a time interval having an index equal to that of the current time interval and which fulfills a first condition.

In one subembodiment, fulfillment of the first condition means: indicating a PDSCH reception in the current reference cell, of which a start time is earlier than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is earlier than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is no later than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is no later than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is later than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is later than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is no earlier than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is no earlier than that of a PDSCH reception in {the current reference cell, the current time interval}-pair indicated by any said DCI in the first DCI group.

In one embodiment, for any DCI in the first DCI group, the first-type DCI(s) comprises DCI that fulfills at least one of the following two conditions: DCI by which a maximum value of cell indexes of all cells scheduled is no greater than a cell index of the current reference cell, or DCI by which time-domain resources occupied belong to a time interval having an index smaller than that of the current time interval.

In one embodiment, for any DCI in the first DCI group, the first-type DCI(s) comprises DCI that fulfills at least one of the following two conditions: DCI by which a maximum value of cell indexes of all cells scheduled is smaller than a cell index of the current reference cell, or DCI by which time-domain resources occupied belong to a time interval having an index smaller than that of the current time interval.

In one embodiment, for any DCI in the first DCI group, the first-type DCI(s) comprises DCI that fulfills at least one of the following three conditions: DCI by which a maximum value of cell indexes of all cells scheduled is less than a cell index of the current reference cell, or DCI by which time-domain resources occupied belong to a time interval having an index smaller than that of the current time interval, or, DCI by which a maximum value of cell indexes of all cells scheduled is equal to a cell index of the current reference cell, and by which time-domain resources occupied belong to the current time interval and which fulfills a first condition.

In one subembodiment, fulfillment of the first condition means: indicating a PDSCH reception in the current reference cell, of which a start time is earlier than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is earlier than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is no later than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is no later than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is later than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is later than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is no earlier than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is no earlier than that of a PDSCH reception in {the current reference cell, the current time interval}-pair indicated by any said DCI in the first DCI group.

In one embodiment, for any DCI in the first DCI group, the first-type DCI(s) does not comprise DCI by which a maximum value of cell indexes of all cells scheduled is greater than a cell index of the current reference cell, and by which time-domain resources occupied belong to a time interval having an index no smaller than that of the current time interval.

In one embodiment, for any DCI in the first DCI group, the first-type DCI(s) does not comprise DCI by which a maximum value of cell indexes of all cells scheduled is greater than a cell index of the current reference cell, and by which time-domain resources occupied belong to the current time interval.

In one embodiment, for any DCI in the first DCI group, the first-type DCI(s) does not comprise DCI by which a maximum value of cell indexes of all cells scheduled is no smaller than a cell index of the current reference cell, and by which time-domain resources occupied belong to a time interval having an index no smaller than that of the current time interval.

In one embodiment, for any DCI in the first DCI group, the first-type DCI(s) does not comprise DCI by which time-domain resources occupied belong to a time interval having an index greater than that of the current time interval.

In one embodiment, for any DCI in the first DCI group, the first-type DCI(s) does not comprise DCI by which a maximum value of cell indexes of all cells scheduled is equal to a cell index of the current reference cell, and by which time-domain resources occupied belong to the current time interval and which does not fulfill a first condition.

In one subembodiment, unfulfillment of the first condition means: indicating a PDSCH reception in the current reference cell, of which a start time is earlier than that of a PDSCH reception in the current reference cell indicated by any said DCI in the first DCI group.

In one subembodiment, unfulfillment of the first condition means: indicating {the current reference cell, the current time interval}-pair in which a start time of a PDSCH reception is earlier than that of a PDSCH reception in {the current reference cell, the current time interval}-pair indicated by any said DCI in the first DCI group.

In one subembodiment, unfulfillment of the first condition means: indicating a PDSCH reception in the current reference cell, of which a start time is no later than that of a PDSCH reception in the current reference cell indicated by any said DCI in the first DCI group.

In one subembodiment, unfulfillment of the first condition means: indicating {the current reference cell, the current time interval}-pair in which a start time of a PDSCH reception is no later than that of a PDSCH reception in {the current reference cell, the current time interval}-pair indicated by any said DCI in the first DCI group.

In one subembodiment, unfulfillment of the first condition means: indicating a PDSCH reception in the current reference cell, of which a start time is later than that of a PDSCH reception in the current reference cell indicated by any said DCI in the first DCI group.

In one subembodiment, unfulfillment of the first condition means: indicating {the current reference cell, the current time interval}-pair in which a start time of a PDSCH reception is later than that of a PDSCH reception in {the current reference cell, the current time interval}-pair indicated by any said DCI in the first DCI group.

In one subembodiment, unfulfillment of the first condition means: indicating a PDSCH reception in the current reference cell, of which a start time is no earlier than that of a PDSCH reception in the current reference cell indicated by any said DCI in the first DCI group.

In one subembodiment, unfulfillment of the first condition means: indicating {the current reference cell, the current time interval}-pair in which a start time of a PDSCH reception is no earlier than that of a PDSCH reception in {the current reference cell, the current time interval}-pair indicated by any said DCI in the first DCI group.

In one embodiment, each said first-type DCI(s) indicates transmitting HARQ-ACK information in a same slot.

In one embodiment, each said first-type DCI(s) indicates transmitting HARQ-ACK information in a same sub-slot.

In one embodiment, each said first-type DCI(s) indicates transmitting HARQ-ACK information in a same span.

In one embodiment, each said first-type DCI(s) is DCI being associated with the first HARQ-ACK bit sequence.

In one embodiment, each said first-type DCI(s) is associated with the first HARQ-ACK bit sequence.

In one embodiment, the first HARQ-ACK bit sequence comprises HARQ-ACK bit(s) being associated with the first-type DCI.

In one embodiment, the first HARQ-ACK bit sequence comprises all HARQ-ACK bits being associated with the first-type DCI.

In one embodiment, for any DCI in the first DCI group, the first-type DCI(s) is DCI comprised in the first DCI group.

In one embodiment, each {serving cell, time interval}-pair being associated with the first-type DCI(s) is comprised in the first resource pool.

In one embodiment, the accumulative number of the cell(s) scheduled by the first-type DCI(s) in the first resource pool up to the current reference cell and the current time interval is: an accumulative number of {serving cell, PDCCH monitoring occasion}-pair(s) associated with first-type DCI(s) in the first resource pool up to a current reference cell and a current PDCCH occasion.

In one embodiment, the accumulative number of the cell(s) scheduled by the first-type DCI(s) in the first resource pool up to the current reference cell and the current time interval is: an accumulative number of {serving cell, time interval}-pair(s) associated with first-type DCI(s) in a first resource pool up to the current reference cell and the current time interval.

In one embodiment, the accumulative number of the cell(s) scheduled by the first-type DCI(s) in the first resource pool up to the current reference cell and the current time interval is: an accumulative number of {serving cell, time interval}-pair(s) associated with first-type DCI(s) in a first resource pool up to the current reference cell and the current time interval according to a first ordering rule; the first ordering rule is a rule of ordering based on at least serving cell indexes and time interval indexes.

In one embodiment, the accumulative number of the cell(s) scheduled by the first-type DCI(s) in the first resource pool up to the current reference cell and the current time interval is: an accumulative number of {serving cell, time interval}-pair(s) associated with first-type DCI(s) up to the current reference cell and the current time interval according to a first ordering rule; the first ordering rule is a rule of ordering based on at least serving cell indexes and time interval indexes.

In one embodiment, the accumulative number of the cell(s) scheduled by the first-type DCI(s) in the first resource pool up to the current reference cell and the current time interval is: an accumulative number of cell(s) scheduled by first-type DCI(s) in a first resource pool up to a current reference cell and a current time interval according to a first ordering rule; the first ordering rule is a rule of ordering based on at least serving cell indexes and time interval indexes.

In one embodiment, for a same time interval: if multiple DCIs in multiple PDCCH receptions in the same time interval can schedule multiple PDSCH receptions on a same cell, the same cell is counted for multiple times.

In one embodiment, for a same time interval: if a number of PDSCH reception(s) that can be scheduled by multiple DCIs in multiple PDCCH receptions in the same time interval on a same cell is equal to L, the cell is counted for L time(s); L being a positive integer.

In one embodiment, for the first node, there is at most one PDSCH reception or SPS PDSCH release in each {serving cell, time interval}-pair.

In one embodiment, for the first node, there is at least one {serving cell, time interval}-pair in which PDSCH receptions or SPS PDSCH releases indicated by multiple DCIs can exist.

In one embodiment, the first node indicates support for that there is at most one PDSCH reception or SPS PDSCH release in each {serving cell, time interval}-pair.

In one embodiment, the first node indicates support for that there is at least one {serving cell, time interval}-pair in which PDSCH receptions or SPS PDSCH releases indicated by multiple DCIs can exist.

In one embodiment, the first node indicates that support is provided for a D SCH-Number-perMOperCell.

In one embodiment, the first node indicates that support is not provided for D SCH-Number-perMOperCell.

In one embodiment, any DCI in the first DCI group comprises at most one counter DAI field.

In one embodiment, any DCI in the first DCI group comprises only one counter DAI field.

In one embodiment, there isn't any DCI comprising multiple counter DAI fields in the first DCI group.

In one embodiment, time-domain resources occupied by any DCI in the first DCI group comprises at least one multicarrier symbol.

In one embodiment, the first-type DCI(s) comprises at most one counter DAI field.

In one embodiment, the first-type DCI(s) comprises only one counter DAI field.

In one embodiment, the first field is an indication field.

In one embodiment, the first field is used for counting.

In one embodiment, the first field is a Downlink Assignment Indicator (DAI) field.

In one embodiment, the first field is a counter DAI field.

In one embodiment, the first field comprises 1 bit.

In one embodiment, the first field comprises 2 bits.

In one embodiment, the first field comprises 3 bits.

In one embodiment, the first field comprises 4 bits.

In one embodiment, the first field comprises no more than 32 bits.

In one embodiment, a value in the first field is 1 or 2.

In one embodiment, a value in the first field is one of 1, 2, 3 or 4.

In one embodiment, a value in the first field is one of 1, 2, 3, 4, 5, 6, 7 or 8.

In one embodiment, a value in the first field is one of 1, 2, 3, 4, 5, 6, 7, 8, 9, 10, 11, 12, 13, 14, 15 or 16.

In one embodiment, a value in the first field is one of 0, 1, 2 or 3.

In one embodiment, a value in the first field is one of 0 through 7.

In one embodiment, a DCI in the first DCI group schedules one or more cells.

In one embodiment, a number of cell(s) scheduled by a DCI in the first DCI group is 1 or 2.

In one embodiment, all DCIS in the first DCI group schedule equal numbers of cells.

In one embodiment, a number of cells scheduled by any DCI in the first DCI group is no greater than 65536.

In one embodiment, there are two DCIS in the first DCI group that schedule different numbers of cells.

In one embodiment, a number of cells scheduled by each DCI in the first DCI group is equal to 2.

In one embodiment, one DCI in the first DCI group schedules one cell, and another DCI in the first DCI group schedules more than one cell.

In one embodiment, one DCI in the first DCI group schedules one cell, and another DCI in the first DCI group schedules 2 cells.

In one embodiment, any DCI in the first DCI group occupies a positive integer number of multicarrier symbol(s) in time domain.

In one embodiment, any DCI in the first DCI group occupies a positive integer number of subcarrier(s) in frequency domain.

In one embodiment, any DCI in the first DCI group occupies at least one RE.

In one embodiment, a said cell index is one of 0 through 31.

In one embodiment, a said cell index is a positive integer no greater than 31.

In one embodiment, a said cell index is a positive integer no greater than 8192.

In one embodiment, a said cell index is a Physical Cell Identity (PCI).

In one embodiment, the cell index in the present disclosure is a serving cell index.

In one embodiment, a said serving cell index is configured by a SCellIndex parameter.

In one embodiment, a said serving cell index is configured by a ServCellIndex parameter.

In one embodiment, a said serving cell index is 0.

In one embodiment, a said serving cell index is a positive integer.

In one embodiment, a said serving cell index is a positive integer no greater than 31.

In one embodiment, a said serving cell index is a positive integer no greater than 8192.

In one embodiment, one or more said serving cell indexes is(are) configured in CellGroupConfig.

In one embodiment, a range of values of a said serving cell index is a subset of a range of values of a said cell index.

In one embodiment, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; time-domain resources occupied by any said DCI in the first DCI group belong to the current time interval; a number of cell(s) scheduled by the said DCI in the first DCI group is equal to or greater than 1; when the number of cell(s) scheduled by the said DCI in the first DCI group is equal to 1, the current reference cell is a cell scheduled by the said DCI in the first DCI group; when the number of cell(s) scheduled by the said DCI in the first DCI group is greater than 1, the current reference cell is a cell having a maximum cell index of the cells scheduled by the said DCI in the first DCI group.

In one embodiment, when a DCI is used for indicating time-frequency resources occupied by a data channel on a cell, the DCI schedules the cell.

In one embodiment, when a DCI is used for releasing time-frequency resources occupied by a data channel on a cell, the DCI schedules the cell.

In one embodiment, the data channel comprises a PDSCH.

In one embodiment, the data channel comprises a DL-SCH.

In one embodiment, the data channel comprises a PUSCH.

In one embodiment, the data channel comprises a UL-SCH.

In one embodiment, when a DCI is used for configuring a TCI state on a cell, the DCI schedules the cell.

In one embodiment, when a DCI is used for configuring a transmit (Tx) power on a cell, the DCI schedules the cell.

In one embodiment, the first fields in multiple DCIs in the first DCI group are jointly used to determine whether there is a missed detection of DCI.

In one embodiment, an accumulative number indicated by the first field in a DCI in the first DCI group is equal to a value of the first field in the said DCI in the first DCI group plus a product of i and 2 to the Q-th power; the i is 0 or a positive integer, and Q is a number of bit(s) comprised in the first field in the said DCI in the first DCI group.

In one embodiment, the phrase "up to a(the) current reference cell and a(the) current time interval" in the present disclosure means: up to the current reference cell and the current time interval according to a first ordering rule.

Embodiment 2

Figure 2:
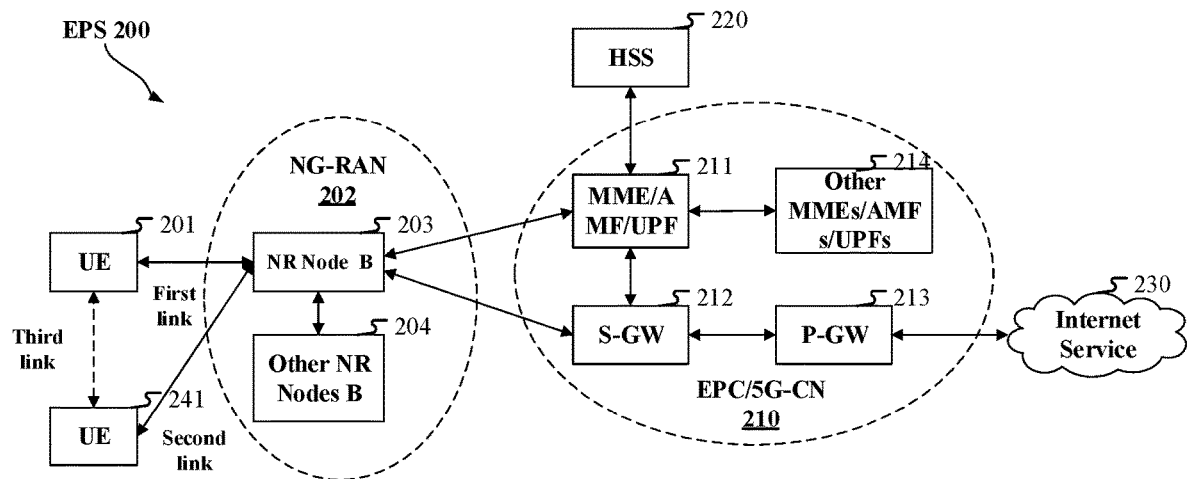
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LIE-A) systems. The 5G NR or LIE network architecture 200 may be called an Evolved Packet System (EPS) 200 or other suitable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 corresponds to the second node in the present disclosure.

In one embodiment, the UE 241 corresponds to the second node in the present disclosure.

In one embodiment, the UE 241 corresponds to the first node in the present disclosure.

In one embodiment, the gNB203 corresponds to the first node in the present disclosure.

In one embodiment, the gNB203 corresponds to the second node in the present disclosure.

In one embodiment, the UE 201 corresponds to the first node in the present disclosure, and the gNB203 corresponds to the second node in the present disclosure.

In one embodiment, the gNB203 is a MarcoCellular base station.

In one embodiment, the gNB203 is a Micro Cell base station.

In one embodiment, the gNB203 is a PicoCell base station.

In one embodiment, the gNB203 is a Femtocell.

In one embodiment, the gNB203 is a base station supporting large time-delay difference.

In one embodiment, the gNB203 is a flight platform.

In one embodiment, the gNB203 is satellite equipment.

In one embodiment, the first node and the second node correspond to the UE 201, for instance, V2X communications is performed between the first node and the second node.

Embodiment 3

Figure 3:
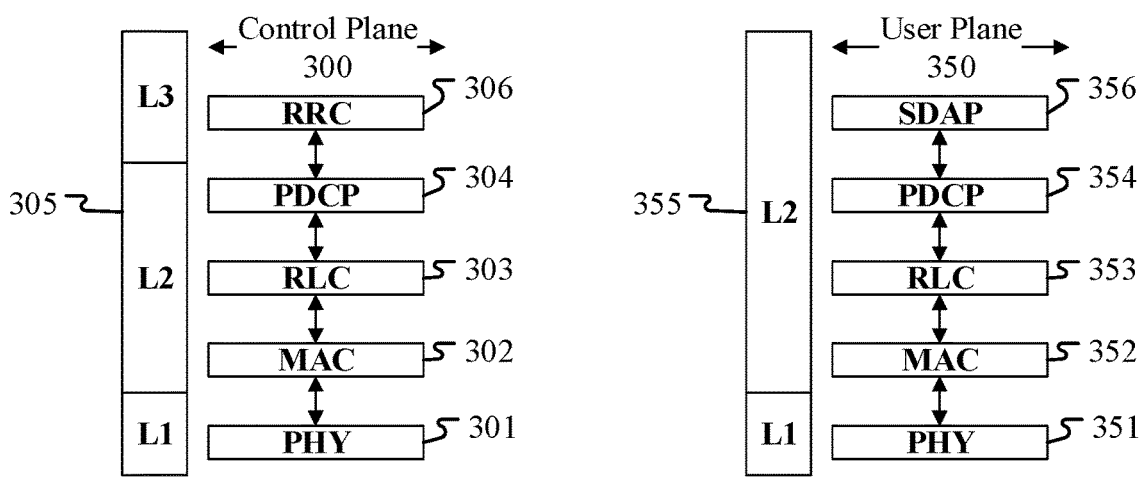
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, DCI in the first DCI group in the present disclosure is generated by the PHY 301.

In one embodiment, DCI in the first DCI group in the present disclosure is generated by the PHY 351.

In one embodiment, the first HARQ-ACK bit sequence in the present disclosure is generated by the MAC sublayer 302.

In one embodiment, the first HARQ-ACK bit sequence in the present disclosure is generated by the MAC sublayer 352.

In one embodiment, the first HARQ-ACK bit sequence in the present disclosure is generated by the PHY 301.

In one embodiment, the first HARQ-ACK bit sequence in the present disclosure is generated by the PHY 351.

Embodiment 4

Figure 4:
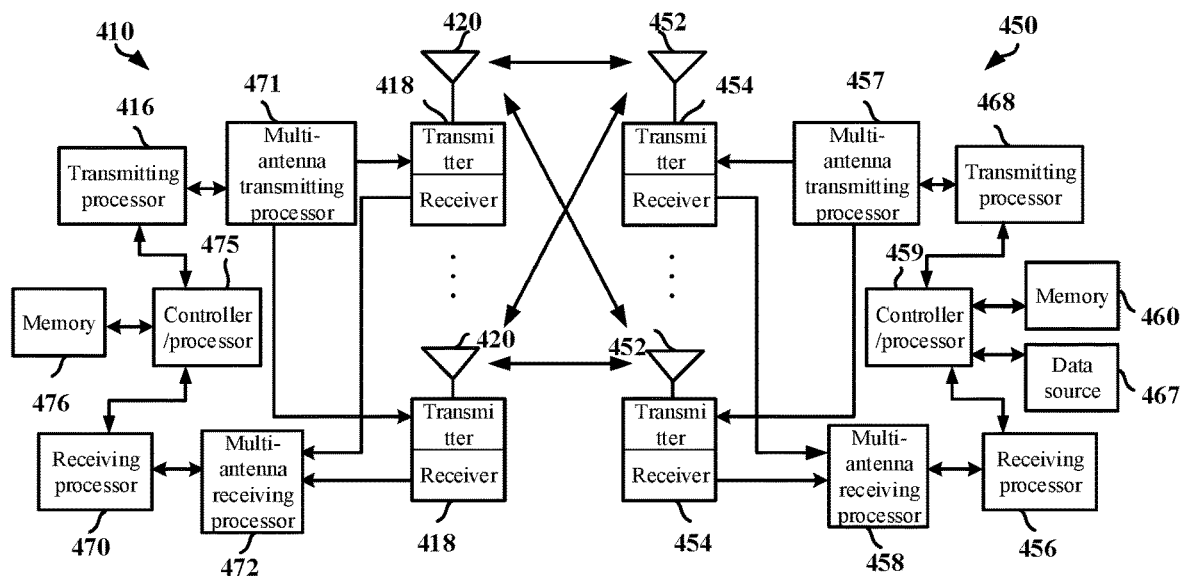
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In such transmission, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second communication device 450 comprises: at least one controller/processor; the at least one controller/processor is in charge of HARQ operation.

In one embodiment, the first communication device 410 comprises: at least one controller/processor; the at least one controller/processor is in charge of HARQ operation.

In one embodiment, the first communication device 410 comprises: at least one controller/processor; the at least one controller/processor is in charge of error detections using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives a first DCI group in the present disclosure, the first DCI group comprising at least one DCI; and transmits a first signal in the present disclosure, the first signal carrying a first HARQ-ACK bit sequence in the present disclosure; herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one subembodiment, the second communication device 450 corresponds to the first node in the present disclosure.

In one embodiment, the second communication device 450 comprises a memory that stores computer readable instruction program, the computer readable instruction program generates an action when executed by at least one processor, which includes: receiving a first DCI group, the first DCI group comprising at least one DCI; and transmitting a first signal, the first signal carrying a first HARQ-ACK bit sequence; herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one subembodiment, the second communication device 450 corresponds to the first node in the present disclosure.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits a first DCI group, the first DCI group comprising at least one DCI; and receives a first signal, the first signal carrying a first HARQ-ACK bit sequence; herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one subembodiment, the first communication device 410 corresponds to the second node in the present disclosure.

In one embodiment, the first communication device 410 comprises a memory that stores computer readable instruction program, the computer readable instruction program generates an action when executed by at least one processor, which includes: transmitting a first DCI group, the first DCI group comprising at least one DCI; and receiving a first signal, the first signal carrying a first HARQ-ACK bit sequence; herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used for receiving the first DCI group in the present disclosure.

In one embodiment, at least one of the antenna 420, the transmitter 418, the multi-antenna transmitting processor 471, the transmitting processor 416, the controller/processor 475 or the memory 476 is used for transmitting the first DCI group in the present disclosure.

In one embodiment, at least one of the antenna 452, the receiver 454, the multi-antenna receiving processor 458, the receiving processor 456, the controller/processor 459, the memory 460, or the data source 467 is used for receiving on the first channel in the present disclosure.

In one embodiment, at least one of the antenna 420, the transmitter 418, the multi-antenna transmitting processor 471, the transmitting processor 416, the controller/processor 475 or the memory 476 is used for transmitting on the first channel in the present disclosure.

In one embodiment, at least one of the antenna 452, the receiver 454, the multi-antenna receiving processor 458, the receiving processor 456, the controller/processor 459, the memory 460, or the data source 467 is used for receiving on the second channel in the present disclosure.

In one embodiment, at least one of the antenna 420, the transmitter 418, the multi-antenna transmitting processor 471, the transmitting processor 416, the controller/processor 475 or the memory 476 is used for transmitting on the second channel in the present disclosure.

In one embodiment, at least one of the antenna 452, the receiver 454, the multi-antenna receiving processor 458, the receiving processor 456, the controller/processor 459, the memory 460, or the data source 467 is used for receiving on the third channel in the present disclosure.

In one embodiment, at least one of the antenna 420, the transmitter 418, the multi-antenna transmitting processor 471, the transmitting processor 416, the controller/processor 475 or the memory 476 is used for transmitting on the third channel in the present disclosure.

In one embodiment, at least one of the antenna 452, the transmitter 454, the multi-antenna transmitting processor 468, the controller/processor 459, the memory 460 or the data source 467 is used for transmitting the first signal in the present disclosure.

In one embodiment, at least one of the antenna 420, the receiver 418, the multi-antenna receiving processor 472, the receiving processor 470, the controller/processor 475, or the memory 476 is used for receiving the first signal in the present disclosure.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives a first DCI group, the first DCI group comprising at least one DCI; and transmits a first signal, the first signal carrying a first HARQ-ACK bit sequence; herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index of cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

In one subembodiment, the second communication device 450 corresponds to the first node in the present disclosure.

In one embodiment, the second communication device 450 comprises a memory that stores computer readable instruction program, the computer readable instruction program generates an action when executed by at least one processor, which includes: receiving a first DCI group, the first DCI group comprising at least one DCI; and transmitting a first signal, the first signal carrying a first HARQ-ACK bit sequence; herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index of cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

In one subembodiment, the second communication device 450 corresponds to the first node in the present disclosure.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits a first DCI group, the first DCI group comprising at least one DCI; and receives a first signal, the first signal carrying a first HARQ-ACK bit sequence; herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index of cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

In one subembodiment, the first communication device 410 corresponds to the second node in the present disclosure.

In one embodiment, the first communication device 410 comprises a memory that stores computer readable instruction program, the computer readable instruction program generates an action when executed by at least one processor, which includes: transmitting a first DCI group, the first DCI group comprising at least one DCI; and receiving a first signal, the first signal carrying a first HARQ-ACK bit sequence; herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index of cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used for receiving the first DCI group in the present disclosure.

In one embodiment, at least one of the antenna 420, the transmitter 418, the multi-antenna transmitting processor 471, the transmitting processor 416, the controller/processor 475 or the memory 476 is used for transmitting the first DCI group in the present disclosure.

In one embodiment, at least one of the antenna 452, the receiver 454, the multi-antenna receiving processor 458, the receiving processor 456, the controller/processor 459, the memory 460, or the data source 467 is used for receiving on the first channel in the present disclosure.

In one embodiment, at least one of the antenna 420, the transmitter 418, the multi-antenna transmitting processor 471, the transmitting processor 416, the controller/processor 475 or the memory 476 is used for transmitting on the first channel in the present disclosure.

In one embodiment, at least one of the antenna 452, the receiver 454, the multi-antenna receiving processor 458, the receiving processor 456, the controller/processor 459, the memory 460, or the data source 467 is used for receiving on the second channel in the present disclosure.

In one embodiment, at least one of the antenna 420, the transmitter 418, the multi-antenna transmitting processor 471, the transmitting processor 416, the controller/processor 475 or the memory 476 is used for transmitting on the second channel in the present disclosure.

In one embodiment, at least one of the antenna 452, the receiver 454, the multi-antenna receiving processor 458, the receiving processor 456, the controller/processor 459, the memory 460, or the data source 467 is used for receiving on the third channel in the present disclosure.

In one embodiment, at least one of the antenna 420, the transmitter 418, the multi-antenna transmitting processor 471, the transmitting processor 416, the controller/processor 475 or the memory 476 is used for transmitting on the third channel in the present disclosure.

In one embodiment, at least one of the antenna 452, the transmitter 454, the multi-antenna transmitting processor 468, the controller/processor 459, the memory 460 or the data source 467 is used for transmitting the first signal in the present disclosure.

In one embodiment, at least one of the antenna 420, the receiver 418, the multi-antenna receiving processor 472, the receiving processor 470, the controller/processor 475, or the memory 476 is used for receiving the first signal in the present disclosure.

Embodiment 5

Figure 5:
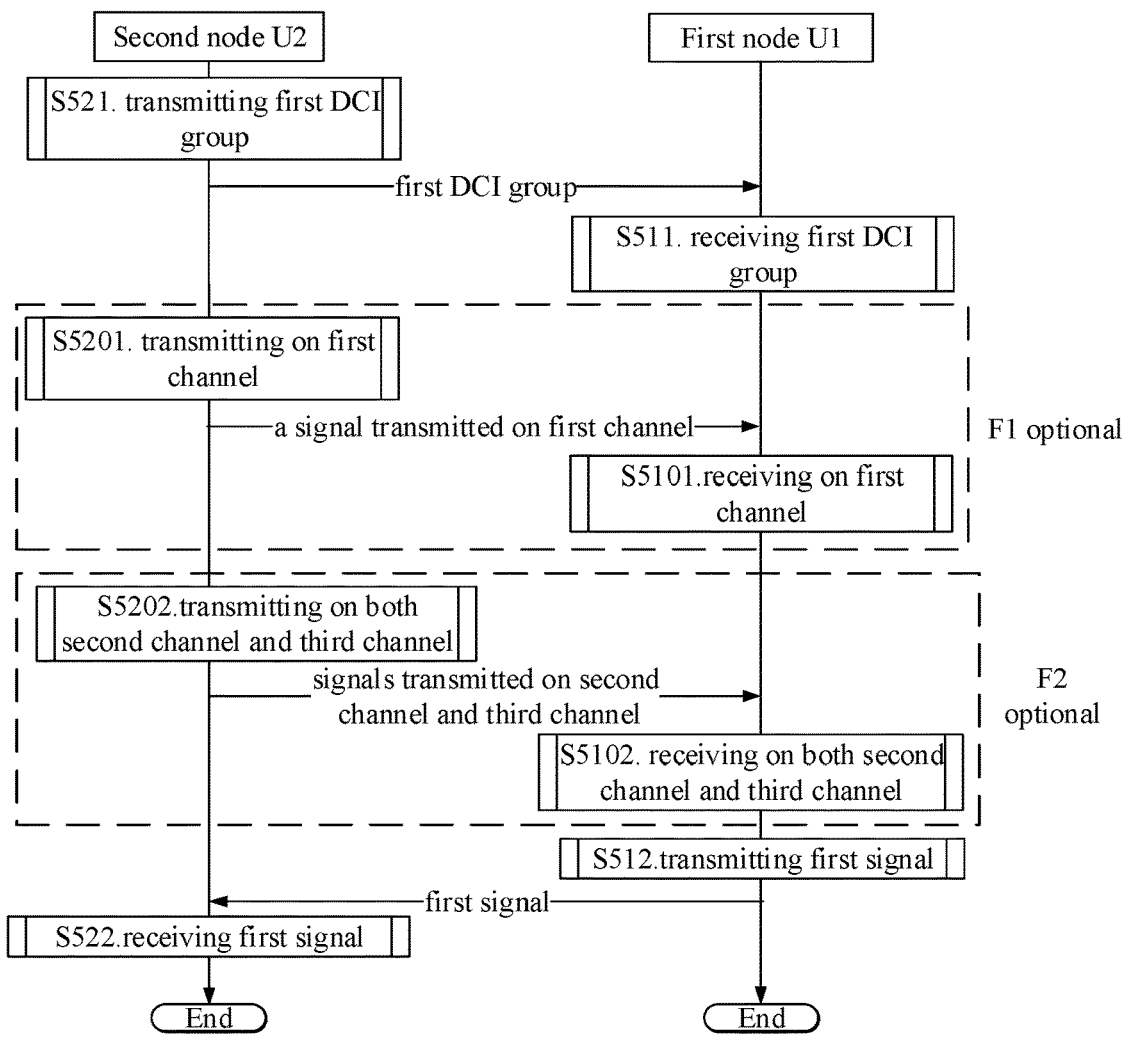
FIG. 5 illustrates a flowchart of signal transmission according to one embodiment of the present disclosure.

Embodiment 5 illustrates a flowchart of signal transmission according to one embodiment of the present disclosure, as shown in FIG. 5. In FIG. 5, a first node U1 and a second U2 are in communications via an air interface. In FIG. 5, steps marked by the dotted-line frame boxes F1 and F2 are optional, respectively. Particularly, where the steps in the boxes F1 and F2 are located in FIG. 5 do not denote a specific chronological order.

The first node U1 receives a first DCI group in step S511; receives on a first channel in step S5101; receives on both a second channel and a third channel in step S5102; and transmits a first signal in step S512.

The second node U2 transmits a first DCI group in step S521; transmits on a first channel in step S5201; transmits on both a second channel and a third channel in step S5202; and receives a first signal in step S522.

In Embodiment 5, the first DCI group comprises at least one DCI; and the first signal carries a first HARQ-ACK bit sequence; for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell; one DCI in the first DCI group comprises configuration information for the first channel; (the other) one DCI in the first DCI group comprises configuration information for the second channel and the third channel; the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group; the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

In one subembodiment of the Embodiment 5, the accumulative number of the cell(s) scheduled by the first-type DCI(s) in the first resource pool up to the current reference cell and the current time interval is: an accumulative number of {serving cell, PDCCH monitoring occasion}-pair(s) associated with first-type DCI(s) up to a current reference cell and a current PDCCH monitoring occasion.

In one subembodiment of the Embodiment 5, the accumulative number of the cell(s) scheduled by the first-type DCI(s) in the first resource pool up to the current reference cell and the current time interval is: an accumulative number of {serving cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

In one embodiment, the first node U1 is the first node in the present disclosure.

In one embodiment, the second node U2 is the second node in the present disclosure.

In one embodiment, the first node U1 is a UE.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 includes a cellular link.

In one embodiment, an air interface between the second node U2 and the first node U1 is a PC5 interface.

In one embodiment, an air interface between the second node U2 and the first node U1 includes a sidelink.

In one embodiment, an air interface between the second node U2 and the first node U1 includes a radio interface between a base station and a UE.

In one embodiment, the default cell index is: a maximum cell index.

In one embodiment, the first channel comprises a physical layer channel.

In one embodiment, the first channel comprises a PDSCH.

In one embodiment, the configuration information in the present disclosure comprises: at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), periodicity, an transmission antenna port, or a corresponding Transmission Configuration Indicator (TCI) state.

In one embodiment, a DCI in the first DCI group indicates time-domain resources occupied by the first channel.

In one embodiment, a DCI in the first DCI group indicates frequency-domain resources occupied by the first channel.

In one embodiment, a DCI in the first DCI group indicates an MCS of a bit block transmitted on the first channel.

In one embodiment, a DCI in the first DCI group indicates an RV for a bit block transmitted on the first channel.

In one embodiment, when the number of cell(s) scheduled by a DCI in the first DCI group is equal to 1, the DCI in the first DCI group indicates a PDSCH reception or an SPS PDSCH release.

In one embodiment, when the number of cell(s) scheduled by a DCI in the first DCI group is equal to 1, the DCI in the first DCI group comprises at most one HARQ process number field.

In one embodiment, when the number of cell(s) scheduled by a DCI in the first DCI group is equal to 1, the DCI in the first DCI group comprises at most one ZP CSI-RS trigger field.

In one embodiment, when the number of cell(s) scheduled by a DCI in the first DCI group is equal to 1, the DCI in the first DCI group comprises at most one SRS request field.

In one embodiment, when the number of cell(s) scheduled by a DCI in the first DCI group is equal to 1, the DCI in the first DCI group comprises at most one Rate matching indicator field.

In one embodiment, the second channel comprises a physical layer channel.

In one embodiment, the second channel comprises a PDSCH.

In one embodiment, the third channel comprises a physical layer channel.

In one embodiment, the third channel comprises a PDSCH.

In one embodiment, the second channel and the third channel respectively belong to different serving cells.

In one embodiment, a Transport Block (TB) transmitted on the second channel is different from a TB transmitted on the third channel.

In one embodiment, a TB transmitted on the second channel is the same as a TB transmitted on the third channel.

In one embodiment, REs comprised in the second channel and REs comprised in the third channel are non-overlapping.

In one embodiment, the second channel and the third channel respectively occupy different frequency-domain resources.

In one embodiment, the second channel and the third channel respectively occupy different or the same time-domain resources.

In one embodiment, a DCI in the first DCI group indicates time-domain resources occupied by the second channel and time-domain resources occupied by the third channel.

In one embodiment, a DCI in the first DCI group indicates frequency-domain resources occupied by the second channel and frequency-domain resources occupied by the third channel.

In one embodiment, a DCI in the first DCI group indicates an MCS of a bit block transmitted on the second channel and an MCS of another bit block on the third channel.

In one embodiment, a DCI in the first DCI group indicates an RV for a bit block transmitted on the second channel and an RV for another bit block on the third channel.

In one embodiment, the number of cell(s) scheduled by a DCI in the first DCI group is greater than 1, and the DCI in the first DCI group indicates PDSCH receptions on multiple cells.

In one embodiment, the number of cell(s) scheduled by a DCI in the first DCI group is greater than 1, and the DCI in the first DCI group comprises multiple NDI fields for multiple cells scheduled by the DCI in the first DCI group.

In one embodiment, the number of cell(s) scheduled by a DCI in the first DCI group is greater than 1, and the DCI in the first DCI group comprises multiple RV fields for multiple cells scheduled by the DCI in the first DCI group.

In one embodiment, the number of cell(s) scheduled by a DCI in the first DCI group is greater than 1, and the DCI in the first DCI group comprises multiple MCS fields for multiple cells scheduled by the DCI in the first DCI group.

In one embodiment, the number of cell(s) scheduled by a DCI in the first DCI group is greater than 1, and the DCI in the first DCI group comprises a HARQ process number field.

In one embodiment, the number of cell(s) scheduled by a DCI in the first DCI group is greater than 1, and the DCI in the first DCI group comprises a ZP CSI-RS trigger field.

In one embodiment, the number of cell(s) scheduled by a DCI in the first DCI group is greater than 1, and the DCI in the first DCI group comprises an SRS request field.

In one embodiment, the number of cell(s) scheduled by a DCI in the first DCI group is greater than 1, and the DCI in the first DCI group comprises a Rate matching indicator field.

In one embodiment, the number of cell(s) scheduled by a DCI in the first DCI group is greater than 1, and the DCI in the first DCI group comprises multiple HARQ process number fields.

In one embodiment, the number of cell(s) scheduled by a DCI in the first DCI group is greater than 1, and the DCI in the first DCI group comprises multiple ZP CSI-RS trigger fields.

In one embodiment, the number of cell(s) scheduled by a DCI in the first DCI group is greater than 1, and the DCI in the first DCI group comprises multiple SRS request fields.

In one embodiment, the number of cell(s) scheduled by a DCI in the first DCI group is greater than 1, and the DCI in the first DCI group comprises multiple Rate matching indicator fields.

In one embodiment, the DCI in the first DCI group comprises a total DAI field.

In one embodiment, the steps marked by the dotted-line box F1 in FIG. 5 exist.

In one embodiment, the steps marked by the dotted-line box F1 in FIG. 5 do not exist.

In one embodiment, the steps marked by the dotted-line box F2 in FIG. 5 exist.

In one embodiment, the steps marked by the dotted-line box F2 in FIG. 5 do not exist.

Embodiment 6

Embodiment 6 illustrates a schematic diagram of an accumulative number of cell(s) scheduled by first-type DCI(s) in a first resource pool up to a current reference cell and a current time interval according to one embodiment of the present disclosure, as shown in FIG. 6.

In Embodiment 6, an accumulative number of cell(s) scheduled by first-type DCI(s) in a first resource pool up to a current reference cell and a current time interval is: an accumulative number of {serving cell, PDCCH monitoring occasion}-pair(s) associated with first-type DCI(s) up to a current reference cell and a current PDCCH monitoring occasion.

In one embodiment, the {serving cell, PDCCH monitoring occasion}-pair(s) associated with the first-type DCI(s) is(are): {serving cell, PDCCH monitoring occasion}-pair(s) in which there is(are) PDSCH reception(s) or SPS PDSCH release(s) being associated with the first-type DCI.

In one embodiment, the {serving cell, PDCCH monitoring occasion}-pair(s) associated with the first-type DCI(s) is(are): {serving cell, PDCCH monitoring occasion}-pair(s) in which there is(are) PDSCH reception(s) or SPS PDSCH release(s) being indicated by the first-type DCI.

In one embodiment, a said PDCCH monitoring occasion is used for monitoring DCI.

In one embodiment, a said PDCCH monitoring occasion is used for monitoring PDCCH(s).

In one embodiment, a said PDCCH monitoring occasion is used for monitoring PDCCH candidate(s).

In one embodiment, a said PDCCH monitoring occasion is comprised of a positive integer number of multicarrier symbol(s) in time domain.

Embodiment 7

Embodiment 7 illustrates a schematic diagram of an accumulative number of cell(s) scheduled by first-type DCI(s) in a first resource pool up to a current reference cell and a current time interval according to one embodiment of the present disclosure, as shown in FIG. 7.

In Embodiment 7, an accumulative number of cell(s) scheduled by first-type DCI(s) in a first resource pool up to a current reference cell and a current time interval is: an accumulative number of {serving cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

In one embodiment, the {serving cell, time interval}-pair(s) associated with the first-type DCI(s) is(are): {serving cell, time interval}-pair(s) in which there is(are) PDSCH reception(s) or SPS PDSCH release(s) associated with the first-type DCI.

In one embodiment, the {serving cell, time interval}-pair(s) associated with the first-type DCI(s) is(are): {serving cell, time interval}-pair(s) in which there is(are) PDSCH reception(s) or SPS PDSCH release(s) indicated by the first-type DCI.

In one embodiment, in terms of time-frequency domain, the {serving cell, time interval}-pair(s) associated with the first-type DCI(s) comprises(comprise): time-frequency resources occupied by PDSCH reception(s) or SPS PDSCH release(s) indicated by the first-type DCI.

In one embodiment, the {serving cell, time interval}-pair(s) associated with the first-type DCI(s) is(are): {serving cell, time interval}-pair(s) in which there is(are) the first-type DCI.

In one embodiment, in terms of time-frequency domain, the {serving cell, time interval}-pair(s) associated with the first-type DCI(s) comprises(comprise): time-frequency resources occupied by the first-type DCI.

In one embodiment, the first ordering rule is an ordering rule based on serving cell indexes and time interval indexes.

In one embodiment, the first ordering rule is an ordering rule based on serving cell indexes and time interval indexes as well as other information.

In one embodiment, the first ordering rule comprises: firstly in an ascending order of start times of reception for data channels associated with a same {serving cell, PDCCH monitoring occasion}-pair, secondly in an ascending order of serving cell indexes, and finally in an ascending order of PDCCH monitoring occasion indexes.

In one embodiment, the first ordering rule comprises: firstly in an ascending order of serving cell indexes, and then in an ascending order of PDCCH monitoring occasion indexes.

In one embodiment, the first ordering rule comprises: an increasing order/ascending order of start times of reception for data channels existent in a same {serving cell, time interval}-pair comes first, an ascending order of serving cell indexes comes second, and an ascending order of time interval indexes comes last.

In one embodiment, the first ordering rule comprises: an ascending order of serving cell indexes comes first, and an ascending order of time interval indexes comes second.

In one embodiment, the first ordering rule comprises: an increasing order/ascending order of start times of reception for data channels existent in a same {serving cell, PDCCH monitoring occasion}-pair comes first, an ascending order of serving cell indexes comes second, and an ascending order of PDCCH monitoring occasion indexes comes last.

In one embodiment, the first ordering rule comprises: an ascending order of serving cell indexes comes first, and an ascending order of PDCCH monitoring occasion indexes comes second.

In one embodiment, the first ordering rule comprises: a decreasing order/descending order of start times of reception for data channels existent in a same {serving cell, time interval}-pair comes first, a descending order of serving cell indexes comes second, and a descending order of time interval indexes comes last.

In one embodiment, the first ordering rule comprises: a descending order of serving cell indexes comes first, and a descending order of time interval indexes comes second.

In one embodiment, the first ordering rule comprises: an increasing order/a descending order of start times of reception for data channels existent in a same {serving cell, time interval}-pair comes first, an increasing order/a descending order of serving cell indexes comes second, and an increasing order/a descending order of time interval indexes comes last.

In one embodiment, the first ordering rule comprises: an increasing order/a descending order of serving cell indexes comes first, and an increasing order/a descending order of time interval indexes comes second.

In one embodiment, the first ordering rule comprises: an increasing order/a descending order of time interval indexes comes first, and an increasing order/a descending order of serving cell indexes comes second.

Embodiment 8

Embodiment 8 illustrates a schematic diagram of relations among a first HARQ-ACK bit sequence, any DCI in a first DCI group and a first field comprised in the any DCI in the first DCI group according to one embodiment of the present disclosure, as shown in FIG. 8.

In Embodiment 8, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on a first field comprised in the DCI in the first DCI group.

In one embodiment, the first HARQ-ACK bit sequence comprises HARQ-ACK information bits.

In one embodiment, the first HARQ-ACK bit sequence comprises a positive integer number of bits.

In one embodiment, the first HARQ-ACK bit sequence comprises a positive integer number of ACKs or NACKs.

In one embodiment, the first HARQ-ACK bit sequence comprises a HARQ-ACK codebook (or, sub-codebook) based on Transport Blocks (TBs).

In one embodiment, each HARQ-ACK bit in the first HARQ-ACK bit sequence is for a HARQ-ACK bit based on a TB PDSCH reception or an SPS PDSCH release.

In one embodiment, the first HARQ-ACK bit sequence comprises a HARQ-ACK codebook (or, sub-codebook).

In one embodiment, the first HARQ-ACK bit sequence comprises a Type-2 HARQ-ACK codebook (or, sub-codebook).

In one embodiment, the first HARQ-ACK bit sequence is transmitted on a physical layer channel.

In one embodiment, the first HARQ-ACK bit sequence is transmitted on a PUCCH.

In one embodiment, the first HARQ-ACK bit sequence is transmitted on a PUSCH.

In one embodiment, the first HARQ-ACK bit sequence comprises (a) HARQ-ACK bit block(s) associated with at least one DCI in the first DCI group.

In one embodiment, each HARQ-ACK bit block associated with any DCI in the first DCI group is a bit block in the first HARQ-ACK bit sequence.

In one embodiment, the first HARQ-ACK bit sequence comprises a HARQ-ACK bit block associated with any DCI in the first DCI group.

In one embodiment, a HARQ-ACK bit block associated with a DCI in the first DCI group is: a bit block comprising HARQ-ACK information bits generated for a PDSCH reception or an SPS PDSCH release indicated by the DCI in the first DCI group.

In one embodiment, the HARQ-ACK bit block in the present disclosure comprises a positive integer number of HARQ-ACK bit(s).

In one embodiment, the HARQ-ACK bit block in the present disclosure comprises a HARQ-ACK bit in the first HARQ-ACK bit sequence or a HARQ-ACK bit sub-sequence in the first HARQ-ACK bit sequence.

In one embodiment, for any DCI in the first DCI group, the HARQ-ACK bit block being associated is determined in accordance with a pseudo-code which determines HARQ-ACK information bits, specified in 3GPP TS38.213, Chapter 9.1.3.1; a value in the first field comprised in the DCI in the first DCI group is a value of a counter DAI in 3GPP TS38.213, Chapter 9.1.3.1.

In one embodiment, the first HARQ-ACK bit sequence comprises $O_{ACK}$ HARQ-ACK bits which are $$\tilde{o}_0^{ACK}, \tilde{o}_1^{ACK}, \ldots, \tilde{o}_{O^{ACK}-1}^{ACK}.$$

In one embodiment, a HARQ-ACK bit block being associated with a DCI in the first DCI group comprises at least one ACK or NACK.

In one embodiment, a HARQ-ACK bit block being associated with a DCI in the first DCI group comprises: HARQ-ACK bits indicating whether a PDSCH reception or SPS PDSCH release indicated by the DCI in the first DCI group is correctly received.

In one embodiment, a HARQ-ACK bit block being associated with any DCI in the first DCI group comprises at least one bit comprised in the first HARQ-ACK bit sequence; the at least one bit comprised in the first HARQ-ACK bit sequence has a sequence number in the first HARQ-ACK bit sequence which is a function of a value of the first field in the DCI in the first DCI group.

In one embodiment, in the first HARQ-ACK bit sequence, a number of HARQ-ACK bits comprised in a HARQ-ACK bit block associated with any DCI in the first DCI group is linear with a number of cells being scheduled.

In one embodiment, harq-ACK-SpatialBundlingPUCCH is not provided.

In one embodiment, harq-ACK-SpatialBundlingPUCCH is provided.

In one embodiment, maxNrofCodeWordsScheduledByDCI is configured to be 1 (or n1).

In one embodiment, maxNrofCodeWordsScheduledByDCI is configured to be 2 (or n2).

In one embodiment, harq-ACK-SpatialBundlingPUCCH is not provided, besides, the first node is configured with reception of two TBs in at least one Downlink BandWidth Part (BWP) being configured in at least one serving cell through maxNrofCodeWordsScheduledByDCI.

In one embodiment, harq-ACK-SpatialBundlingPUCCH is provided, or, the first node is not configured with reception of two TBs in at least one Downlink BWP being configured in at least one serving cell through maxNrofCodeWordsScheduledByDCI.

In one embodiment, when a number of cell(s) scheduled by a DCI in the first DCI group is equal to 1: a HARQ-ACK bit block being associated with the DCI in the first DCI group comprises a $(\tilde{o}_{2 \cdot T_D \cdot j+2(V-1)}^{ACK})$-th bit and a $(\tilde{o}_{2 \cdot T_D \cdot j+2(V-1)+1}^{ACK})$-th bit comprised in the first HARQ-ACK bit sequence; where V denotes a value of the first field in the DCI in the first DCI group.

In one embodiment, when a number of cell(s) scheduled by a DCI in the first DCI group is equal to 1: a HARQ-ACK bit block being associated with the DCI in the first DCI group comprises a $(\tilde{o}_{T_D \cdot j+V-1}^{ACK})$-th bit comprised in the first HARQ-ACK bit sequence; where V denotes a value of the first field in the DCI in the first DCI group.

In one embodiment, when a number of cell(s) scheduled by a DCI in the first DCI group is equal to 1: a HARQ-ACK bit block being associated with the DCI in the first DCI group comprises a $(\tilde{o}_{2 \cdot T_D \cdot j+2(V-1)})$-th bit and a $(\tilde{o}_{2 \cdot T_D \cdot j+2(V-1)}^{ACK})$-th bit comprised in the first HARQ-ACK bit sequence, or, a HARQ-ACK bit block being associated with the DCI in the first DCI group comprises a $\tilde{o}_{T_D \cdot j+V-1}^{ACK}$-th bit comprised in the first HARQ-ACK bit sequence; where V denotes a value of the first field in the DCI in the first DCI group.

In one embodiment, when a number of cell(s) scheduled by a DCI in the first DCI group is equal to 2: a HARQ-ACK bit block being associated with the DCI in the first DCI group comprises a $(\tilde{o}_{2 \cdot T_D \cdot j+2(V-2)}^{ACK})$-th, a $(\tilde{o}_{2 \cdot T_D \cdot j+2(V-2)+1}^{ACK})$-th, a $(\tilde{o}_{2 \cdot T_D \cdot j+2(V-1)}^{ACK})$-th and a $(\tilde{o}_{2 \cdot T_D \cdot j+2(V-1)+1}^{ACK})$-th bit comprised in the first HARQ-ACK bit sequence; where V denotes a value of the first field in the DCI in the first DCI group.

In one embodiment, when a number of cell(s) scheduled by a DCI in the first DCI group is equal to 2: a HARQ-ACK bit block being associated with the DCI in the first DCI group comprises a $(\tilde{o}_{T_D \cdot j+V-2}^{ACK})$-th bit and a $(\tilde{o}_{T_D \cdot j+V-1}^{ACK})$-th bit comprised in the first HARQ-ACK bit sequence; where V denotes a value of the first field in the DCI in the first DCI group.

In one embodiment, when a number of cell(s) scheduled by a DCI in the first DCI group is equal to 2: a HARQ-ACK bit block being associated with the DCI in the first DCI group comprises a $(\tilde{o}_{2 \cdot T_D \cdot j+2(V-2)}^{ACK})$-th, a $(\tilde{o}_{2 \cdot T_D \cdot j+2(V-2)+1}^{ACK})$-th, a $(\tilde{o}_{2 \cdot T_D \cdot j+2(V-1)}^{ACK})$-th and a $(\tilde{o}_{2 \cdot T_D \cdot j+2(V-1)+1}^{ACK})$-th bit comprised in the first HARQ-ACK bit sequence, or a HARQ-ACK bit block being associated with the DCI in the first DCI group comprises a $(\tilde{o}_{T_D \cdot j+V-2}^{ACK})$-th bit and a $(\tilde{o}_{T_D \cdot j+V-1}^{ACK})$-th bit comprised in the first HARQ-ACK bit sequence; where V denotes a value of the first field in the DCI in the first DCI group.

In one embodiment, when a number of cell(s) scheduled by a DCI in the first DCI group is equal to 2: a HARQ-ACK bit block being associated with the DCI in the first DCI group comprises a $(\tilde{o}_{2 \cdot T_D \cdot j+2(V-1)}^{ACK})$-th, a $(\tilde{o}_{2 \cdot T_D \cdot j+2(V-1)+1}^{ACK})$-th, a $(\tilde{o}_{2 \cdot T_D \cdot j+2-V}^{ACK})$-th and a $(\tilde{o}_{2 \cdot T_D \cdot j+2-V+1}^{ACK})$-th bit comprised in the first HARQ-ACK bit sequence; where V denotes a value of the first field in the DCI in the first DCI group.

In one embodiment, when a number of cell(s) scheduled by a DCI in the first DCI group is equal to 2: a HARQ-ACK bit block being associated with the DCI in the first DCI group comprises a $(\tilde{o}_{T_D \cdot j+V-1}^{ACK})$-th bit and a $(\tilde{o}_{T_D \cdot j+V}^{ACK})$-th bit comprised in the first HARQ-ACK bit sequence; where V denotes a value of the first field in the DCI in the first DCI group.

In one embodiment, when a number of cell(s) scheduled by a DCI in the first DCI group is equal to 2: a HARQ-ACK bit block being associated with the DCI in the first DCI group comprises a $(\tilde{o}_{2 \cdot T_D \cdot j+2(V-1)}^{ACK})$-th, a $(\tilde{o}_{2 \cdot T_D \cdot j+2(V-1)+1}^{ACK})$-th, a $(\tilde{o}_{2 \cdot T_D \cdot j+2-V}^{ACK})$-th, and a $(\tilde{o}_{2 \cdot T_D \cdot j+2-V+1}^{ACK})$-th bit comprised in the first HARQ-ACK bit sequence, or a HARQ-ACK bit block being associated with the DCI in the first DCI group comprises a $(\tilde{o}_{T_D \cdot j+V-1}^{ACK})$-th bit and a $(\tilde{o}_{T_D \cdot j+V}^{ACK})$-th bit comprised in the first HARQ-ACK bit sequence; where V denotes a value of the first field in the DCI in the first DCI group.

In one embodiment, the $T_D$ in the present disclosure is a positive integer.

In one embodiment, the $T_D$ in the present disclosure is one of 2, 4, 8 and 16.

In one embodiment, the $T_D$ in the present disclosure is equal to 2 to the Q-th power; where Q denotes the number of bits comprised in the first field.

In one embodiment, the j in the present disclosure is equal to 0 or a positive integer.

Embodiment 9

Embodiment 9 illustrates a schematic diagram of a default cell index according to an embodiment of the present disclosure, as shown in FIG. 9.

In Embodiment 9, a default cell index is: a maximum cell index.

In one embodiment, the default cell index is: a minimum cell index.

In one embodiment, the default cell index is configured by a higher layer signaling.

In one embodiment, the default cell index is configured by an RRC signaling.

In one embodiment, the default cell index is configured by a MAC CE signaling.

In one embodiment, the default cell index is pre-defined.

Embodiment 10

Embodiment 10 illustrates a schematic diagram explaining how to indicate by a first field in DCI in a first DCI group according to an embodiment of the present disclosure, as shown in FIG. 10.

In Embodiment 10, a first DCI group comprises 3 DCIs, namely, DCI #0, DCI #1, DCI #2; a first resource pool comprises 3 cells (i.e., cell #0, cell #1 and cell #2) and 2 time intervals (i.e., time interval #0 and time interval #1) respectively in two different dimensions; cell indexes of the cell #0, the cell #1 and the cell #2 are ascending in sequence; and an index of the time interval #1 is greater than that of the time interval #0.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, for the DCI #0, the first-type DCI(s) comprises the DCI #0; for the DCI #1, the first-type DCI(s)

comprises the DCI #0 and the DCI #1; for the DCI #2, the first-type DCI(s) comprises the DCI #0, the DCI #1 and the DCI #2.

In one embodiment, for the DCI #0, the first-type DCI(s) does not comprise the DCI #1 or the DCI #2; for the DCI #1, the first-type DCI(s) does not comprise the DCI #2.

In one embodiment, for the DCI #0, the first-type DCI(s) comprises the DCI #0, the DCI #1 and the DCI #2; for the DCI #1, the first-type DCI(s) comprises the DCI #0 and the DCI #1; for the DCI #2, the first-type DCI(s) comprises the DCI #0, the DCI #1 and the DCI #2.

In one embodiment, for the DCI #1, the first-type DCI(s) does not comprise the DCI #2.

In one embodiment, a cell being scheduled by the DCI #0 in the first DCI group is a cell #2; for the DCI #0, the accumulative number of cell(s) scheduled by first-type DCI(s) in a first resource pool up to a current reference cell and a current time interval indicated by a first field comprised is equal to 1, where the current reference cell is the cell #2, and the current time interval is the time interval #0.

In one embodiment, cells being scheduled by the DCI #1 in the first DCI group are a cell #0 and a cell #1, with the cell index of the cell #1 being greater than that of the cell #0; for the DCI #1, the accumulative number of cell(s) scheduled by first-type DCI(s) in a first resource pool up to a current reference cell and a current time interval indicated by a first field comprised is equal to 3, where the current reference cell is the cell #1, and the current time interval is the time interval #1.

In one embodiment, a cell being scheduled by the DCI #2 in the first DCI group is a cell #2; for the DCI #2, the accumulative number of cell(s) scheduled by first-type DCI(s) in a first resource pool up to a current reference cell and a current time interval indicated by a first field comprised is equal to 4, where the current reference cell is the cell #2, and the current time interval is the time interval #1.

In one embodiment, a cell being scheduled by the DCI #0 in the first DCI group is a cell #2; for the DCI #0, the accumulative number of {serving cell, time interval}-pair(s) associated with first-type DCI(s) in a first resource pool up to a current reference cell and a current time interval indicated by a first field comprised is equal to 1, where the current reference cell is the cell #2, and the current time interval is the time interval #0.

In one subembodiment, for the DCI #0, the {serving cell, time interval}-pair(s) associated with first-type DCI(s) in a first resource pool up to a current reference cell and a current time interval indicated by a first field comprised include: {cell #2, time interval #0}.

In one embodiment, cells being scheduled by the DCI #1 in the first DCI group are a cell #0 and a cell #1, with the cell index of the cell #1 being greater than that of the cell #0; for the DCI #1, the accumulative number of {serving cell, time interval}-pair(s) associated with first-type DCI(s) in a first resource pool up to a current reference cell and a current time interval indicated by a first field comprised is equal to 3, where the current reference cell is the cell #1, and the current time interval is the time interval #1.

In one subembodiment, for the DCI #1, the {serving cell, time interval}-pairs associated with first-type DCI(s) in a first resource pool up to a current reference cell and a current time interval indicated by a first field comprised include: {cell #2, time interval #0}, {cell #0, time interval #1} and {cell #1, time interval #1}.

In one embodiment, a cell being scheduled by the DCI #2 in the first DCI group is a cell #2; for the DCI #2, the accumulative number of {serving cell, time interval}-pair(s) associated with first-type DCI(s) in a first resource pool up to a current reference cell and a current time interval indicated by a first field comprised is equal to 4, where the current reference cell is the cell #2, and the current time interval is the time interval #1.

In one subembodiment, for the DCI #2, the {serving cell, time interval}-pairs associated with first-type DCI(s) in a first resource pool up to a current reference cell and a current time interval indicated by a first field comprised include: {cell #2, time interval #0}, {cell #0, time interval #1}, {cell #1, time interval #1} and {cell #2, time interval #1}.

In one embodiment, for the DCI #0, a default cell index is a cell index of the cell #2.

In one embodiment, for the DCI #1, a default cell index is a maximum cell index between a cell index of the cell #0 and a cell index of the cell #1.

In one embodiment, for the DCI #2, a default cell index is a cell index of the cell #2.

Embodiment 11

Embodiment 11 illustrates a schematic diagram explaining how to indicate by a first field in DCI in a first DCI group according to an embodiment of the present disclosure, as shown in FIG. 11.

In Embodiment 11, a first DCI group comprises 3 DCIs, namely, DCI #0, DCI #1, DCI #2; a first resource pool comprises 3 cells (i.e., cell #0, cell #1 and cell #3) and 2 time intervals (i.e., time interval #0 and time interval #1) respectively in two different dimensions; an index of the time interval #1 is greater than that of the time interval #0.

In one subembodiment of the Embodiment 11, the cell index of the cell #1 is greater than that of the cell #0.

In one subembodiment of the Embodiment 11, the cell index of the cell #2 is greater than that of the cell #1.

In one subembodiment of the Embodiment 11, the cell index of the cell #2 is smaller than that of the cell #0.

In one subembodiment of the Embodiment 11, the cell index of the cell #2 is greater than that of the cell #0 and smaller than that of the cell #1.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, for the DCI #0, the DCI #1 and the DCI #2, the first-type DCI(s) comprises the DCI #0, the DCI #1 and the DCI #2.

In one embodiment, a cell being scheduled by the DCI #0 in the first DCI group is a cell #2; for the DCI #0, the accumulative number of cell(s) scheduled by first-type DCI(s) in a first resource pool up to a current reference cell and a current time interval indicated by a first field comprised is equal to 1, where the current reference cell is the cell #2, and the current time interval is the time interval #0.

In one embodiment, cells being scheduled by the DCI #1 in the first DCI group are a cell #0 and a cell #1, with the cell index of the cell #1 being greater than that of the cell #0; for the DCI #1, the accumulative number of cell(s) scheduled by first-type DCI(s) in a first resource pool up to a current reference cell and a current time interval indicated by a first field comprised is equal to 2, where the current reference cell is the cell #0, and the current time interval is the time interval #1.

In one embodiment, a cell being scheduled by the DCI #2 in the first DCI group is a cell #2; for the DCI #2, the accumulative number of cell(s) scheduled by first-type DCI(s) in a first resource pool up to a current reference cell and a current time interval indicated by a first field comprised is equal to 4, where the current reference cell is the cell #2, and the current time interval is the time interval #1.

In one embodiment, a cell being scheduled by the DCI #0 in the first DCI group is a cell #2; for the DCI #0, the accumulative number of {serving cell, time interval}-pair(s) associated with first-type DCI(s) in a first resource pool up to a current reference cell and a current time interval indicated by a first field comprised is equal to 1, where the current reference cell is the cell #2, and the current time interval is the time interval #0.

In one subembodiment, for the DCI #0, the {serving cell, time interval}-pair(s) associated with first-type DCI(s) in a first resource pool up to a current reference cell and a current time interval indicated by a first field comprised include: {cell #2, time interval #0}.

In one embodiment, cells being scheduled by the DCI #1 in the first DCI group are a cell #0 and a cell #1, with the cell index of the cell #1 being greater than that of the cell #0; for the DCI #1, the accumulative number of {serving cell, time interval}-pair(s) associated with first-type DCI(s) in a first resource pool up to a current reference cell and a current time interval indicated by a first field comprised is equal to 2, where the current reference cell is the cell #0, and the current time interval is the time interval #1.

In one subembodiment, for the DCI #1, the {serving cell, time interval}-pairs associated with first-type DCI(s) in a first resource pool up to a current reference cell and a current time interval indicated by a first field comprised include: {cell #2, time interval #0} and {cell #0, time interval #1}.

In one embodiment, a cell being scheduled by the DCI #2 in the first DCI group is a cell #2; for the DCI #2, the accumulative number of {serving cell, time interval}-pair(s) associated with first-type DCI(s) in a first resource pool up to a current reference cell and a current time interval indicated by a first field comprised is equal to 4, where the current reference cell is the cell #2, and the current time interval is the time interval #1.

In one subembodiment, for the DCI #2, the {serving cell, time interval}-pairs associated with first-type DCI(s) in a first resource pool up to a current reference cell and a current time interval indicated by a first field comprised include: {cell #2, time interval #0}, {cell #0, time interval #1}, {cell #1, time interval #1} and {cell #2, time interval #1}.

In one embodiment, for the DCI #0, a default cell index is a cell index of the cell #2.

In one embodiment, for the DCI #1, a default cell index is a minimum cell index between a cell index of the cell #0 and a cell index of the cell #1.

In one embodiment, for the DCI #2, a default cell index is a cell index of the cell #2.

Embodiment 12

Embodiment 12 illustrates a schematic diagram explaining how to indicate by a first field in DCI in a first DCI group according to an embodiment of the present disclosure, as shown in FIG. 12.

In Embodiment 12, a first DCI group comprises 4 DCIs, namely, DCI #0, DCI #1, DCI #2 and DCI #3; a first resource pool comprises 4 cells (i.e., cell #0, cell #1, cell #2 and cell #3) and 3 time intervals (i.e., time interval #0, time interval #1 and time interval #2) respectively in two different dimensions; cell indexes of the cell #0, the cell #1, the cell #2 and the cell #3 are ascending in sequence; and indexes of the time interval #0, the time interval #1 and the time interval #2 are ascending in sequence.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, for the DCI #0, the first-type DCI(s) comprises the DCI #0; for the DCI #1, the first-type DCI(s) comprises the DCI #0 and the DCI #1; for the DCI #2, the first-type DCI(s) comprises the DCI #0, the DCI #1 and the DCI #2; for the DCI #3, the first-type DCI(s) comprises the DCI #0, the DCI #1, the DCI #2 and the DCI #3.

In one embodiment, for the DCI #0, the first-type DCI(s) does not comprise the DCI #1, the DCI #2 or the DCI #3; for the DCI #1, the first-type DCI(s) does not comprise the DCI #2 or the DCI #3; for the DCI #2, the first-type DCI(s) does not comprise the DCI #3.

In one embodiment, for the DCI #0, the first-type DCI(s) comprises the DCI #0, the DCI #1 and the DCI #3; for the DCI #1, the first-type DCI(s) comprises the DCI #0 and the DCI #1; for the DCI #2, the first-type DCI(s) comprises the DCI #0, the DCI #1, the DCI #2 and the DCI #3; for the DCI #3, the first-type DCI(s) comprises the DCI #0, the DCI #1, the DCI #2 and the DCI #3.

In one embodiment, for the DCI #0, the first-type DCI(s) does not comprise the DCI #1, the DCI #2 or the DCI #3; for the DCI #1, the first-type DCI(s) does not comprise the DCI #2 or the DCI #3.

In one embodiment, cells being scheduled by the DCI #0 in the first DCI group are a cell #1 and a cell #2, where a cell index of the cell #2 is greater than that of the cell #1; for the DCI #0, the accumulative number of cell(s) scheduled by first-type DCI(s) in a first resource pool up to a current reference cell and a current time interval indicated by a first field comprised is equal to 2, where the current reference cell is the cell #2, and the current time interval is the time interval #0.

In one embodiment, a cell being scheduled by the DCI #1 in the first DCI group is a cell #0; for the DCI #1, the accumulative number of cell(s) scheduled by first-type DCI(s) in a first resource pool up to a current reference cell and a current time interval indicated by a first field comprised is equal to 3, where the current reference cell is the cell #0, and the current time interval is the time interval #1.

In one embodiment, a cell being scheduled by the DCI #2 in the first DCI group is a cell #3; for the DCI #2, the accumulative number of cell(s) scheduled by first-type DCI(s) in a first resource pool up to a current reference cell and a current time interval indicated by a first field comprised is equal to 4, where the current reference cell is the cell #3, and the current time interval is the time interval #1.

In one embodiment, cells being scheduled by the DCI #3 in the first DCI group are a cell #1 and a cell #2, where a cell index of the cell #2 is greater than that of the cell #1; for the DCI #3, the accumulative number of cell(s) scheduled by first-type DCI(s) in a first resource pool up to a current reference cell and a current time interval indicated by a first field comprised is equal to 6, where the current reference cell is the cell #2, and the current time interval is the time interval #2.

In one embodiment, cells being scheduled by the DCI #0 in the first DCI group are a cell #1 and a cell #2, where a cell index of the cell #2 is greater than that of the cell #1; for the DCI #0, the accumulative number of {serving cell, time interval}-pair(s) associated with first-type DCI(s) in a first resource pool up to a current reference cell and a current time interval indicated by a first field comprised is equal to 2, where the current reference cell is the cell #2, and the current time interval is the time interval #0.

In one subembodiment, for the DCI #0, the {serving cell, time interval}-pairs associated with first-type DCI(s) in a first resource pool up to a current reference cell and a current time interval indicated by a first field comprised include: {cell #1, time interval #0} and {cell #2, time interval #0}.

In one embodiment, a cell being scheduled by the DCI #1 in the first DCI group is a cell #0; for the DCI #1, the accumulative number of {serving cell, time interval}-pair(s) associated with first-type DCI(s) in a first resource pool up to a current reference cell and a current time interval indicated by a first field comprised is equal to 3, where the current reference cell is the cell #0, and the current time interval is the time interval #1.

In one subembodiment, for the DCI #1, the {serving cell, time interval}-pairs associated with first-type DCI(s) in a first resource pool up to a current reference cell and a current time interval indicated by a first field comprised include: {cell #1, time interval #0}, {cell #2, time interval #0} and {cell #0, time interval #1}.

In one embodiment, a cell being scheduled by the DCI #2 in the first DCI group is a cell #3; for the DCI #2, the accumulative number of {serving cell, time interval}-pair(s) associated with first-type DCI(s) in a first resource pool up to a current reference cell and a current time interval indicated by a first field comprised is equal to 4, where the current reference cell is the cell #3, and the current time interval is the time interval #1.

In one subembodiment, for the DCI #2, the {serving cell, time interval}-pairs associated with first-type DCI(s) in a first resource pool up to a current reference cell and a current time interval indicated by a first field comprised include: {cell #1, time interval #0}, {cell #2, time interval #0}, {cell #0, time interval #1} and {cell #3, time interval #1}.

In one embodiment, cells being scheduled by the DCI #3 in the first DCI group are a cell #1 and a cell #2, where a cell index of the cell #2 is greater than that of the cell #1; for the DCI #3, for the DCI #3, the accumulative number of {serving cell, time interval}-pair(s) associated with first-type DCI(s) in a first resource pool up to a current reference cell and a current time interval indicated by a first field comprised is equal to 6, where the current reference cell is the cell #2, and the current time interval is the time interval #2.

In one subembodiment, for the DCI #3, the {serving cell, time interval}-pairs associated with first-type DCI(s) in a first resource pool up to a current reference cell and a current time interval indicated by a first field comprised include: {cell #1, time interval #0}, {cell #2, time interval #0}, {cell #0, time interval #1}, {cell #3, time interval #1}, {cell #1, time interval #2}, and {cell #2, time interval #2}.

In one embodiment, for the DCI #0, a default cell index is a maximum index between a cell index of the cell #1 and a cell index of the cell #2.

In one embodiment, for the DCI #1, a default cell index is a cell index of the cell #0.

In one embodiment, for the DCI #2, a default cell index is a cell index of the cell #3.

In one embodiment, for the DCI #3, a default cell index is a maximum cell index between a cell index of the cell #1 and a cell index of the cell #2.

Embodiment 13

Embodiment 13 illustrates a schematic diagram explaining how to indicate by a first field in DCI in a first DCI group according to an embodiment of the present disclosure, as shown in FIG. 13.

In Embodiment 13, a first DCI group comprises 2 DCIs, namely, DCI #0, DCI #1; a first resource pool comprises 4 cells ((i.e., cell #0, cell #1, cell #2 and cell #3) and 2 time intervals (i.e., time interval #0 and time interval #1) respectively in two different dimensions; an index of the time interval #1 is greater than that of the time interval #0.

In one subembodiment of the Embodiment 13, cell indexes of the cell #0, the cell #1, the cell #2 and the cell #3 are ascending in sequence.

In one subembodiment of the Embodiment 13, cell indexes of the cell #0, the cell #2, the cell #1 and the cell #3 are ascending in sequence.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, for the DCI #0, the first-type DCI(s) comprises the DCI #0; for the DCI #1, the first-type DCI(s) comprises the DCI #0 and the DCI #1.

In one embodiment, for the DCI #0, the first-type DCI(s) does not comprise the DCI #1.

In one embodiment, cells being scheduled by the DCI #0 in the first DCI group are a cell #0 and a cell #2, where a cell index of the cell #2 is greater than that of the cell #0; for the DCI #0, the accumulative number of cell(s) scheduled by first-type DCI(s) in a first resource pool up to a current reference cell and a current time interval indicated by a first field comprised is equal to 2, where the current reference cell is the cell #2, and the current time interval is the time interval #0.

In one embodiment, cells being scheduled by the DCI #1 in the first DCI group are a cell #1 and a cell #3, where a cell index of the cell #3 is greater than that of the cell #1; for the DCI #1, the accumulative number of cell(s) scheduled by first-type DCI(s) in a first resource pool up to a current reference cell and a current time interval indicated by a first field comprised is equal to 4, where the current reference cell is the cell #3, and the current time interval is the time interval #1.

In one embodiment, cells being scheduled by the DCI #0 in the first DCI group are a cell #0 and a cell #2, where a cell index of the cell #2 is greater than that of the cell #0; for the DCI #0, the accumulative number of {serving cell, time interval}-pair(s) associated with first-type DCI(s) in a first resource pool up to a current reference cell and a current time interval indicated by a first field comprised is equal to 2, where the current reference cell is the cell #2, and the current time interval is the time interval #0.

In one subembodiment, for the DCI #0, the {serving cell, time interval}-pairs associated with first-type DCI(s) in a first resource pool up to a current reference cell and a current time interval indicated by a first field comprised include: {cell #0, time interval #0} and {cell #2, time interval #0}.

In one embodiment, cells being scheduled by the DCI #1 in the first DCI group are a cell #1 and a cell #3, where a cell index of the cell #3 is greater than that of the cell #1; for the DCI #1, the accumulative number of {serving cell, time interval}-pair(s) associated with first-type DCI(s) in a first resource pool up to a current reference cell and a current time interval indicated by a first field comprised is equal to 4, where the current reference cell is the cell #3, and the current time interval is the time interval #1.

In one subembodiment, for the DCI #1, the {serving cell, time interval}-pairs associated with first-type DCI(s) in a first resource pool up to a current reference cell and a current time interval indicated by a first field comprised include: {cell #0, time interval #0}, {cell #2, time interval #0}, {cell #1, time interval #1}, and {cell #3, time interval #1}.

In one embodiment, for the DCI #0, a default cell index is a maximum cell index between a cell index of the cell #0 and a cell index of the cell #2.

In one embodiment, for the DCI #1, a default cell index is a maximum cell index between a cell index of the cell #1 and a cell index of the cell #3.

Embodiment 14

Embodiment 14 illustrates a schematic diagram explaining how to indicate by a first field in DCI in a first DCI group according to an embodiment of the present disclosure, as shown in FIG. 14.

In Embodiment 14, a first DCI group comprises 3 DCIs, namely, DCI #0, DCI #1, DCI #2; a first resource pool comprises 3 cells (i.e., cell #0, cell #1 and cell #2) and 2 time intervals (i.e., time interval #0 and time interval #1) respectively in two different dimensions; cell indexes of the cell #0, the cell #1 and the cell #2 are ascending in sequence; and an index of the time interval #1 is greater than that of the time interval #0.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, for the DCI #0, the first-type DCI(s) comprises the DCI #0; for the DCI #1, the first-type DCI(s) comprises the DCI #0 and the DCI #1; for the DCI #2, the first-type DCI(s) comprises the DCI #0, the DCI #1 and the DCI #2.

In one embodiment, for the DCI #0, the first-type DCI(s) does not comprise the DCI #1 or the DCI #2; for the DCI #1, the first-type DCI(s) does not comprise the DCI #2.

In one embodiment, for the DCI #0, the first-type DCI(s) comprises the DCI #0 and the DCI #2; for the DCI #1, the first-type DCI(s) comprises the DCI #0, the DCI #1 and the DCI #2; for the DCI #2, the first-type DCI(s) comprises the DCI #0, the DCI #1 and the DCI #2.

In one embodiment, for the DCI #0, the first-type DCI(s) does not comprise the DCI #1.

In one embodiment, a cell being scheduled by the DCI #0 in the first DCI group is a cell #1; for the DCI #0, the accumulative number of cell(s) scheduled by first-type DCI(s) in a first resource pool up to a current reference cell and a current time interval indicated by a first field comprised is equal to 1, where the current reference cell is the cell #1, and the current time interval is the time interval #0.

In one embodiment, cells being scheduled by the DCI #1 in the first DCI group are a cell #0 and a cell #2, with the cell index of the cell #2 being greater than that of the cell #0; for the DCI #1, the accumulative number of cell(s) scheduled by first-type DCI(s) in a first resource pool up to a current reference cell and a current time interval indicated by a first field comprised is equal to 3, where the current reference cell is the cell #2, and the current time interval is the time interval #0.

In one embodiment, a cell being scheduled by the DCI #2 in the first DCI group is a cell #1; for the DCI #2, the accumulative number of cell(s) scheduled by first-type DCI(s) in a first resource pool up to a current reference cell and a current time interval indicated by a first field comprised is equal to 4, where the current reference cell is the cell #1, and the current time interval is the time interval #1.

In one embodiment, a cell being scheduled by the DCI #0 in the first DCI group is a cell #1; for the DCI #0, the accumulative number of {serving cell, time interval}-pair(s) associated with first-type DCI(s) in a first resource pool up to a current reference cell and a current time interval indicated by a first field comprised is equal to 1, where the current reference cell is the cell #1, and the current time interval is the time interval #0.

In one subembodiment, for the DCI #0, the {serving cell, time interval}-pair(s) associated with first-type DCI(s) in a first resource pool up to a current reference cell and a current time interval indicated by a first field comprised include: {cell #1, time interval #0}.

In one embodiment, a cell being scheduled by the DCI #1 in the first DCI group is a cell #0 and a cell #2, with the cell index of the cell #2 being greater than that of the cell #0; for the DCI #1, the accumulative number of {serving cell, time interval}-pair(s) associated with first-type DCI(s) in a first resource pool up to a current reference cell and a current time interval indicated by a first field comprised is equal to 3, where the current reference cell is the cell #2, and the current time interval is the time interval #0.

In one subembodiment, for the DCI #1, the {serving cell, time interval}-pairs associated with first-type DCI(s) in a first resource pool up to a current reference cell and a current time interval indicated by a first field comprised include: {cell #1, time interval #0}, {cell #0, time interval #0} and {cell #2, time interval #0}.

In one embodiment, a cell being scheduled by the DCI #2 in the first DCI group is a cell #1; for the DCI #2, the accumulative number of {serving cell, time interval}-pair(s) associated with first-type DCI(s) in a first resource pool up to a current reference cell and a current time interval indicated by a first field comprised is equal to 4, where the current reference cell is the cell #1, and the current time interval is the time interval #1.

In one subembodiment, for the DCI #2, the {serving cell, time interval}-pairs associated with first-type DCI(s) in a first resource pool up to a current reference cell and a current time interval indicated by a first field comprised include: {cell #1, time interval #0}, {cell #0, time interval #0}, {cell #2, time interval #0} and {cell #1, time interval #1}.

In one embodiment, for the DCI #0, a default cell index is a cell index of the cell #1.

In one embodiment, for the DCI #1, a default cell index is a maximum cell index between a cell index of the cell #0 and a cell index of the cell #2.

In one embodiment, for the DCI #2, a default cell index is a cell index of the cell #1.

In one embodiment, different from what have been illustrated in Embodiment 14, the following situations will never occur provided with the definition of the counter DAI according to the current protocol version (that is, Release 16 of 3GPP TS38.213): for two DCIs in a same PDCCH monitoring occasion, a {serving cell with a smaller cell index, the same PDCCH monitoring occasion}-pair and a {serving cell with a larger cell index, the same PDCCH monitoring occasion}-pair are both counted into an accumulative number indicated by a counter DAI in one of such DCI which has a larger counter DAI value, while only the latter of the {serving cell with a smaller cell index, the same PDCCH monitoring occasion}-pair and the {serving cell with a larger cell index, the same PDCCH monitoring occasion}-pair is counted into an accumulative number indicated by a counter DAI in the other of such DCI which has a smaller counter DAI value.

Embodiment 15

Embodiment 15 illustrates a schematic diagram explaining how to indicate by a first field in DCI in a first DCI group according to an embodiment of the present disclosure, as shown in FIG. 15.

In Embodiment 15, a first DCI group comprises 2 DCIs, namely, DCI #0, DCI #1; time-domain resources occupied by the 2 DCIs belong to a same time interval; a first resource pool comprises 2 cells ((i.e., cell #0, cell #1) and 1 time interval (i.e., the same time interval) respectively in two different dimensions; an index of the time interval #1 is greater than that of the time interval #0; a start time #1 is later than a start time #0.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, for the DCI #0, the first-type DCI(s) comprises the DCI #0; for the DCI #1, the first-type DCI(s) comprises the DCI #0 and the DCI #1.

In one embodiment, for the DCI #0, the first-type DCI(s) does not comprise the DCI #1.

In one embodiment, a cell being scheduled by the DCI #0 in the first DCI group is a cell #1, with the cell index of the cell #1 being greater than that of the cell #0; for the DCI #0, the accumulative number of cell(s) scheduled by first-type DCI(s) in a first resource pool up to a current reference cell and a current time interval indicated by a first field comprised is equal to 1, where the current reference cell is the cell #1, and the current time interval is the same time interval.

In one embodiment, cells being scheduled by the DCI #1 in the first DCI group are a cell #0 and a cell #1, with the cell index of the cell #1 being greater than that of the cell #0; for the DCI #1, the accumulative number of cell(s) scheduled by first-type DCI(s) in a first resource pool up to a current reference cell and a current time interval indicated by a first field comprised is equal to 3, where the current reference cell is the cell #1, and the current time interval is the same time interval.

In one embodiment, a cell being scheduled by the DCI #0 in the first DCI group is a cell #1, with the cell index of the cell #1 being greater than that of the cell #0; for the DCI #0, the accumulative number of {serving cell, time interval}-pair(s) associated with first-type DCI(s) in a first resource pool up to a current reference cell and a current time interval indicated by a first field comprised is equal to 1, where the current reference cell is the cell #1, and the current time interval is the same time interval.

In one subembodiment, for the DCI #0, the {serving cell, time interval}-pair(s) associated with first-type DCI(s) in a first resource pool up to a current reference cell and a current time interval indicated by a first field comprised include: {cell #1, the same time interval}.

In one embodiment, cells being scheduled by the DCI #1 in the first DCI group are a cell #0 and a cell #1, with the cell index of the cell #1 being greater than that of the cell #0; for the DCI #1, the accumulative number of {serving cell, time interval}-pair(s) associated with first-type DCI(s) in a first resource pool up to a current reference cell and a current time interval indicated by a first field comprised is equal to 3, where the current reference cell is the cell #1, and the current time interval is the same time interval.

In one subembodiment, for the DCI #1, the {serving cell, time interval}-pairs associated with first-type DCI(s) in a first resource pool up to a current reference cell and a current time interval indicated by a first field comprised include: {cell #1, the same time interval}, {cell #0, the same time interval} and {cell #1, the same time interval} (herein, the {cell #1, the same time interval} is counted twice).

In one embodiment, for the DCI #0, a default cell index is a cell index of the cell #1.

In one embodiment, for the DCI #1, a default cell index is a maximum cell index between a cell index of the cell #0 and a cell index of the cell #1.

Embodiment 16

Embodiment 16 illustrates a structure block diagram of a processing device in a first node, as shown in FIG. 16. In FIG. 16, a first node processing device 1600 is comprised of a first receiver 1601 and a first transmitter 1602.

In one embodiment, the first node 1600 is a UE.

In one embodiment, the first node 1600 is a relay node.

In one embodiment, the first node 1600 is vehicle-mounted equipment.

In one embodiment, the first node 1600 is a UE supporting V2X communications.

In one embodiment, the first node 1600 is a relay node supporting V2X communications.

In one embodiment, the first receiver 1601 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1601 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1602 comprises at least one of the antenna 452, the transmitter 454, the multi-antenna transmitting processor 457, the transmitting processor 468, the controller/processor 459 the memory 460 or the data source 467 in FIG. 4 of the present disclosure.

In one embodiment, the first transmitter 1602 comprises at least the first five of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1602 comprises at least the first four of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1602 comprises at least the first three of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1602 comprises at least the first two of the antenna 452, the transmitter 454, the multi-antenna transmitting processor 457, the transmitting processor 468, the controller/processor 459 the memory 460 and the data source 467 in FIG. 4 of the present disclosure.

In one Embodiment 16, the first receiver 1601 receives a first DCI group, the first DCI group comprising at least one DCI; and the first transmitter 1602 transmits a first signal, the first signal carrying a first HARQ-ACK bit sequence; herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one embodiment, the accumulative number of the cell(s) scheduled by the first-type DCI(s) in the first resource pool up to the current reference cell and the current time interval is: an accumulative number of {serving cell, PDCCH monitoring occasion}-pair(s) associated with first-type DCI(s) up to a current reference cell and a current PDCCH monitoring occasion.

In one embodiment, the accumulative number of the cell(s) scheduled by the first-type DCI(s) in the first resource pool up to the current reference cell and the current time interval is: an accumulative number of {serving cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

In one embodiment, the first receiver 1601 receives on a first channel; herein a DCI in the first DCI group comprises configuration information for the first channel.

In one embodiment, the first receiver 1601 receives on a second channel and a third channel; herein, a DCI in the first DCI group comprises configuration information for the second channel and the third channel.

In one embodiment, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group.

In one embodiment, the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

Embodiment 17

Embodiment 17 illustrates a structure block diagram a processing device in a second node according to one embodiment of the present disclosure, as shown in FIG. 17. In FIG. 17, a second node processing device 1700 is comprised of a second transmitter 1701 and a second receiver 1702.

In one embodiment, the second node 1700 is a UE.

In one embodiment, the second node 1700 is a base station.

In one embodiment, the second node 1700 is a relay node.

In one embodiment, the second node 1700 is vehicle-mounted equipment.

In one embodiment, the second node 1700 is a UE supporting V2X communications.

In one embodiment, the second transmitter 1701 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1701 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1701 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1701 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1701 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1702 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1702 comprises at least the first five of the antenna 420, the receiver 418, the multi-antenna receiving processor 472, the receiving processor 470, the controller/processor 475 and the memory 476 in FIG. 4 of the present disclosure.

In one embodiment, the second receiver 1702 comprises at least the first four of the antenna 420, the receiver 418, the multi-antenna receiving processor 472, the receiving processor 470, the controller/processor 475 and the memory 476 in FIG. 4 of the present disclosure.

In one embodiment, the second receiver 1702 comprises at least the first three of the antenna 420, the receiver 418, the multi-antenna receiving processor 472, the receiving processor 470, the controller/processor 475 and the memory 476 in FIG. 4 of the present disclosure.

In one embodiment, the second receiver 1702 comprises at least the first two of the antenna 420, the receiver 418, the multi-antenna receiving processor 472, the receiving processor 470, the controller/processor 475 and the memory 476 in FIG. 4 of the present disclosure.

In one Embodiment 17, the second transmitter 1701 transmits a first DCI group, the first DCI group comprising at least one DCI; and the second receiver 1702 receives a first signal, the first signal carrying a first HARQ-ACK bit sequence; herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one embodiment, the accumulative number of the cell(s) scheduled by the first-type DCI(s) in the first resource pool up to the current reference cell and the current time interval is: an accumulative number of {serving cell, PDCCH monitoring occasion}-pair(s) associated with first-type DCI(s) up to a current reference cell and a current PDCCH monitoring occasion.

In one embodiment, the accumulative number of the cell(s) scheduled by the first-type DCI(s) in the first resource pool up to the current reference cell and the current time interval is: an accumulative number of {serving cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

In one embodiment, the second transmitter 1701 transmits on a first channel; herein a DCI in the first DCI group comprises configuration information for the first channel.

In one embodiment, the second transmitter 1701 transmits on a second channel and a third channel; herein, a DCI in the first DCI group comprises configuration information for the second channel and the third channel.

In one embodiment, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group.

In one embodiment, the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

Embodiment 18

Embodiment 18 illustrates a flowchart of processing of a first node according to one embodiment of the present disclosure, as shown in FIG. 18.

In Embodiment 18, the first node receives a first DCI group in step 1801; and transmits a first signal in step 1802.

In Embodiment 18, the first DCI group comprises at least one DCI; and the first signal carries a first HARQ-ACK bit sequence; herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index of cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

In one embodiment, the first signal comprises a radio signal.

In one embodiment, the first signal comprises a radio frequency signal.

In one embodiment, the first signal comprises a baseband signal.

In one embodiment, the phrase that the first signal carries a first HARQ-ACK bit sequence means: the first signal comprises an output by all or part of bits in the first HARQ-ACK bit sequence sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the first signal is transmitted in a time-frequency resource pool.

In one embodiment, transmission of the first signal occupies at least one Resource Element (RE).

In one embodiment, a said RE occupies a multicarrier symbol in time domain, and a subcarrier in frequency domain.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the first signal is transmitted in a Physical Uplink Control CHannel (PUCCH).

In one embodiment, the first signal is transmitted in a PUSCH.

In one embodiment, a DCI in the first DCI group is DCI format 1_0, for the specific definition of the DCI format 1_0, refer to 3GPP TS38.212, Chapter 7.3.1.2.

In one embodiment, a DCI in the first DCI group is DCI format 1_1, for the specific definition of the DCI format 1_1, refer to 3GPP TS38.212, Chapter 7.3.1.2.

In one embodiment, a DCI in the first DCI group is DCI format 1_2, for the specific definition of the DCI format 1_2, refer to 3GPP TS38.212, Chapter 7.3.1.2.

In one embodiment, the DCI in the present disclosure is transmitted in a PDCCH.

In one embodiment, the DCI in the present disclosure is a DCI format.

In one embodiment, the DCI in the present disclosure is a control signaling.

In one embodiment, the DCI in the present disclosure is a L1 control signaling.

In one embodiment, the DCI in the present disclosure is a physical layer control signaling.

In one embodiment, the first DCI group comprises one DCI.

In one embodiment, the first DCI group comprises multiple DCIs.

In one embodiment, a DCI in the first DCI group is used to indicate Downlink Grant.

In one embodiment, there are at least two DCIs in the first DCI group occupying time-domain resources that respectively belong to different time intervals.

In one embodiment, there are at least two DCIs in the first DCI group occupying time-domain resources that belong to a same time interval.

In one embodiment, time-domain resources occupied by all DCIs in the first DCI group belong to a same time interval.

In one embodiment, any DCI in the first DCI group schedules at least one cell.

In one embodiment, each DCI in the first DCI group schedules a same cell.

In one embodiment, at least two DCIs in the first DCI group respectively schedule different cells.

In one embodiment, at least two DCIs in the first DCI group schedule a same cell.

In one embodiment, a DCI in the first DCI group is transmitted in a cell scheduled by the DCI in the first DCI group.

In one embodiment, a DCI in the first DCI group schedules two cells; the DCI in the first DCI group is transmitted in one of the two cells scheduled by the DCI in the first DCI group.

In one embodiment, a DCI in the first DCI group is transmitted in a cell different from any cell scheduled by the DCI in the first DCI group.

In one embodiment, the first field comprised is only for DCI associated with the first HARQ-ACK bit sequence.

In one embodiment, when the first HARQ-ACK bit sequence is comprised of one or more of HARQ-ACK bits indicating whether a PDSCH reception or an SPS PDSCH release indicated by a DCI is correctly received, where the DCI is a DCI being associated with the first HARQ-ACK bit sequence.

In one embodiment, the first field comprised is only for DCI in the first signaling group.

In one embodiment, the first field comprised is only for the PDCCH monitoring occasion being associated with the first HARQ-ACK bit sequence.

In one embodiment, the first field comprised is only for the {serving cell, PDCCH monitoring occasion}-pair being associated with the first HARQ-ACK bit sequence.

In one embodiment, the first field comprised is only for a PDSCH being associated with the first HARQ-ACK bit sequence.

In one embodiment, the accumulative number is only limited to an accumulative number determined in the first resource pool.

In one embodiment, a transmission of any DCI in the first DCI group occupies at least one RE.

In one embodiment, the first resource pool is configurable.

In one embodiment, the first resource pool is determined based on a pre-defined rule.

In one embodiment, the first resource pool is comprised of multiple REs.

In one embodiment, the first resource pool is a time-frequency resource pool.

In one embodiment, in terms of time domain, the first resource pool is comprised of a positive integer number of multicarrier symbol(s).

In one embodiment, in terms of time domain, the first resource pool is comprised of a positive integer number of time interval(s).

In one embodiment, in terms of frequency domain, the first resource pool is comprised of a positive integer number of subcarrier(s).

In one embodiment, in terms of frequency domain, the first resource pool is comprised of a positive integer number of cell(s).

In one embodiment, the first resource pool comprises resources defined from two dimensions.

In one subembodiment, the two dimensions comprise: reference cell and time interval.

In one subembodiment, the two dimensions comprise: serving cell and time interval.

In one subembodiment, the two dimensions comprise: time domain and frequency domain.

In one embodiment, on the one hand, the first resource pool comprises at least one serving cell; on the other hand, the first resource pool comprises at least one time interval.

In one embodiment, on the one hand, the first resource pool comprises at least one reference cell; on the other hand, the first resource pool comprises at least one time interval.

In one embodiment, the first resource pool comprises a time interval on at least one serving cell.

In one embodiment, the first resource pool comprises a PDCCH monitoring occasion on at least one serving cell.

In one embodiment, the first resource pool comprises a time interval on at least one reference cell.

In one embodiment, the first resource pool comprises a PDCCH monitoring occasion on at least one reference cell.

In one embodiment, a starting serving cell and a starting time interval for the first resource pool are configurable.

In one embodiment, a starting reference cell and a starting time interval for the first resource pool are configurable.

In one embodiment, the first resource pool is ended up to the current reference cell and the current time interval according to a first ordering rule.

In one embodiment, a start time of the first resource pool in time domain is no later than a start time of any DCI in the first DCI group in time domain.

In one embodiment, a limited number of {reference cell, time interval}-pair(s) can be defined in the first resource pool.

In one embodiment, at least one {reference cell, time interval}-pair can be defined in the first resource pool.

In one embodiment, the first resource pool comprises resources occupied by a limited number of {reference cell, time interval}-pair(s).

In one embodiment, the first resource pool comprises resources occupied by at least one {reference cell, time interval}-pair.

In one embodiment, a duration of the time interval does not exceed 1 slot.

In one embodiment, a duration of the time interval does not exceed 1 radio frame.

In one embodiment, a duration of the time interval does not exceed 1 sub-frame.

In one embodiment, a duration of the time interval is configurable.

In one embodiment, the time interval is a Physical Downlink Control CHannel (PDCCH) monitoring occasion.

In one embodiment, the time interval comprises at least one multicarrier symbol.

In one embodiment, durations of two different said time intervals are the same or different.

In one embodiment, the reference cell is a serving cell.

In one embodiment, a said index in the present disclosure is at a value of a non-negative integer.

In one embodiment, a said index in the present disclosure is at a value of a positive integer.

In one embodiment, a cell scheduled by a DCI in the present disclosure is a serving cell.

In one embodiment, a cell scheduled by any DCI in the first DCI group is a serving cell.

In one embodiment, cell(s) scheduled by any DCI in the first DCI group is(are): cell(s) used for transmitting PDSCH reception(s) or SPS PDSCH release(s) indicated by any said DCI in the first DCI group.

In one embodiment, cell(s) scheduled by any DCI in the first DCI group is(are): cell(s) comprising frequency-domain resources occupied by PDSCH reception(s) or SPS PDSCH release(s) indicated by any said DCI in the first DCI group.

In one embodiment, cell(s) scheduled by any DCI in the first DCI group is(are): cell(s) comprising frequency-domain resources occupied by PDSCH reception(s) indicated by any said DCI in the first DCI group or frequency-domain resources occupied by the said DCI itself in the first DCI group.

In one embodiment, cell(s) scheduled by first-type DCI(s) is(are): cell(s) comprising frequency-domain resources occupied by PDSCH reception(s) or SPS PDSCH release(s) indicated by the first-type DCI.

In one embodiment, cell(s) scheduled by first-type DCI(s) is(are): cell(s) comprising frequency-domain resources occupied by PDSCH reception(s) indicated by the first-type DCI(s) or frequency-domain resources occupied by the first-type DCI(s) itself.

In one embodiment, cell(s) scheduled by any DCI in the first DCI group is(are): cell(s) used for transmitting any said DCI in the first DCI group.

In one embodiment, cell(s) scheduled by any DCI in the first DCI group is(are): cell(s) comprising frequency-domain resources occupied by any said DCI in the first DCI group.

In one embodiment, the first HARQ-ACK bit sequence is transmitted on a physical layer channel, the first resource pool comprising a search space associated with the physical layer channel.

In one embodiment, the first HARQ-ACK bit sequence is transmitted on a physical layer channel, the first resource pool comprising a CCE associated with the physical layer channel.

In one embodiment, the first HARQ-ACK bit sequence is transmitted on a physical layer channel, the first resource pool comprising a PDCCH candidate associated with the physical layer channel.

In one embodiment, any said first-type DCI(s) indicates HARQ-ACK information transmitted in a physical layer channel.

In one embodiment, the physical layer channel is a PUCCH.

In one embodiment, the physical layer channel is a PUSCH.

In one embodiment, the first-type DCI(s) is(are) either DCI by which a maximum value of cell indexes of all cells scheduled is no greater than a cell index of the current reference cell, or DCI by which time-domain resources occupied belong to a time interval having an index smaller than that of the current time interval.

In one embodiment, for any DCI in the first DCI group, the first-type DCI(s) comprises the said DCI itself.

In one embodiment, when time-domain resources occupied by a DCI belong to the current time interval, an index of the time interval to which the time-domain resources occupied by the DCI belong is equal to an index of the current time interval.

In one embodiment, an index of the current time interval is a PDCCH monitoring occasion index.

In one embodiment, all or partial DCIs in the first DCI group are the first-type DCI.

In one embodiment, the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

In one embodiment, for any DCI in the first DCI group, the first-type DCI(s) is DCI that fulfills at least one of the following two conditions: DCI by which a cell index of a reference cell scheduled is no greater than a cell index of the current reference cell, or DCI by which time-domain resources occupied belong to a time interval having an index smaller than that of the current time interval.

In one embodiment, for any DCI in the first DCI group, the first-type DCI(s) is DCI that fulfills at least one of the following two conditions: DCI by which a cell index of a reference cell scheduled is smaller than a cell index of the current reference cell, or DCI by which time-domain resources occupied belong to a time interval having an index smaller than that of the current time interval.

In one embodiment, for any DCI in the first DCI group, the first-type DCI(s) other than the said any DCI in the first DCI group is DCI that fulfills at least one of the following two conditions: DCI by which a cell index of a reference cell scheduled is smaller than a cell index of the current reference cell, or DCI by which time-domain resources occupied belong to a time interval having an index smaller than that of the current time interval.

In one embodiment, for any DCI in the first DCI group, the first-type DCI(s) is DCI that fulfills at least one of the following three conditions: DCI by which a cell index of a reference cell scheduled is less than a cell index of the current reference cell, or DCI by which time-domain resources occupied belong to a time interval having an index smaller than that of the current time interval, or, DCI by which a maximum value of cell indexes of all cells scheduled is equal to a cell index of the current reference cell, and by which time-domain resources occupied belong to a time interval having an index equal to that of the current time interval and which fulfills a first condition.

In one subembodiment, fulfillment of the first condition means: indicating a PDSCH reception in the current reference cell, of which a start time is earlier than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is earlier than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is no later than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is no later than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is later than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is later than that of a PDSCH reception in {the current reference cell, the current time interval}-pair indicated by any said DCI in the first DCI group.

In one subembodiment, fulfillment of the first condition means: indicating a PDSCH reception in the current reference cell, of which a start time is no earlier than that of a PDSCH reception in the current reference cell indicated by any said DCI in the first DCI group.

In one subembodiment, fulfillment of the first condition means: indicating {the current reference cell, the current time interval}-pair in which a start time of a PDSCH reception is no earlier than that of a PDSCH reception in {the current reference cell, the current time interval}-pair indicated by any said DCI in the first DCI group.

In one embodiment, for any DCI in the first DCI group, the first-type DCI(s) does not comprise: DCI indicating a PDSCH in {the current reference cell, the current time interval}-pair of which a start time is later than that of a PDSCH in {the current reference cell, the current time interval}-pair indicated by any said DCI in the first DCI group.

In one embodiment, for the first node, when a DCI can indicate 2 PDSCH receptions on 2 cells, maxNrofCodeWordsScheduledByDCI is configured to be 2 (or n2).

In one embodiment, for the first node, when a DCI can indicate 2 PDSCH receptions on 2 cells, maxNrofCodeWordsScheduledByDCI is deemed to be configured to be 2 (or n2).

In one embodiment, each said first-type DCI(s) indicates transmitting HARQ-ACK information in a same slot.

In one embodiment, each said first-type DCI(s) indicates transmitting HARQ-ACK information in a same sub-slot.

In one embodiment, each said first-type DCI(s) indicates transmitting HARQ-ACK information in a same span.

In one embodiment, each said first-type DCI(s) is DCI being associated with the first HARQ-ACK bit sequence.

In one embodiment, each said first-type DCI(s) is associated with the first HARQ-ACK bit sequence.

In one embodiment, the first HARQ-ACK bit sequence comprises HARQ-ACK bit(s) being associated with the first-type DCI.

In one embodiment, the first HARQ-ACK bit sequence comprises all HARQ-ACK bits being associated with the first-type DCI.

In one embodiment, for any DCI in the first DCI group, the first-type DCI(s) is DCI comprised in the first DCI group.

In one embodiment, each {reference cell, time interval}-pair being associated with the first-type DCI(s) is comprised in the first resource pool.

In one embodiment, the accumulative number of the reference cell(s) scheduled by the first-type DCI(s) in the first resource pool up to the current reference cell and the current time interval is: an accumulative number of {reference cell, PDCCH monitoring occasion}-pair(s) being associated with first-type DCI(s) in the first resource pool up to the current reference cell and the current PDCCH monitoring occasion.

In one embodiment, the accumulative number of the reference cell(s) scheduled by the first-type DCI(s) in the first resource pool up to the current reference cell and the current time interval is: an accumulative number of {reference cell, time interval}-pair(s) being associated with first-type DCI(s) in the first resource pool up to the current reference cell and the current time interval.

In one embodiment, the accumulative number of the reference cell(s) scheduled by the first-type DCI(s) in the first resource pool up to the current reference cell and the current time interval is: an accumulative number of {reference cell, time interval}-pair(s) being associated with first-type DCI(s) in the first resource pool up to the current reference cell and the current time interval according to a first ordering rule; the first ordering rule is a rule of ordering based on at least cell indexes of reference cells and time interval indexes.

In one embodiment, the accumulative number of the reference cell(s) scheduled by the first-type DCI(s) in the first resource pool up to the current reference cell and the current time interval is: an accumulative number of {reference cell, time interval}-pair(s) being associated with first-type DCI(s) up to the current reference cell and the current time interval according to a first ordering rule; the first ordering rule is a rule of ordering based on at least cell indexes of reference cells and time interval indexes.

In one embodiment, the accumulative number of the reference cell(s) scheduled by the first-type DCI(s) in the first resource pool up to the current reference cell and the current time interval is: an accumulative number of cell(s) scheduled by first-type DCI(s) in a first resource pool up to the current reference cell and the current time interval according to a first ordering rule; the first ordering rule is a rule of ordering based on at least cell indexes of reference cells and time interval indexes.

In one embodiment, for a same time interval: if multiple DCIs in multiple PDCCH receptions in the same time interval can schedule multiple PDSCH receptions on a same cell, the same cell is counted for multiple times.

In one embodiment, for a same time interval: if a number of PDSCH reception(s) that can be scheduled by multiple DCIS in multiple PDCCH receptions in the same time interval on a same cell is equal to L, the cell is counted for L time(s); L being a positive integer.

In one embodiment, for the first node, there is at most one PDSCH reception or SPS PDSCH release in each {reference cell, time interval}-pair.

In one embodiment, for the first node, there is at least one {reference cell, time interval}-pair in which PDSCH receptions or SPS PDSCH releases indicated by multiple DCIs can exist.

In one embodiment, the first node indicates support for that there is at most one PDSCH reception or SPS PDSCH release in each {reference cell, time interval}-pair.

In one embodiment, the first node indicates support for that there is at least one {reference cell, time interval}-pair in which PDSCH receptions or SPS PDSCH releases indicated by multiple DCIs can exist.

In one embodiment, the first node indicates that support is provided for a D SCH-Number-perMOperCell.

In one embodiment, the first node indicates that support is not provided for D SCH-Number-perMOperCell.

In one embodiment, any DCI in the first DCI group comprises at most one counter DAI field.

In one embodiment, any DCI in the first DCI group comprises only one counter DAI field.

In one embodiment, there isn't any DCI comprising multiple counter DAI fields in the first DCI group.

In one embodiment, time-domain resources occupied by any DCI in the first DCI group comprises at least one multicarrier symbol.

In one embodiment, the first-type DCI(s) comprises at most one counter DAI field.

In one embodiment, the first-type DCI(s) comprises only one counter DAI field.

In one embodiment, the first field is an indication field.

In one embodiment, the first field is used for counting.

In one embodiment, the first field is a Downlink Assignment Indicator (DAI) field.

In one embodiment, the first field is a counter DAI field.

In one embodiment, the first field comprises 1 bit.

In one embodiment, the first field comprises 2 bits.

In one embodiment, the first field comprises 3 bits.

In one embodiment, the first field comprises 4 bits.

In one embodiment, the first field comprises no more than 32 bits.

In one embodiment, a value in the first field is 1 or 2.

In one embodiment, a value in the first field is one of 1, 2, 3 or 4.

In one embodiment, a value in the first field is one of 1, 2, 3, 4, 5, 6, 7 or 8.

In one embodiment, a value in the first field is one of 1, 2, 3, 4, 5, 6, 7, 8, 9, 10, 11, 12, 13, 14, 15 or 16.

In one embodiment, a value in the first field is one of 0, 1, 2 or 3.

In one embodiment, a value in the first field is one of 0 through 7.

In one embodiment, a DCI in the first DCI group schedules one or more cells.

In one embodiment, a number of cell(s) scheduled by a DCI in the first DCI group is 1 or 2.

In one embodiment, all DCIS in the first DCI group schedule equal numbers of cells.

In one embodiment, a number of cells scheduled by any DCI in the first DCI group is no greater than 65536.

In one embodiment, there are two DCIS in the first DCI group that schedule different numbers of cells.

In one embodiment, a number of cells scheduled by each DCI in the first DCI group is equal to 2.

In one embodiment, one DCI in the first DCI group schedules one cell, and another DCI in the first DCI group schedules more than one cell.

In one embodiment, one DCI in the first DCI group schedules one cell, and another DCI in the first DCI group schedules 2 cells.

In one embodiment, any DCI in the first DCI group occupies a positive integer number of multicarrier symbol(s) in time domain.

In one embodiment, any DCI in the first DCI group occupies a positive integer number of subcarrier(s) in frequency domain.

In one embodiment, any DCI in the first DCI group occupies at least one RE.

In one embodiment, a said cell index is one of 0 through 31.

In one embodiment, a said cell index is a positive integer no greater than 31.

In one embodiment, a said cell index is a positive integer no greater than 8192.

In one embodiment, a said cell index is a Physical Cell Identity (PCI).

In one embodiment, the cell index in the present disclosure is a serving cell index.

In one embodiment, a said serving cell index is configured by a SCellIndex parameter.

In one embodiment, a said serving cell index is configured by a ServCellIndex parameter.

In one embodiment, a said serving cell index is 0.

In one embodiment, a said serving cell index is a positive integer.

In one embodiment, a said serving cell index is a positive integer no greater than 31.

In one embodiment, a said serving cell index is a positive integer no greater than 8192.

In one embodiment, one or more said serving cell indexes is(are) configured in CellGroupConfig.

In one embodiment, a range of values of a said serving cell index is a subset of a range of values of a said cell index.

In one embodiment, for any DCI in the first DCI group, a first field comprised is used for indicating an accumulative number of reference cell(s) scheduled by first-type DCI(s) in a first resource pool up to a current reference cell and a current time interval, the first-type DCI(s) being used for indicating a PDSCH reception or an SPS PDSCH release; time-domain resources occupied by any said DCI in the first DCI group belong to the current time interval; a number of cell(s) scheduled by the said DCI in the first DCI group is equal to or greater than 1; when the number of cell(s) scheduled by the said DCI in the first DCI group is equal to 1, the current reference cell is a cell scheduled by the said DCI in the first DCI group; when the number of cell(s) scheduled by the said DCI in the first DCI group is greater than 1, the current reference cell is a cell having a maximum or a minimal cell index of the cells scheduled by the said DCI in the first DCI group.

In one embodiment, when a DCI is used for indicating time-frequency resources occupied by a data channel on a cell, the DCI schedules the cell.

In one embodiment, when a DCI is used for releasing time-frequency resources occupied by a data channel on a cell, the DCI schedules the cell.

In one embodiment, the data channel comprises a PDSCH.

In one embodiment, the data channel comprises a DL-SCH.

In one embodiment, the data channel comprises a PUSCH.

In one embodiment, the data channel comprises a UL-SCH.

In one embodiment, when a DCI is used for configuring a TCI state on a cell, the DCI schedules the cell.

In one embodiment, when a DCI is used for configuring a transmit (Tx) power on a cell, the DCI schedules the cell.

In one embodiment, the first fields in multiple DCIs in the first DCI group are jointly used to determine whether there is a missed detection of DCI.

In one embodiment, an accumulative number indicated by the first field in a DCI in the first DCI group is equal to a value of the first field in the said DCI in the first DCI group plus a product of i and 2 to the Q-th power; the i is 0 or a positive integer, and Q is a number of bit(s) comprised in the first field in the said DCI in the first DCI group.

In one embodiment, the phrase "up to a(the) current reference cell and a(the) current time interval" in the present disclosure means: up to the current reference cell and the current time interval according to a first ordering rule.

Embodiment 19

Figure 19:
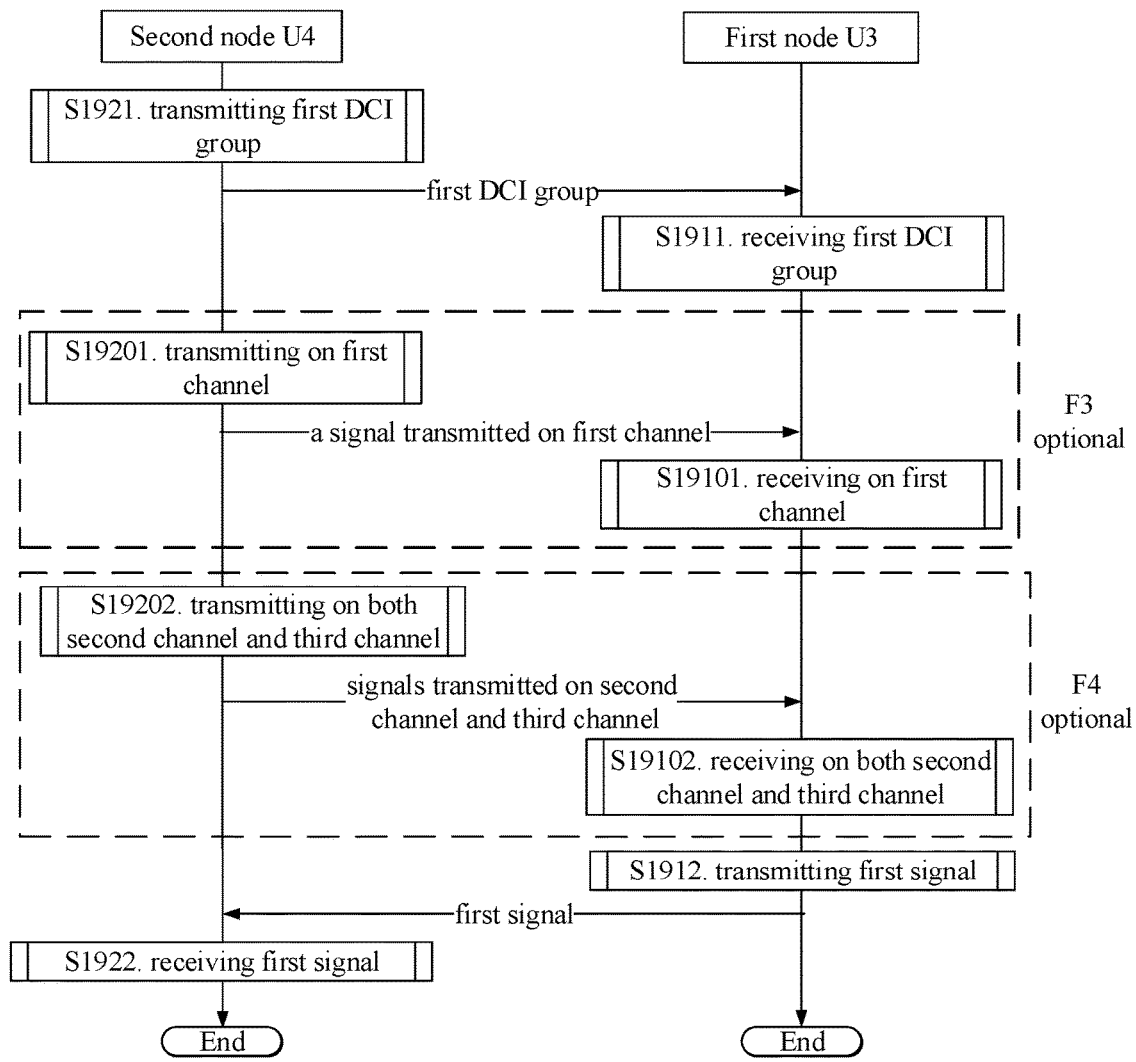
FIG. 19 illustrates a flowchart of signal transmission according to one embodiment of the present disclosure.

Embodiment 19 illustrates a flowchart of signal transmission according to one embodiment of the present disclosure, as shown in FIG. 19. In FIG. 19, a first node U3 and a second node U4 are in communications via an air interface. In FIG. 19, steps marked by the dotted-line frame boxes F3 and F4 are optional, respectively. Particularly, where the steps in the boxes F3 and F4 are located in FIG. 19 do not denote a specific chronological order.

The first node U3 receives a first DCI group in step S1911; receives on a first channel in step S19101; receives on both a second channel and a third channel in step S19102; and transmits a first signal in step S1912.

The second node U4 transmits a first DCI group in step S1921; transmits on a first channel in step S19201; transmits on both a second channel and a third channel in step S19202; and receives a first signal in step S1922.

In Embodiment 19, the first DCI group comprises at least one DCI; and the first signal carries a first HARQ-ACK bit sequence; herein, for any DCI in the first DCI group, a first field comprised is used to indicate an accumulative number of reference cells scheduled by first-type DCI(s) in a first resource pool up to a current reference cell and a current time interval, the first-type DCI(s) being used to indicate a PDSCH reception or an SPS PDSCH release; the reference cell scheduled by the first-type DCI(s) is a cell having a default cell index of cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell; one DCI in the first DCI group comprises configuration information for the first channel; (the other) one DCI in the first DCI group comprises configuration information for the second channel and the third channel; the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group.

In one subembodiment of the Embodiment 19, the accumulative number of the reference cell(s) scheduled by the first-type DCI(s) in the first resource pool up to the current reference cell and the current time interval is: an accumulative number of {reference cell, PDCCH monitoring occasion}-pair(s) associated with first-type DCI(s) up to a current reference cell and a current PDCCH monitoring occasion.

In one subembodiment of the Embodiment 19, the accumulative number of the reference cell(s) scheduled by the first-type DCI(s) in the first resource pool up to the current reference cell and the current time interval is: an accumulative number of {reference cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

In one subembodiment of the Embodiment 19, the first DCI group comprises 2 DCIs, and each of the 2 DCIs schedules more than one cell; for one of the 2 DCIs, a current reference cell is a cell having a maximum cell index of cells scheduled by the said DCI of the 2 DCIs; for the other of the 2 DCIs, a current reference cell is a cell having a minimum cell index of cells scheduled by the said other DCI of the 2 DCIs.

In one embodiment, the first node U3 is the first node in the present disclosure.

In one embodiment, the second node U4 is the second node in the present disclosure.

In one embodiment, the first node U3 is a UE.

In one embodiment, the second node U4 is a base station.

In one embodiment, the second node U4 is a UE.

In one embodiment, an air interface between the second node U4 and the first node U3 is a Uu interface.

In one embodiment, an air interface between the second node U4 and the first node U3 includes a cellular link.

In one embodiment, an air interface between the second node U4 and the first node U3 is a PC5 interface.

In one embodiment, an air interface between the second node U4 and the first node U3 includes a sidelink.

In one embodiment, an air interface between the second node U4 and the first node U3 includes a radio interface between a base station and a UE.

In one embodiment, the default cell index is: a maximum or minimum cell index.

In one embodiment, the first channel comprises a physical layer channel.

In one embodiment, the first channel comprises a PDSCH.

In one embodiment, the configuration information in the present disclosure comprises: at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), periodicity, an transmission antenna port, or a corresponding Transmission Configuration Indicator (TCI) state.

In one embodiment, a DCI in the first DCI group indicates time-domain resources occupied by the first channel.

In one embodiment, a DCI in the first DCI group indicates frequency-domain resources occupied by the first channel.

In one embodiment, a DCI in the first DCI group indicates an MCS of a bit block transmitted on the first channel.

In one embodiment, a DCI in the first DCI group indicates an RV for a bit block transmitted on the first channel.

In one embodiment, when the number of cell(s) scheduled by a DCI in the first DCI group is equal to 1, the DCI in the first DCI group indicates a PDSCH reception or an SPS PDSCH release.

In one embodiment, when the number of cell(s) scheduled by a DCI in the first DCI group is equal to 1, the DCI in the first DCI group comprises at most one HARQ process number field.

In one embodiment, when the number of cell(s) scheduled by a DCI in the first DCI group is equal to 1, the DCI in the first DCI group comprises at most one ZP CSI-RS trigger field.

In one embodiment, when the number of cell(s) scheduled by a DCI in the first DCI group is equal to 1, the DCI in the first DCI group comprises at most one SRS request field.

In one embodiment, when the number of cell(s) scheduled by a DCI in the first DCI group is equal to 1, the DCI in the first DCI group comprises at most one Rate matching indicator field.

In one embodiment, the second channel comprises a physical layer channel.

In one embodiment, the second channel comprises a PDSCH.

In one embodiment, the third channel comprises a physical layer channel.

In one embodiment, the third channel comprises a PDSCH.

In one embodiment, the second channel and the third channel respectively belong to different cells.

In one embodiment, the second channel and the third channel respectively belong to different serving cells.

In one embodiment, a Transport Block (TB) transmitted on the second channel is different from a TB transmitted on the third channel.

In one embodiment, a TB transmitted on the second channel is the same as a TB transmitted on the third channel.

In one embodiment, REs comprised in the second channel and REs comprised in the third channel are non-overlapping.

In one embodiment, the second channel and the third channel respectively occupy different frequency-domain resources.

In one embodiment, the second channel and the third channel respectively occupy different or the same time-domain resources.

In one embodiment, a DCI in the first DCI group indicates time-domain resources occupied by the second channel and time-domain resources occupied by the third channel.

In one embodiment, a DCI in the first DCI group indicates frequency-domain resources occupied by the second channel and frequency-domain resources occupied by the third channel.

In one embodiment, a DCI in the first DCI group indicates an MCS of a bit block transmitted on the second channel and an MCS of another bit block on the third channel.

In one embodiment, a DCI in the first DCI group indicates an RV for a bit block transmitted on the second channel and an RV for another bit block on the third channel.

In one embodiment, the number of cell(s) scheduled by a DCI in the first DCI group is greater than 1, and the DCI in the first DCI group indicates PDSCH receptions on multiple cells.

In one embodiment, the number of cell(s) scheduled by a DCI in the first DCI group is greater than 1, and the DCI in the first DCI group comprises multiple NDI fields for multiple cells scheduled by the DCI in the first DCI group.

In one embodiment, the number of cell(s) scheduled by a DCI in the first DCI group is greater than 1, and the DCI in the first DCI group comprises multiple RV fields for multiple cells scheduled by the DCI in the first DCI group.

In one embodiment, the number of cell(s) scheduled by a DCI in the first DCI group is greater than 1, and the DCI in the first DCI group comprises multiple MCS fields for multiple cells scheduled by the DCI in the first DCI group.

In one embodiment, the number of cell(s) scheduled by a DCI in the first DCI group is greater than 1, and the DCI in the first DCI group comprises a HARQ process number field.

In one embodiment, the number of cell(s) scheduled by a DCI in the first DCI group is greater than 1, and the DCI in the first DCI group comprises a ZP CSI-RS trigger field.

In one embodiment, the number of cell(s) scheduled by a DCI in the first DCI group is greater than 1, and the DCI in the first DCI group comprises an SRS request field.

In one embodiment, the number of cell(s) scheduled by a DCI in the first DCI group is greater than 1, and the DCI in the first DCI group comprises a Rate matching indicator field.

In one embodiment, the number of cell(s) scheduled by a DCI in the first DCI group is greater than 1, and the DCI in the first DCI group comprises multiple HARQ process number fields.

In one embodiment, the number of cell(s) scheduled by a DCI in the first DCI group is greater than 1, and the DCI in the first DCI group comprises multiple ZP CSI-RS trigger fields.

In one embodiment, the number of cell(s) scheduled by a DCI in the first DCI group is greater than 1, and the DCI in the first DCI group comprises multiple SRS request fields.

In one embodiment, the number of cell(s) scheduled by a DCI in the first DCI group is greater than 1, and the DCI in the first DCI group comprises multiple Rate matching indicator fields.

In one embodiment, the DCI in the first DCI group comprises a total DAI field.

In one embodiment, there are 2 DCIs in a first DCI group, and numbers of cells scheduled by the 2 DCIs are greater than 1, any of the 2 DCIs indicates multiple PDSCH receptions on multiple cells, reference cells scheduled by the 2 DCIs are a same cell, and time-domain resources occupied by the 2 DCIs belong to a same time interval; a start time of an earliest PDSCH reception among the multiple PDSCH receptions indicated by one of the 2 DCIs is earlier than that of an earliest PDSCH reception among the multiple PDSCH receptions indicated by the other of the 2 DCIs; each reference cell scheduled by said one of the 2 DCIs is counted into an accumulative number of reference cell(s) being scheduled by first-type DCI(s) in a first resource pool up to the same cell and the same time interval, which is indicated by a first field comprised in the said other of the 2 DCIs, while no reference cell scheduled by the said other of the 2 DCIs is counted into an accumulative number of reference cell(s) being scheduled by first-type DCI(s) in a first resource pool up to the same cell and the same time interval, which is indicated by a first field comprised in the said one of the 2 DCIs.

In one embodiment, there are 2 DCIs in a first DCI group, and numbers of cells scheduled by the 2 DCIs are greater than 1, any of the 2 DCIs indicates multiple PDSCH receptions on multiple cells, reference cells scheduled by the 2 DCIs are a same cell, and time-domain resources occupied by the 2 DCIs belong to a same time interval; a start time of an earliest PDSCH reception among the multiple PDSCH receptions indicated by one of the 2 DCIs is earlier than that of an earliest PDSCH reception among the multiple PDSCH receptions indicated by the other of the 2 DCIs; each {reference cell, time interval}-pair being associated with said one of the 2 DCIs is counted into an accumulative number of {reference cell, time interval}-pair(s) being associated with first-type DCI(s) in a first resource pool up to the same cell and the same time interval, which is indicated by a first field comprised in the said other of the 2 DCIs, while no {reference cell, time interval}-pair being associated with the said other of the 2 DCIs is counted into an accumulative number of {reference cell, time interval}-pair(s) being associated with first-type DCI(s) in a first resource pool up to the same cell and the same time interval, which is indicated by a first field comprised in the said one of the 2 DCIs.

In one embodiment, there are 2 DCIs in a first DCI group, and numbers of cells scheduled by the 2 DCIs are greater than 1, any of the 2 DCIs indicates multiple PDSCH receptions on multiple cells, reference cells scheduled by the 2 DCIs are a same cell, and time-domain resources occupied by the 2 DCIs belong to a same time interval; a start time of a PDSCH reception in the same cell indicated by one of the 2 DCIs is earlier than that of a PDSCH reception in the same cell indicated by the other of the 2 DCIs; each reference cell scheduled by said one of the 2 DCIs is counted into an accumulative number of reference cell(s) being scheduled by first-type DCI(s) in a first resource pool up to the same cell and the same time interval, which is indicated by a first field comprised in the said other of the 2 DCIs, while no reference cell scheduled by the said other of the 2 DCIs is counted into an accumulative number of reference cell(s) being scheduled by first-type DCI(s) in a first resource pool up to the same cell and the same time interval, which is indicated by a first field comprised in the said one of the 2 DCIs.

In one embodiment, there are 2 DCIs in a first DCI group, and numbers of cells scheduled by the 2 DCIs are greater than 1, any of the 2 DCIs indicates multiple PDSCH receptions on multiple cells, reference cells scheduled by the 2 DCIs are a same cell, and time-domain resources occupied by the 2 DCIs belong to a same time interval; a start time of a PDSCH reception in the same cell indicated by one of the 2 DCIs is earlier than that of a PDSCH reception in the same cell indicated by the other of the 2 DCIs; each {reference cell, time interval}-pair being associated with said one of the 2 DCIs is counted into an accumulative number of {reference cell, time interval}-pair(s) being associated with first-type DCI(s) in a first resource pool up to the same cell and the same time interval, which is indicated by a first field comprised in the said other of the 2 DCIs, while no {reference cell, time interval}-pair being associated with the said other of the 2 DCIs is counted into an accumulative number of {reference cell, time interval}-pair(s) being associated with first-type DCI(s) in a first resource pool up to the same cell and the same time interval, which is indicated by a first field comprised in the said one of the 2 DCIs.

In one embodiment, a cell index of a reference cell scheduled by first-type DCI(s) is a maximum cell index of cell indexes of all cells being scheduled by the said first-type DCI.

In one embodiment, a cell index of a reference cell scheduled by first-type DCI(s) is a minimum cell index of cell indexes of all cells being scheduled by the said first-type DCI.

In one embodiment, a cell index of a reference cell scheduled by any DCI in the first DCI group is a minimum cell index of cell indexes of all cells being scheduled by the said any DCI in the first DCI group.

In one embodiment, a cell index of a reference cell scheduled by any DCI in the first DCI group is a maximum cell index of cell indexes of all cells being scheduled by the said any DCI in the first DCI group.

In one embodiment, the steps marked by the dotted-line box F3 in FIG. 19 exist.

In one embodiment, the steps marked by the dotted-line box F3 in FIG. 19 do not exist.

In one embodiment, the steps marked by the dotted-line box F4 in FIG. 19 exist.

In one embodiment, the steps marked by the dotted-line box F4 in FIG. 19 do not exist.

Embodiment 20

Figure 20:
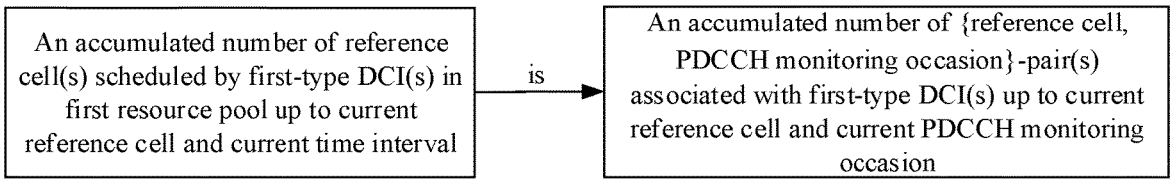
FIG. 20 illustrates a schematic diagram of an accumulative number of cell(s) scheduled by first-type DCI(s) in a first resource pool up to a current reference cell and a current time interval according to one embodiment of the present disclosure.

Embodiment 20 illustrates a schematic diagram of an accumulative number of reference cell(s) scheduled by first-type DCI(s) in a first resource pool up to a current reference cell and a current time interval according to one embodiment of the present disclosure, as shown in FIG. 20.

In Embodiment 20, an accumulative number of reference cell(s) scheduled by first-type DCI(s) in a first resource pool up to a current reference cell and a current time interval is: an accumulative number of {reference cell, PDSCH monitoring occasion}-pair(s) associated with first-type DCI(s) up to the current reference cell and the current PDCCH monitoring occasion.

In one embodiment, the {reference cell, PDSCH monitoring occasion}-pair(s) associated with the first-type DCI(s) is(are): {reference cell, PDSCH monitoring occasion}-pair(s) in which there is(are) PDSCH reception(s) or SPS PDSCH release(s) associated with the first-type DCI.

In one embodiment, the {reference cell, PDSCH monitoring occasion}-pair(s) associated with the first-type DCI(s) is(are): {reference cell, PDSCH monitoring occasion}-pair(s) in which there is(are) PDSCH reception(s) or SPS PDSCH release(s) indicated by the first-type DCI.

In one embodiment, a said PDCCH monitoring occasion is used for monitoring DCI.

In one embodiment, a said PDCCH monitoring occasion is used for monitoring PDCCH(s).

In one embodiment, a said PDCCH monitoring occasion is used for monitoring PDCCH candidate(s).

In one embodiment, a said PDCCH monitoring occasion is comprised of a positive integer number of multicarrier symbol(s) in time domain.

Embodiment 21

Figure 21:
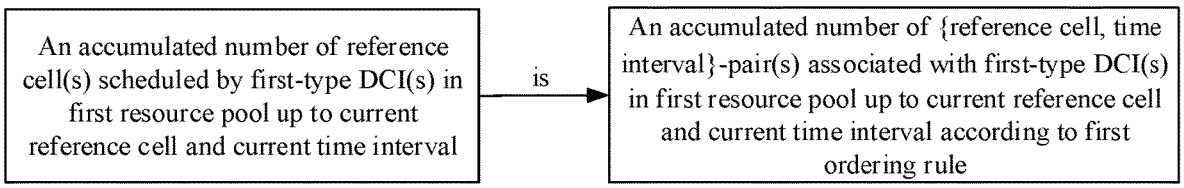
FIG. 21 illustrates a schematic diagram of an accumulative number of cell(s) scheduled by first-type DCI(s) in a first resource pool up to a current reference cell and a current time interval according to one embodiment of the present disclosure.

Embodiment 21 illustrates a schematic diagram of an accumulative number of reference cell(s) scheduled by first-type DCI(s) in a first resource pool up to a current reference cell and a current time interval according to one embodiment of the present disclosure, as shown in FIG. 21.

In Embodiment 21, an accumulative number of reference cell(s) scheduled by first-type DCI(s) in a first resource pool up to a current reference cell and a current time interval is: an accumulative number of {reference cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

In one embodiment, a reference cell being associated with said first-type DCI(s) is a cell having a default cell index among all cells scheduled by the said first-type DCI.

In one embodiment, a reference cell being associated with said first-type DCI(s) is a cell having a maximum cell index among all cells scheduled by the said first-type DCI.

In one embodiment, a reference cell being associated with said first-type DCI(s) is a cell having a minimum cell index among all cells scheduled by the said first-type DCI.

In one embodiment, a time interval being associated with said first-type DCI(s) is a time interval to which time-domain resources occupied by the said first-type DCI(s) belong.

In one embodiment, the {reference cell, time interval}-pair(s) associated with the first-type DCI(s) is: {reference cell, time interval}-pair(s) in which there is(are) PDSCH reception(s) or SPS PDSCH release(s) being associated with the first-type DCI.

In one embodiment, the {reference cell, time interval}-pair associated with the first-type DCI(s) is: {reference cell, time interval}-pair(s) in which there is(are) PDSCH reception(s) or SPS PDSCH release(s) being indicated by the first-type DCI.

In one embodiment, in terms of time-frequency domain, the {reference cell, time interval}-pair(s) associated with the first-type DCI(s) comprises(comprise): time-frequency resources occupied by PDSCH reception(s) or SPS PDSCH release(s) indicated by the first-type DCI.

In one embodiment, the {reference cell, time interval}-pair(s) associated with the first-type DCI(s) is(are): {reference cell, time interval}-pair(s) in which there is(are) the first-type DCI.

In one embodiment, in terms of time-frequency domain, the {reference cell, time interval}-pair(s) associated with the first-type DCI(s) comprises(comprise): time-frequency resources occupied by the first-type DCI.

In one embodiment, the first ordering rule is an ordering rule based on reference cell indexes and time interval indexes.

In one embodiment, the first ordering rule is an ordering rule based on reference cell indexes and time interval indexes as well as other information.

In one embodiment, the first ordering rule comprises: firstly in an ascending order of start times of reception for data channels associated with a same {reference cell, PDCCH monitoring occasion}-pair, secondly in an ascending order of reference cell indexes, and finally in an ascending order of PDCCH monitoring occasion indexes.

In one embodiment, the first ordering rule comprises: firstly in an ascending order of reference cell indexes, and then in an ascending order of PDCCH monitoring occasion indexes.

In one embodiment, the first ordering rule comprises: an increasing order/ascending order of start times of reception for data channels existent in a same {reference cell, time interval}-pair comes first, an ascending order of reference cell indexes comes second, and an ascending order of time interval indexes comes last.

In one embodiment, the first ordering rule comprises: an ascending order of reference cell indexes comes first, and an ascending order of time interval indexes comes second.

In one embodiment, the first ordering rule comprises: an increasing order/ascending order of start times of reception for data channels existent in a same {reference cell, PDCCH monitoring occasion}-pair comes first, an ascending order of reference cell indexes comes second, and an ascending order of PDCCH monitoring occasion indexes comes last.

In one embodiment, the first ordering rule comprises: an ascending order of reference cell indexes comes first, and an ascending order of PDCCH monitoring occasion indexes comes second.

In one embodiment, the first ordering rule comprises: a decreasing order/descending order of start times of reception for data channels existent in a same {reference cell, time interval}-pair comes first, a descending order of reference cell indexes comes second, and a descending order of time interval indexes comes last.

In one embodiment, the first ordering rule comprises: a descending order of reference cell indexes comes first, and a descending order of time interval indexes comes second.

In one embodiment, the first ordering rule comprises: an increasing order/a descending order of start times of reception for data channels existent in a same {reference cell, time interval}-pair comes first, an increasing order/a descending order of reference cell indexes comes second, and an increasing order/a descending order of time interval indexes comes last.

In one embodiment, the first ordering rule comprises: an increasing order/a descending order of reference cell indexes comes first, and an increasing order/a descending order of time interval indexes comes second.

In one embodiment, the first ordering rule comprises: an increasing order/a descending order of time interval indexes comes first, and an increasing order/a descending order of reference cell indexes comes second.

In one embodiment, the cell index of the reference cell is one of 0 through 31.

In one embodiment, the cell index of the reference cell is a positive integer no greater than 31.

In one embodiment, the cell index of the reference cell is a positive integer no greater than 8192.

In one embodiment, the cell index of the reference cell is a Physical Cell Identity (PCI).

In one embodiment, the reference cell in the present disclosure is a serving cell.

In one embodiment, the cell index of the reference cell in the present disclosure is a serving cell index.

Embodiment 22

Embodiment 22 illustrates a schematic diagram of relations among a first HARQ-ACK bit sequence, any DCI in a first DCI group and a first field comprised in the any DCI in the first DCI group according to one embodiment of the present disclosure, as shown in FIG. 22.

In Embodiment 22, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on a first field comprised in the DCI in the first DCI group.

In one embodiment, the first HARQ-ACK bit sequence comprises HARQ-ACK information bits.

In one embodiment, the first HARQ-ACK bit sequence comprises a positive integer number of bits.

In one embodiment, the first HARQ-ACK bit sequence comprises a positive integer number of ACKs or NACKs.

In one embodiment, the first HARQ-ACK bit sequence comprises a HARQ-ACK codebook (or, sub-codebook) based on Transport Blocks (TBs).

In one embodiment, each HARQ-ACK bit in the first HARQ-ACK bit sequence is for a HARQ-ACK bit based on a TB PDSCH reception or an SPS PDSCH release.

In one embodiment, the first HARQ-ACK bit sequence comprises a HARQ-ACK codebook (or, sub-codebook).

In one embodiment, the first HARQ-ACK bit sequence comprises a Type-2 HARQ-ACK codebook (or, sub-codebook).

In one embodiment, the first HARQ-ACK bit sequence is transmitted on a physical layer channel.

In one embodiment, the first HARQ-ACK bit sequence is transmitted on a PUCCH.

In one embodiment, the first HARQ-ACK bit sequence is transmitted on a PUSCH.

In one embodiment, the first HARQ-ACK bit sequence comprises (a) HARQ-ACK bit block(s) associated with at least one DCI in the first DCI group.

In one embodiment, each HARQ-ACK bit block associated with any DCI in the first DCI group is a bit block in the first HARQ-ACK bit sequence.

In one embodiment, the first HARQ-ACK bit sequence comprises a HARQ-ACK bit block associated with any DCI in the first DCI group.

In one embodiment, a HARQ-ACK bit block associated with a DCI in the first DCI group is: bit block comprising HARQ-ACK information bits generated for a PDSCH reception or an SPS PDSCH release indicated by the DCI in the first DCI group.

In one embodiment, the HARQ-ACK bit block in the present disclosure comprises a positive integer number of HARQ-ACK bit(s).

In one embodiment, the HARQ-ACK bit block in the present disclosure comprises a HARQ-ACK bit in the first HARQ-ACK bit sequence or a HARQ-ACK bit sub-sequence in the first HARQ-ACK bit sequence.

In one embodiment, for any DCI in the first DCI group, the HARQ-ACK bit block being associated is determined in accordance with a pseudo-code which determines HARQ-ACK information bits, specified in 3GPP TS38.213, Chapter 9.1.3.1; a value in the first field comprised in the DCI in the first DCI group is a value of a counter DAI in 3GPP TS38.213, Chapter 9.1.3.1.

In one embodiment, the first HARQ-ACK bit sequence comprises $O_{ACK}$ HARQ-ACK bits which are $\tilde{o}_0^{ACK}$, $\tilde{o}_1^{ACK}, \ldots, \tilde{o}_{O^{ACK}-1}^{ACK}$.

In one embodiment, a HARQ-ACK bit block being associated with a DCI in the first DCI group comprises at least one ACK or NACK.

In one embodiment, a HARQ-ACK bit block being associated with a DCI in the first DCI group comprises: HARQ-ACK bits indicating whether a PDSCH reception or SPS PDSCH release indicated by the DCI in the first DCI group is correctly received.

In one embodiment, a HARQ-ACK bit block being associated with any DCI in the first DCI group comprises at least one bit comprised in the first HARQ-ACK bit sequence; the at least one bit comprised in the first HARQ-ACK bit sequence has a sequence number in the first HARQ-ACK bit sequence which is a function of a value of the first field in the DCI in the first DCI group.

In one embodiment, in the first HARQ-ACK bit sequence, a number of HARQ-ACK bits comprised in a HARQ-ACK bit block associated with any DCI in the first DCI group is linear with a number of cells being scheduled.

In one embodiment, harq-ACK-SpatialBundlingPUCCH is not provided.

In one embodiment, harq-ACK-SpatialBundlingPUCCH is provided.

In one embodiment, maxNrofCodeWordsScheduled-ByDCI is configured to be 1 (or n1).

In one embodiment, maxNrofCodeWordsScheduled-ByDCI is configured to be 2 (or n2).

In one embodiment, harq-ACK-SpatialBundlingPUCCH is not provided, besides, the first node is configured with reception of two TBs in at least one Downlink BWP being configured in at least one serving cell through maxNrofCodeWordsScheduledByDCI.

In one embodiment, harq-ACK-SpatialBundlingPUCCH is provided, or, the first node is not configured with reception of two TBs in at least one Downlink BWP being configured in at least one serving cell through maxNrofCodeWordsScheduledByDCI.

In one embodiment, a HARQ-ACK bit block being associated with the DCI in the first DCI group comprises a $(\tilde{o}_{2 \cdot T_D \cdot j+2(V-1)}^{ACK})$-th bit and a $(\tilde{o}_{2 \cdot T_D \cdot j+2(V-1)+1}^{ACK})$-th bit comprised in the first HARQ-ACK bit sequence; where V denotes a value of the first field in the DCI in the first DCI group.

In one embodiment, a HARQ-ACK bit block being associated with the DCI in the first DCI group comprises a $(\tilde{o}_{T_D \cdot j+V-1}^{ACK})$-th bit comprised in the first HARQ-ACK bit sequence; where V denotes a value of the first field in the DCI in the first DCI group.

In one embodiment, a HARQ-ACK bit block being associated with the DCI in the first DCI group comprises at least one of a $(\tilde{o}_{2 \cdot T_D \cdot j+2(V-1)}^{ACK})$-th bit and a $(\tilde{o}_{2 \cdot T_D \cdot j+2(V-1)+1}^{ACK})$-th bit comprised in the first HARQ-ACK bit sequence, or, a HARQ-ACK bit block being associated with the DCI in the first DCI group comprises a $(\tilde{o}_{T_D \cdot j+V-1}^{ACK})$-th bit comprised in the first HARQ-ACK bit sequence; where V denotes a value of the first field in the DCI in the first DCI group.

In one embodiment, the $T_D$ in the present disclosure is a positive integer.

In one embodiment, the $T_D$ in the present disclosure is one of 2, 4, 8 and 16.

In one embodiment, the $T_D$ in the present disclosure is equal to 2 to the Q-th power; where Q denotes the number of bits comprised in the first field.

In one embodiment, the/in the present disclosure is equal to 0 or a positive integer.

Embodiment 23

Embodiment 23 illustrates a schematic diagram of a default cell index according to an embodiment of the present disclosure, as shown in FIG. 23.

In Embodiment 23, a default cell index is: a maximum or minimum cell index.

In one embodiment, the default cell index is: a maximum cell index.

In one embodiment, the default cell index is: a minimum cell index.

In one embodiment, the default cell index is a cell index configured by a higher layer signaling.

In one embodiment, the default cell index is a cell index configured by an RRC signaling.

In one embodiment, the default cell index is a cell index configured by a MAC CE signaling.

In one embodiment, the default cell index is a pre-defined cell index.

Embodiment 24

Embodiment 24 illustrates a schematic diagram explaining how to indicate by a first field in DCI in a first DCI group according to an embodiment of the present disclosure, as shown in FIG. 24.

In Embodiment 24, a first DCI group comprises 3 DCIs, namely, DCI #0, DCI #1, DCI #2; a first resource pool comprises 3 cells (i.e., cell #0, cell #1 and cell #2) and 2 time intervals (i.e., time interval #0 and time interval #1) respectively in two different dimensions; cell indexes of the cell #0, the cell #1 and the cell #2 are ascending in sequence; and an index of the time interval #1 is greater than that of the time interval #0.

In Embodiment 24, the default cell index in the present disclosure is a maximum cell index.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, a cell being scheduled by the DCI #0 in the first DCI group is a cell #1; for the DCI #0, the accumulative number of reference cell(s) scheduled by first-type DCI(s) in the first resource pool up to a current reference cell and a current time interval indicated by the first field comprised is equal to 1, where the current reference cell is the cell #1, and the current time interval is the time interval #0.

In one embodiment, cells being scheduled by the DCI #1 in the first DCI group are a cell #0 and a cell #2, with the cell index of the cell #2 being greater than that of the cell #0; for the DCI #1, the accumulative number of reference cell(s) scheduled by first-type DCI(s) in the first resource pool up to a current reference cell and a current time interval indicated by the first field comprised is equal to 3, where the current reference cell is the cell #2, and the current time interval is the time interval #1.

In one embodiment, a cell being scheduled by the DCI #2 in the first DCI group is a cell #1; for the DCI #2, the accumulative number of reference cell(s) scheduled by first-type DCI(s) in the first resource pool up to a current reference cell and a current time interval indicated by the first field comprised is equal to 2, where the current reference cell is the cell #1, and the current time interval is the time interval #1.

In one embodiment, a cell being scheduled by the DCI #0 in the first DCI group is a cell #1; for the DCI #0, the accumulative number of {reference cell, time interval}-pair(s) being associated with the first-type DCI(s) in the first resource pool up to a current reference cell and a current time interval indicated by the first field comprised is equal to 1, where the current reference cell is the cell #1, and the current time interval is the time interval #0.

In one subembodiment, for the DCI #0, the {reference cell, time interval}-pair(s) being associated with the first-type DCI(s) in the first resource pool up to the current reference cell and the current time interval indicated by the first field comprised include: {cell #1, time interval #0}.

In one embodiment, cells being scheduled by the DCI #1 in the first DCI group are a cell #0 and a cell #2, with the cell index of the cell #2 being greater than that of the cell #0; for the DCI #1, the accumulative number of {reference cell, time interval}-pair(s) being associated with the first-type DCI(s) in the first resource pool up to a current reference cell and a current time interval indicated by the first field comprised is equal to 3, where the current reference cell is the cell #2, and the current time interval is the time interval #1.

In one subembodiment, for the DCI #1, the {reference cell, time interval}-pairs being associated with the first-type DCI(s) in the first resource pool up to the current reference cell and the current time interval indicated by the first field comprised include: {cell #1, time interval #0}, {cell #1, time interval #1} and {cell #2, time interval #1}.

In one embodiment, a cell being scheduled by the DCI #2 in the first DCI group is a cell #1; for the DCI #2, the accumulative number of {reference cell, time interval}-pair(s) being associated with the first-type DCI(s) in the first resource pool up to a current reference cell and a current time interval indicated by the first field comprised is equal to 2, where the current reference cell is the cell #1, and the current time interval is the time interval #1.

In one subembodiment, for the DCI #2, the {reference cell, time interval}-pairs being associated with the first-type DCI(s) in the first resource pool up to the current reference cell and the current time interval indicated by the first field comprised include: {cell #1, time interval #0}, and {cell #1, time interval #1}.

In one embodiment, for the DCI #0, a default cell index is a cell index of the cell #1.

In one embodiment, for the DCI #1, a default cell index is a cell index of the cell #2.

In one embodiment, for the DCI #2, a default cell index is a cell index of the cell #1.

In one embodiment, advantages of the above way of counting (namely, advantages of ways of indication by the first field in the present disclosure) include: while following the rule of counting based on serving cells located by PDSCHs as given in the current version of protocols (Release 16 of 3GPP TS38.213), ambiguous understandings of indication by multiple PDSCHs resulting from a DCI introduced for indicating functions of the multiple PDSCHs on multiple cells can be avoided, hence the balance between compatibility and indication performance.

Embodiment 25

Embodiment 25 illustrates a schematic diagram explaining how to indicate by a first field in DCI in a first DCI group according to an embodiment of the present disclosure, as shown in FIG. 25.

In Embodiment 25, a first DCI group comprises 2 DCIs, namely, DCI #0, DCI #1; a first resource pool comprises 4 cells ((i.e., cell #0, cell #1, cell #2 and cell #3) and 1 time interval (i.e., time interval #0) respectively in two different dimensions; cell indexes of the cell #0, the cell #1, the cell #2 and the cell #3 are ascending in sequence.

In Embodiment 25, the default cell index in the present disclosure is a minimum cell index.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, cells being scheduled by the DCI #0 in the first DCI group are a cell #1 and a cell #2, where a cell index of the cell #2 is greater than that of the cell #1; for the DCI #0, the accumulative number of reference cell(s) scheduled by the first-type DCI(s) in the first resource pool up to a current reference cell and a current time interval indicated by the first field comprised is equal to 2, where the current reference cell is the cell #1, and the current time interval is the time interval #0.

In one embodiment, cells being scheduled by the DCI #1 in the first DCI group are a cell #0 and a cell #3, where a cell index of the cell #3 is greater than that of the cell #0; for the DCI #1, the accumulative number of reference cell(s) scheduled by the first-type DCI(s) in the first resource pool up to a current reference cell and a current time interval indicated by the first field comprised is equal to 1, where the current reference cell is the cell #0, and the current time interval is the time interval #0.

In one embodiment, cells being scheduled by the DCI #0 in the first DCI group are a cell #1 and a cell #2, where a cell index of the cell #2 is greater than that of the cell #1; for the DCI #0, the accumulative number of {reference cell, time interval}-pair(s) being associated with the first-type DCI(s) in the first resource pool up to a current reference cell and a current time interval indicated by the first field comprised is equal to 2, where the current reference cell is the cell #1, and the current time interval is the time interval #0.

In one subembodiment, for the DCI #0, the {reference cell, time interval}-pairs being associated with the first-type DCI(s) in the first resource pool up to the current reference cell and the current time interval indicated by the first field comprised include: {cell #0, time interval #0} and {cell #1, time interval #0}.

In one embodiment, cells being scheduled by the DCI #1 in the first DCI group are a cell #0 and a cell #3, where a cell index of the cell #3 is greater than that of the cell #0; for the DCI #1, the accumulative number of {reference cell, time interval}-pair(s) being associated with the first-type DCI(s) in the first resource pool up to a current reference cell and a current time interval indicated by the first field comprised is equal to 1, where the current reference cell is the cell #0, and the current time interval is the time interval #0.

In one subembodiment, for the DCI #1, the {reference cell, time interval}-pair(s) being associated with the first-type DCI(s) in the first resource pool up to the current reference cell and the current time interval indicated by the first field comprised include: {cell #0, time interval #0}.

In one embodiment, for the DCI #0, a default cell index is a cell index of the cell #1.

In one embodiment, for the DCI #1, a default cell index is a cell index of the cell #0.

Embodiment 26

Embodiment 26 illustrates a schematic diagram explaining how to indicate by a first field in DCI in a first DCI group according to an embodiment of the present disclosure, as shown in FIG. 26.

In Embodiment 26, a first DCI group comprises 2 DCIs, namely, DCI #0, DCI #1; time-domain resources occupied by the 2 DCIs belong to a same time interval; a first resource pool comprises 2 cells ((i.e., cell #0, cell #1) and 1 time interval (i.e., the same time interval) respectively in two different dimensions; an index of the time interval #1 is greater than that of the time interval #0; a start time #1 is later than a start time #0.

In Embodiment 26, the default cell index in the present disclosure is a maximum cell index.

In one embodiment, a start time for a PDSCH reception in a cell #1/an earliest PDSCH reception being indicated in the statement in FIG. 26 includes: a start time of a PDSCH reception in the cell #1 indicated by the DCI #0 or the DCI #1.

In one embodiment, a start time for a PDSCH reception in a cell #1/an earliest PDSCH reception being indicated in the statement in FIG. 26 includes: a start time of a PDSCH reception in the cell #1 indicated by the DCI #0, an earlier one of a start time of a PDSCH reception in the cell #0 indicated by the DCI #1 or a start time of a PDSCH reception in the cell #1 indicated by the DCI #1.

In one embodiment, the two different dimensions of the first resource pool are frequency domain and time domain, respectively.

In one embodiment, the two different dimensions of the first resource pool are serving cell and PDCCH monitoring occasions, respectively.

In one embodiment, a cell being scheduled by the DCI #0 in the first DCI group is a cell #1; for the DCI #0, the accumulative number of reference cell(s) scheduled by first-type DCI(s) in the first resource pool up to a current reference cell and a current time interval indicated by the first field comprised is equal to 1, where the current reference cell is the cell #1, and the current time interval is the time interval #0.

In one embodiment, cells being scheduled by the DCI #1 in the first DCI group are a cell #0 and a cell #1, with the cell index of the cell #1 being greater than that of the cell #0; for the DCI #1, the accumulative number of reference cell(s) scheduled by the first-type DCI(s) in the first resource pool up to a current reference cell and a current time interval indicated by a first field comprised is equal to 2, where the current reference cell is the cell #1, and the current time interval is the same time interval.

In one embodiment, a cell being scheduled by the DCI #0 in the first DCI group is a cell #1; for the DCI #0, the accumulative number of {reference cell, time interval}-pair(s) being associated with the first-type DCI(s) in the first resource pool up to a current reference cell and a current time interval indicated by the first field comprised is equal to 1, where the current reference cell is the cell #1, and the current time interval is the same time interval.

In one subembodiment, for the DCI #0, the {reference cell, time interval}-pair(s) being associated with the first-type DCI(s) in the first resource pool up to the current reference cell and the current time interval indicated by the first field comprised include: {cell #1, the same time interval}.

In one embodiment, cells being scheduled by the DCI #1 in the first DCI group are a cell #0 and a cell #1, with the cell index of the cell #1 being greater than that of the cell #0; for the DCI #1, the accumulative number of {reference cell, time interval}-pair(s) being associated with the first-type DCI(s) in the first resource pool up to a current reference cell and a current time interval indicated by the first field comprised is equal to 2, where the current reference cell is the cell #1, and the current time interval is the same time interval.

In one subembodiment, for the DCI #1, the {reference cell, time interval}-pairs being associated with the first-type DCI(s) in the first resource pool up to the current reference cell and the current time interval indicated by the first field comprised include: {cell #1, the same time interval}, and {cell #1, the same time interval} (herein, the {cell #1, the same time interval} is counted twice).

In one embodiment, for the DCI #0, a default cell index is a cell index of the cell #1.

In one embodiment, for the DCI #1, a default cell index is a cell index of the cell #1.

Embodiment 27

Embodiment 27 illustrates a schematic diagram explaining a second field in any DCI in a first DCI group according to an embodiment of the present disclosure, as shown in FIG. 27.

In Embodiment 27, for any DCI in a first DCI group, a second field comprised is used to indicate a total number of reference cells scheduled by first-type DCI(s) up to a current time interval in a first resource pool.

In one subembodiment of the Embodiment 27, the reference cell scheduled by said first-type DCI(s) is a cell having a default cell index of cells scheduled by the said first-type DCI, time-domain resources occupied by the any DCI in the first DCI group belong to the current time interval, and at least one DCI in the first DCI group schedules more than one cell.

In one embodiment, the total number of the reference cells scheduled by the first-type DCI(s) up to the current time interval in the first resource pool is: a total number of {reference cell, time interval}-pairs being associated with the first-type DCI(s) in the first resource pool up to the current time interval.

In one embodiment, the total number of the reference cells scheduled by the first-type DCI(s) up to the current time interval in the first resource pool is: a total number of {reference cell, PDCCH monitoring occasion}-pairs being associated with the first-type DCI(s) up to a current PDCCH monitoring occasion.

In one embodiment, the total number of the reference cells scheduled by the first-type DCI(s) up to the current time interval in the first resource pool is: a total number of {reference cell, time interval}-pairs being associated with the first-type DCI(s) in the first resource pool up to the current time interval according to an ascending order of time interval indexes.

In one embodiment, the total number is only limited to a total number determined in the first resource pool.

In one embodiment, the value of the second field is updated in accordance with time intervals.

In one embodiment, the second field is an indication field.

In one embodiment, the second field is a DAI field.

In one embodiment, the second field is a total DAI field.

In one embodiment, the second field comprises 1 bit.

In one embodiment, the second field comprises 2 bits.

In one embodiment, the second field comprises 3 bits.

In one embodiment, the second field comprises 4 bits.

In one embodiment, the second field comprises no more than 32 bits.

In one embodiment, a value in the second field is 1 or 2.

In one embodiment, a value in the second field is one of 1, 2, 3 or 4.

In one embodiment, a value in the second field is one of 1, 2, 3, 4, 5, 6, 7 or 8.

In one embodiment, a value in the second field is one of 1, 2, 3, 4, 5, 6, 7, 8, 9, 10, 11, 12, 13, 14, 15 or 16.

In one embodiment, a value in the second field is one of 0, 1, 2 or 3.

In one embodiment, a value in the second field is one of 0 through 7.

Embodiment 28

Embodiment 28 illustrates a structure block diagram of a processing device in a first node, as shown in FIG. 28. In FIG. 28, a first node processing device 1400 comprises a first receiver 1401 and a first transmitter 1402.

In one embodiment, the first node 1400 is a UE.

In one embodiment, the first node 1400 is a relay node.

In one embodiment, the first node 1400 is vehicle-mounted equipment.

In one embodiment, the first node 1400 is a UE supporting V2X communications.

In one embodiment, the first node 1400 is a relay node supporting V2X communications.

In one embodiment, the first receiver 1401 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1401 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1401 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1401 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1401 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1402 comprises at least one of the antenna 452, the transmitter 454, the multi-antenna transmitting processor 457, the transmitting processor 468, the controller/processor 459 the memory 460 or the data source 467 in FIG. 4 of the present disclosure.

In one embodiment, the first transmitter 1402 comprises at least the first five of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1402 comprises at least the first four of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1402 comprises at least the first three of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1402 comprises at least the first two of the antenna 452, the transmitter 454, the multi-antenna transmitting processor 457, the transmitting processor 468, the controller/processor 459 the memory 460 and the data source 467 in FIG. 4 of the present disclosure.

In one Embodiment 28, the first receiver 1401 receives a first DCI group, the first DCI group comprising at least one DCI; and the first transmitter 1402 transmits a first signal, the first signal carrying a first HARQ-ACK bit sequence; herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one embodiment, the accumulative number of the reference cell(s) scheduled by the first-type DCI(s) in the first resource pool up to the current reference cell and the current time interval is: an accumulative number of {reference cell, PDCCH monitoring occasion}-pair(s) associated with first-type DCI(s) up to a current reference cell and a current PDCCH monitoring occasion.

In one embodiment, the accumulative number of the reference cell(s) scheduled by the first-type DCI(s) in the first resource pool up to the current reference cell and the current time interval is: an accumulative number of {reference cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

In one embodiment, the first receiver 1401 receives on a first channel; herein a DCI in the first DCI group comprises configuration information for the first channel.

In one embodiment, the first receiver 1401 receives on a second channel and a third channel; herein, a DCI in the first DCI group comprises configuration information for the second channel and the third channel.

In one embodiment, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group.

In one embodiment, the first DCI group comprises 2 DCIs, and each of the 2 DCIs schedules more than one cell; for one of the 2 DCIs, a current reference cell is a cell having a maximum cell index of cells scheduled by the said DCI of the 2 DCIs; for the other of the 2 DCIs, a current reference cell is a cell having a minimum cell index of cells scheduled by the said other DCI of the 2 DCIs.

Embodiment 29

Embodiment 29 illustrates a structure block diagram a processing device in a second node, as shown in FIG. 29. In FIG. 29, a second node processing device 1500 comprises a second transmitter 1501 and a second receiver 1502.

In one embodiment, the second node 1500 is a UE.

In one embodiment, the second node 1500 is a base station.

In one embodiment, the second node 1500 is a relay node.

In one embodiment, the second node 1500 is vehicle-mounted equipment.

In one embodiment, the second node 1500 is a UE supporting V2X communications.

In one embodiment, the second transmitter 1501 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1501 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1501 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1501 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1501 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1502 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1502 comprises at least the first five of the antenna 420, the receiver 418, the multi-antenna receiving processor 472, the receiving processor 470, the controller/processor 475 and the memory 476 in FIG. 4 of the present disclosure.

In one embodiment, the second receiver 1502 comprises at least the first four of the antenna 420, the receiver 418, the multi-antenna receiving processor 472, the receiving processor 470, the controller/processor 475 and the memory 476 in FIG. 4 of the present disclosure.

In one embodiment, the second receiver 1502 comprises at least the first three of the antenna 420, the receiver 418, the multi-antenna receiving processor 472, the receiving processor 470, the controller/processor 475 and the memory 476 in FIG. 4 of the present disclosure.

In one embodiment, the second receiver 1502 comprises at least the first two of the antenna 420, the receiver 418, the multi-antenna receiving processor 472, the receiving processor 470, the controller/processor 475 and the memory 476 in FIG. 4 of the present disclosure.

In one Embodiment 29, the second transmitter 1501 transmits a first DCI group, the first DCI group comprising at least one DCI; and the second receiver 1502 receives a first signal, the first signal carrying a first HARQ-ACK bit sequence; herein, for any DCI in the first DCI group, a first field comprised is used for indicating an accumulative number of cell(s) scheduled by first-type DCI(s) in a first resource pool up to a current reference cell and a current time interval, the first-type DCI(s) being used for indicating a PDSCH reception or an SPS PDSCH release; the current reference cell is a cell having a default cell index among cell(s) scheduled by the any DCI in the first DCI group, time-domain resources occupied by the DCI in the first DCI group belong to the current time interval, and at least one DCI in the first DCI group schedules more than one cell.

In one embodiment, the accumulative number of the reference cell(s) scheduled by the first-type DCI(s) in the first resource pool up to the current reference cell and the current time interval is: an accumulative number of {reference cell, PDCCH monitoring occasion}-pair(s) associated with first-type DCI(s) up to a current reference cell and a current PDCCH monitoring occasion.

In one embodiment, the accumulative number of the reference cell(s) scheduled by the first-type DCI(s) in the first resource pool up to the current reference cell and the current time interval is: an accumulative number of {reference cell, time interval}-pair(s) associated with first-type DCI(s) in a first resource pool up to a current reference cell and a current time interval according to a first ordering rule; the first ordering rule is a rule of ordering based on at least serving cell indexes and time interval indexes.

In one embodiment, the second transmitter 1501 transmits on a first channel; herein a DCI in the first DCI group comprises configuration information for the first channel.

In one embodiment, the second transmitter 1501 transmits on a second channel and a third channel; herein, a DCI in the first DCI group comprises configuration information for the second channel and the third channel.

In one embodiment, the first HARQ-ACK bit sequence comprises a HARQ-ACK bit block associated with any DCI in the first DCI group; and a position of the HARQ-ACK bit block associated with the DCI in the first DCI group in the first HARQ-ACK bit sequence is determined based on the first field comprised in the DCI in the first DCI group.

In one embodiment, the first DCI group comprises 2 DCIs, and each of the 2 DCIs schedules more than one cell; for one of the 2 DCIs, a current reference cell is a cell having a maximum cell index of cells scheduled by the said DCI of the 2 DCIs; for the other of the 2 DCIs, a current reference cell is a cell having a minimum cell index of cells scheduled by the said other DCI of the 2 DCIs.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, test apparatus, test equipment or test instrument, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives a first DCI group, the first DCI group comprising at least one DCI; and
a first transmitter, which transmits a first signal, the first signal carrying a first HARQ-ACK bit sequence; wherein:
for any DCI in the first DCI group, a first field comprised is used for indicating an accumulative number of {reference cell, time interval}-pair(s) being associated with first-type DCI(s) up to a current reference cell and a current time interval according to a first ordering rule;
the first ordering rule is a rule of ordering based on at least cell indexes of reference cells and time interval indexes, any of the first-type DCI(s) being used for indicating a PDSCH reception or an SPS PDSCH release;
a reference cell scheduled by a first-type DCI is a cell having a default cell index among cells scheduled by the first-type DCI;
the current reference cell is a cell having a default cell index among cells(s) scheduled by the any DCI in the first DCI group;
time-domain resources occupied by the any DCI in the first DCI group belong to the current time interval, and at least one DCI in the first DCI group schedules more than one cell.

2. The first node according to claim 1, comprising:
the first receiver, receiving on a second channel and a third channel;
wherein a DCI in the first DCI group comprises configuration information for the second channel and the third channel.

3. The first node according to claim 1, wherein the first HARQ-ACK bit sequence comprises a HARQ-ACK bit block associated with any DCI in the first DCI group; and a position of the HARQ-ACK bit block associated with the any DCI in the first DCI group in the first HARQ-ACK bit sequence is determined based on the first field comprised in the any DCI in the first DCI group.

4. The first node according to claim 1, wherein the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

5. The first node according to claim 1, wherein the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

6. A second node for wireless communications, comprising:
a second transmitter, which transmits a first DCI group, the first DCI group comprising at least one DCI; and
a second receiver, which receives a first signal, the first signal carrying a first HARQ-ACK bit sequence;
wherein for any DCI in the first DCI group, a first field comprised is used for indicating an accumulative number of {reference cell, time interval}-pair(s) being associated with first-type DCI(s) up to a current reference cell and a current time interval according to a first ordering rule; the first ordering rule is a rule of ordering based on at least cell indexes of reference cells and time interval indexes, any of the first-type DCI(s) being used for indicating a PDSCH reception or an SPS PDSCH release; a reference cell scheduled by a first-type DCI is a cell having a default cell index among cells scheduled by the first-type DCI, the current reference cell is a cell having a default cell index among cells scheduled by the any DCI in the first DCI group, time-domain resources occupied by the any DCI in the first DCI group belong to the current time interval, and at least one DCI in the first DCI group schedules more than one cell.

7. The second node according to claim 6, wherein the first HARQ-ACK bit sequence comprises a HARQ-ACK bit block associated with any DCI in the first DCI group; and a position of the HARQ-ACK bit block associated with the any DCI in the first DCI group in the first HARQ-ACK bit sequence is determined based on the first field comprised in the any DCI in the first DCI group.

8. The second node according to claim 6, wherein the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

9. A method in a first node for wireless communications, comprising:
receiving a first DCI group, the first DCI group comprising at least one DCI; and
transmitting a first signal, the first signal carrying a first HARQ-ACK bit sequence; wherein:
for any DCI in the first DCI group, a first field comprised is used for indicating an an accumulative number of {reference cell, time interval}-pair(s) being associated with first-type DCI(s) up to a current reference cell and a current time interval according to a first ordering rule;

the first ordering rule is a rule of ordering based on at least cell indexes of reference cells and time interval indexes, any of the first-type DCI(s) being used for indicating a PDSCH reception or an SPS PDSCH release;

a reference cell scheduled by a first-type DCI is a cell having a default cell index among cells scheduled by the first-type DCI;

the current reference cell is a cell having a default cell index among cells(s) scheduled by the any DCI in the first DCI group;

time-domain resources occupied by the any DCI in the first DCI group belong to the current time interval, and at least one DCI in the first DCI group schedules more than one cell.

10. The method in the first node according to claim 9, comprising:

receiving on a second channel and a third channel;

wherein a DCI in the first DCI group comprises configuration information for the second channel and the third channel.

11. The method in the first node according to claim 9, wherein the first HARQ-ACK bit sequence comprises a HARQ-ACK bit block associated with any DCI in the first DCI group; and a position of the HARQ-ACK bit block associated with the any DCI in the first DCI group in the first HARQ-ACK bit sequence is determined based on the first field comprised in the any DCI in the first DCI group.

12. The method in the first node according to claim 9, wherein the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

13. The method in the first node according to claim 9, wherein the first-type DCI(s) comprises(comprise) either DCI by which a maximum value of cell indexes of all cells scheduled is no greater than a cell index of the current reference cell, or DCI by which time-domain resources occupied belong to a time interval having an index smaller than that of the current time interval.

14. A method in a second node for wireless communications, comprising:

transmitting a first DCI group, the first DCI group comprising at least one DCI; and receiving a first signal, the first signal carrying a first HARQ-ACK bit sequence; wherein:

for any DCI in the first DCI group, a first field comprised is used for indicating an an accumulative number of {reference cell, time interval}-pair(s) being associated with first-type DCI(s) up to a current reference cell and a current time interval according to a first ordering rule;

the first ordering rule is a rule of ordering based on at least cell indexes of reference cells and time interval indexes, any of the first-type DCI(s) being used for indicating a PDSCH reception or an SPS PDSCH release;

a reference cell scheduled by a first-type DCI is a cell having a default cell index among cells scheduled by the first-type DCI, the current reference cell is a cell having a default cell index among cells scheduled by the any DCI in the first DCI group;

time-domain resources occupied by the any DCI in the first DCI group belong to the current time interval, and at least one DCI in the first DCI group schedules more than one cell.

* * * * *